United States Patent
Iben et al.

(10) Patent No.: US 12,300,284 B1
(45) Date of Patent: May 13, 2025

(54) SINGLE DATA BAND DATA STORAGE

(71) Applicant: INTERNATIONAL BUSINESS MACHINES CORPORATION, Armonk, NY (US)

(72) Inventors: Icko E. T. Iben, Santa Clara, CA (US); David Lee Swanson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/503,563

(22) Filed: Nov. 7, 2023

(51) Int. Cl.
G11B 5/02 (2006.01)
G11B 5/187 (2006.01)
G11B 5/48 (2006.01)
G11B 5/592 (2006.01)

(52) U.S. Cl.
CPC ............ G11B 5/5928 (2013.01); G11B 5/187 (2013.01); G11B 5/4893 (2013.01)

(58) Field of Classification Search
CPC ....... G11B 5/584; G11B 5/09; G11B 5/00826; G11B 5/265; G11B 5/2651; G11B 5/2652; G11B 5/29; G11B 5/56; G11B 5/4893; G11B 20/20; G11B 5/59633; G11B 15/444; G11B 5/5517; G11B 5/00817; G11B 27/36; G11B 5/78; G11B 5/59688; G11B 5/00813; G11B 5/02
USPC .......................................................... 360/48
See application file for complete search history.

(56) References Cited

U.S. PATENT DOCUMENTS

| | | | |
|---|---|---|---|
| 5,535,068 | A | 7/1996 | Hughes |
| 5,926,336 | A | 7/1999 | Le et al. |
| 5,940,237 | A | 8/1999 | Takagi |
| 7,095,583 | B2 | 8/2006 | Johnson et al. |
| 7,307,809 | B2 | 12/2007 | Neumann |
| 7,602,579 | B2 | 10/2009 | Biskeborn et al. |
| 7,652,841 | B2 | 1/2010 | Kawakami et al. |
| 8,493,829 | B2 | 7/2013 | Katagiri |

(Continued)

FOREIGN PATENT DOCUMENTS

| | | |
|---|---|---|
| EP | 1276099 A2 | 1/2003 |
| GB | 2518677 A | 4/2015 |

(Continued)

OTHER PUBLICATIONS

U.S. Appl. No. 18/387,789, filed Nov. 7, 2023.

(Continued)

*Primary Examiner* — Nabil Z Hindi
(74) *Attorney, Agent, or Firm* — KONRAD, RAYNES, DAVDA & VICTOR LLP; William K. Konrad

(57) ABSTRACT

Provided are a computer program product, device, system, and method for single data band data storage. In one embodiment, a tape head module has an array of four servo transducer elements for each servo band of a tape and an array of reader/writer transducer elements extending over most of the width of the tape. In another embodiment, a data storage tape has a top servo band positioned adjacent a top edge guard band of the tape, a bottom servo band positioned adjacent a bottom edge guard band of the tape, and a single data band positioned between the top and bottom servo bands and configured to receive tracks of data written by a tape head wherein the single data band width extends over most of the tape width.

20 Claims, 12 Drawing Sheets

(56) References Cited

U.S. PATENT DOCUMENTS

| | | |
|---|---|---|
| 9,142,224 B2 | 9/2015 | Hansen et al. |
| 9,183,878 B2 | 11/2015 | Cherubini et al. |
| 9,218,838 B2 | 12/2015 | Biskeborn et al. |
| 11,100,945 B2 | 8/2021 | Yamaga et al. |
| 11,222,659 B1* | 1/2022 | Goker ............ G11B 5/5928 |
| 11,532,325 B1 | 12/2022 | Le et al. |
| 11,605,399 B2 | 3/2023 | Peng et al. |
| 2003/0053241 A1 | 3/2003 | Misawa |
| 2004/0130818 A1 | 7/2004 | Chliwnyj et al. |
| 2005/0117246 A1 | 6/2005 | Sueki et al. |
| 2005/0152059 A1 | 7/2005 | Hashimoto |
| 2006/0061898 A1 | 3/2006 | Nakao |
| 2007/0247738 A1 | 10/2007 | Yamagishi |
| 2009/0040643 A1 | 2/2009 | Weng et al. |
| 2009/0231756 A1 | 9/2009 | Koeppe |
| 2012/0212848 A1 | 8/2012 | Katagiri |
| 2013/0063836 A1 | 3/2013 | Bui et al. |
| 2015/0092291 A1 | 4/2015 | Cherubini et al. |
| 2015/0092294 A1 | 4/2015 | Cherubini et al. |
| 2021/0065741 A1 | 3/2021 | Nakao |
| 2023/0127110 A1 | 4/2023 | Wang et al. |
| 2023/0129110 A1 | 4/2023 | Nakao et al. |
| 2023/0253011 A1 | 8/2023 | Bui et al. |
| 2023/0267964 A1 | 8/2023 | Biskeborn et al. |

FOREIGN PATENT DOCUMENTS

| | | |
|---|---|---|
| KR | 10-2002-0076283 A | 10/2002 |
| WO | 2012174015 A1 | 12/2012 |

OTHER PUBLICATIONS

U.S. Appl. No. 18/387,758, filed Nov. 7, 2023.
U.S. Appl. No. 18/387,776, filed Nov. 7, 2023.
U.S. Appl. No. 18/503,545 filed Nov. 7, 2023.
List of IBM Patents and Applications treated as related, dated Nov. 13, 2023, 2 pp.
Raeymaekers et al., "Design of a dual stage actuator tape head with high-bandwidth track following capability," Microsystem Technologies, pp. 1525-1529, vol. 15, 2009.
United States Final Rejection dated Oct. 11, 2024, 7 pages, in U.S. Appl. No. 18/387,758.
United States Non-Final Office Action dated Jun. 13, 2024, 6 pages, in U.S. Appl. No. 18/387,758.
United States Non-Final Rejection dated Aug. 26, 2024, 7 pages, in U.S. Appl. No. 18/387,776.
United States Notice of Allowance dated Sep. 30, 2024, 5 pages, in U.S. Appl. No. 18/387,776.
International Searching Authority, "Notification of Transmittal of the International Search Report and the Written Opinion of the International Searching Authority, or Declaration," Patent Cooperation Treaty, Jan. 7, 2025, 14 pages, International Application No.—PCT/EP2024/080089.
International Searching Authority, "Notification of Transmittal of the International Search Report and the Written Opinion of the International Searching Authority, or Declaration," Patent Cooperation Treaty, Jan. 24, 2025, 13 pages, International Application No.—PCT/EP2024/080087.

* cited by examiner

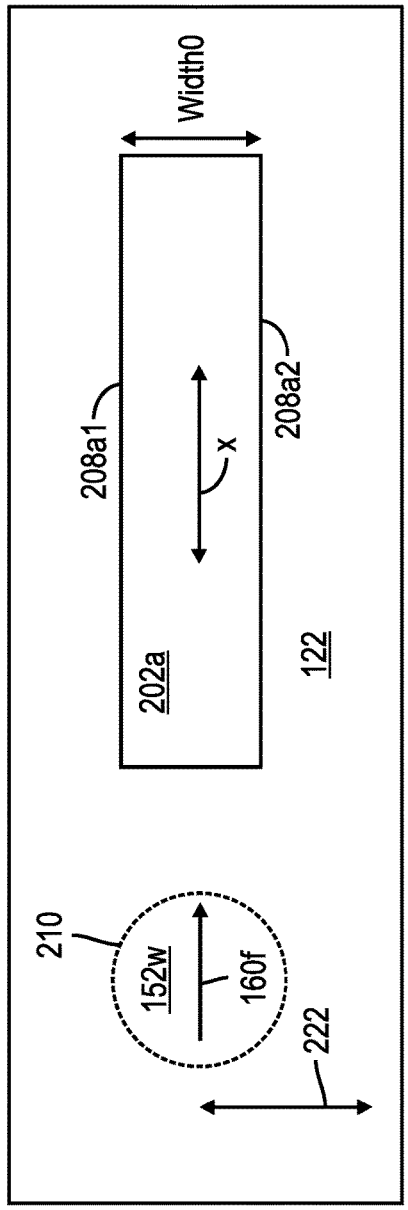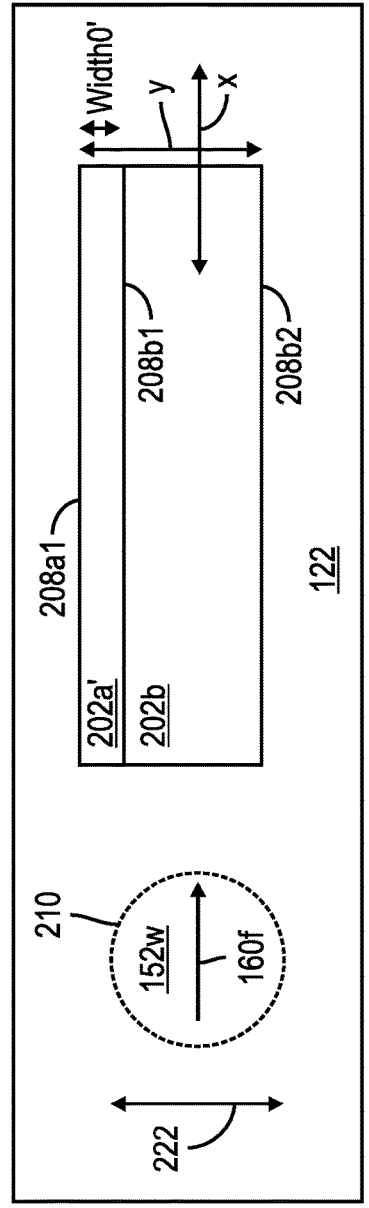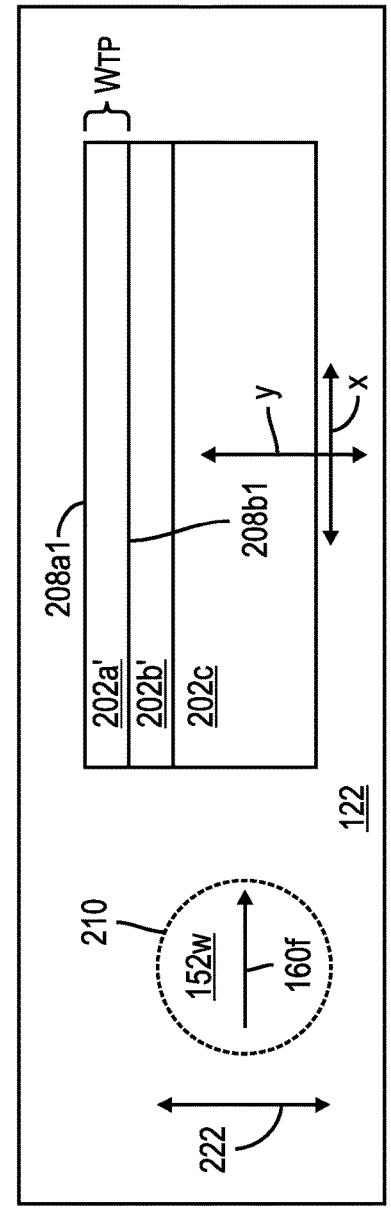

SINGLE DATA BAND DATA STORAGE

BACKGROUND OF THE INVENTION

1. Field of the Invention

The present invention relates to magnetic heads and magnetic tape for reading data from and writing data to a storage drive.

2. Description of the Related Art

In magnetic storage systems such as tape drives, data is read from and written onto magnetic recording media through data channels utilizing magnetic transducers in a tape head. As used herein the term "magnetic" refers to the various magnetic technologies including magnetoresistive read transducers, and magnetic media/recording layer technologies. Data is written on the magnetic recording media by moving a magnetic recording write transducer to a position over the media where the data is to be stored. The magnetic recording write transducer also referred to as a writer transducer, writer element, or simply a writer, then generates a magnetic field in a write bubble, which encodes the data into the magnetic media as the magnetic media is moved past the transducer. Data is read from the media by similarly positioning a magnetic reading transducer (or reader element or reader) and then sensing the magnetic field of the magnetic media as it moves past the read transducer. Read and write operations may be independently synchronized with the movement of the media to ensure that the data can be read from and written to the desired location on the media.

Known magnetic tape drives often use ring type write transducers in combination with a process known as shingling to write data in a bi-directional, serpentine fashion on magnetic tape. Multiple tracks are written in parallel by a set of writer transducers into a set of data sub-bands. The data sub-bands have a lateral width approximately equal to the pitch between the writer transducers.

A group of tracks written in parallel down the length of tape is referred to as a wrap. In one known tape drive, the first set of tracks in the first wrap are written in the forward tape direction at the top of each data sub-band of a group of data sub-bands. At the end of tape, the position of the head is shifted down and tracks of the first wrap are written at the bottom of the data sub-bands. At the end of this first reverse wrap the head is shifted back up and a second set of tracks is written in the forward tape direction below the first set of tracks in the forward tape direction. In this manner, tracks are written within each data sub-band in a serpentine, clockwise pattern, starting at the top of the sub-band and continuing writing wraps as the sub-band fills from outside to inside of the sub-band. This serpentine, clockwise, outside to inside recording pattern continues until each sub-band of the set of data sub-bands has been filled with data tracks.

Shingled writing uses a writer that writes tracks that are wider than the desired target track width, or track pitch, to enable features such as backwards write compatibility and/or read while write verification. In shingled writing, the pitch between adjacent tracks is less than the width of the writer such that a newly written track partially overwrites the previously written neighboring track, leaving a residual neighboring track with the final desired target track pitch. This overlapping of adjacent tracks is similar to the overlapping of shingles on a roof, hence the name.

In addition to readers and writers for reading and writing data, respectively, known tape heads for large scale data storage often include servo transducers to determine the position on the tape for reading and writing. In one known format, a tape is segmented into 4 data bands of lateral width $W_{DB}$ each, and 5 servo bands of lateral width $W_{SB}$ each, and two edge guard bands of lateral width, $W_{Edge}$ each. The data is written in the data bands by an array of $N_E$ writer elements and read back with an array of $N_E$ reader elements. The track pitch of the $N_E$ writer elements on the writer modules and the $N_E$ reader elements on the reader modules is the same, as is the location and spacing of the servo elements.

A known tape storage system uses a tape head in which the reader and writer elements read from or write to only one data band of the four data bands at a time. For such a design, an array of $N_E$ reader or writer elements is located sequentially, 1 to $N_E$ on a read/write module, in which the elements are separated by a fixed element pitch, $W_{EP}$. A writer of width $W_W$ will write a wrap of data, and then step over by a fixed track pitch, $W_{TP}$, to overwrite a portion of the previous wrap leaving a shingled data track of lateral width $W_{TP}$. To avoid overwriting data in adjacent sub data bands, the width of the written tracks in the to $N_E$ sub data bands of the final wrap will not be "shingled over" and will have a lateral width $W_W$ rather than the desired lateral width of $W_{TP}$. Each data band will have $N_E$ data sub bands or a sub data band for each of the $N_E$ elements. Thus, to first order, each writer can fit in each data sub band, $$N_{trk} = \frac{(W_{EP} - W_W)}{W_{TP}} + 1$$

tracks, in which all but the final track has a lateral width $W_{TP}$ without overwriting the data written in the adjacent data sub bands, and each data band will have $N_E \cdot N_{trk}$ written tracks.

The lateral data capacity across the width of the tape is a function of the number of data bands, $N_{DB}$, and servo bands $N_{SB}=N_{DB}+1$, across the width of the tape, and the number of tracks in each data band as: $N_{DB} \cdot N_E \cdot N_{trk}$. The number and width of the servo bands affects the lateral data capacity since data can't be written in the servo bands.

In one known design, the servo bands are patterned with data in chevron shapes which are read by the tape head servos to detect the position of the tape head with high accuracy. In this design, when reading or writing to a particular data band, a single servo of the tape head is positioned in an adjacent servo band above the particular data band being read from or written to, and another servo is positioned in an adjacent servo band below the particular data band.

In this known design having a single servo positioned in an adjacent servo band, the lateral width $W_{SB}$ of each servo band is approximately the element pitch $W_{EP}+W_S$, where $W_S$ is the servo width of the servo of the tape head, to ensure that the tape head movement can be precisely controlled over the full lateral width of the data band being written to or read from. The time required for the servo to traverse the chevron patterns of the servo band is a function of the lateral width of each servo band. For a timing-based servo pattern using chevron patterns at a given angle, the wider the servo band width $W_{SB}$, the longer the time to cross the widest portion of the servo pattern. For a velocity of v and a chevron pattern angle of β, the maximum transit time across the Chevrons, $t_{SBmax}$, will be:

$$t_{SBmax} = \frac{2 \cdot W_{SB}}{v \cdot \sin(\beta)}. \qquad 1$$

SUMMARY

Provided are a computer program product, system, and method for a tape head configured for writing tracks of data on magnetic tape having a plurality of servo bands and a tape width $W_{Tape}$ extending between longitudinal edges of the tape. In one aspect, the tape head comprises a module having a substrate, an array of $N_E$ transducer elements carried on the substrate and configured to one of 1) write to, and 2) read from a single band of data on the tape having a single data band width $W_{DB}$ wherein the $N_E$ transducer element array and the single data band width $W_{DB}$ each extend over most of the tape width $W_{Tape}$. In another aspect, the module further comprises an array of four servo transducer elements carried on the substrate for each servo band of the tape for a total of eight servo transducer elements on the tape head module.

In yet another aspect, the $N_E$ transducer element array of the tape head module is an array of $N_E$ writer transducer elements configured to write $N_E$ sub data bands in the single data band, so that each writer transducer element of the array of $N_E$ writer transducer elements is configured to write data in an associated sub data band in four write region quadrants. Each writer transducer is further configured to write data in two of the write region quadrants in a first longitudinal direction and to write data in two of the write region quadrants in a second longitudinal direction opposite to that of the first longitudinal direction.

In still another aspect, a data storage tape for a tape head having an array of $N_E$ writer transducer elements carried on a substrate for writing tracks of data on the tape, has a top longitudinal edge and a bottom longitudinal edge and a tape width $W_{Tape}$ extending between the top and bottom longitudinal edges of the tape, and a plurality of longitudinal regions between the top and bottom longitudinal edges. In one embodiment, the plurality of longitudinal regions include a top edge guard band of width $W_{Edge}$ positioned adjacent the top longitudinal edge of the tape, a bottom edge guard band of width $W_{Edge}$ positioned adjacent the bottom longitudinal edge of the tape, a top servo band of width $W_{SB}$ positioned adjacent the top guard band of the tape, a bottom servo band of width $W_{SB}$ positioned adjacent the bottom guard band of the tape; and a single data band of width $W_{DB}$ positioned between the top and bottom servo bands and configured to receive tracks of data written by the tape head wherein the data band width $W_{DB}$ extends over most of the tape width $W_{Tape}$.

BRIEF DESCRIPTION OF THE DRAWINGS

FIGS. 2A-2C illustrate an example of shingled track writing in which single band data storage in accordance with one embodiment of the present description, is employed.

DETAILED DESCRIPTION

Figure 1A:
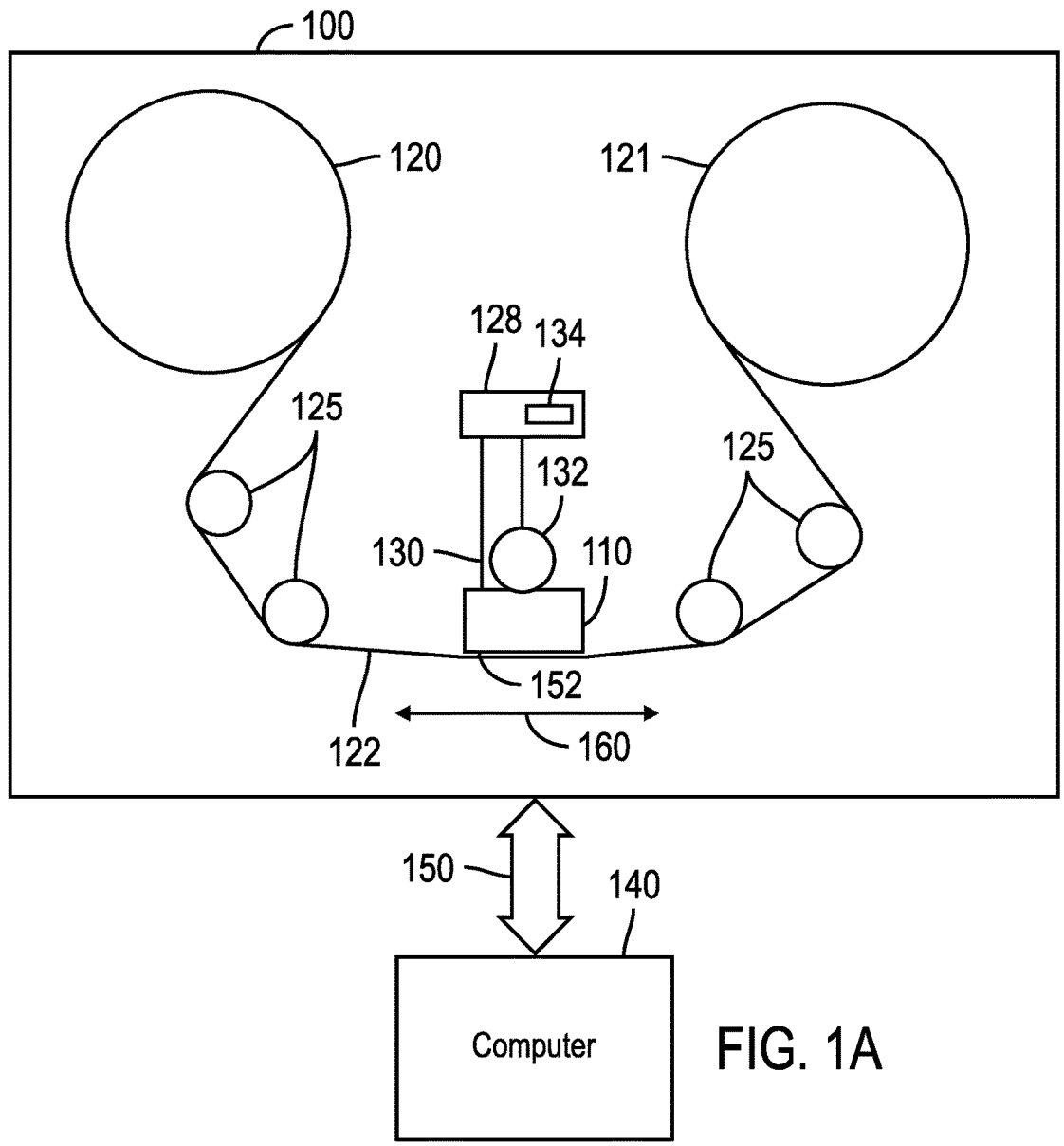
FIG. 1A is a schematic diagram of a data storage system employing a single data band tape head for a single data band data storage tape in accordance with one embodiment of the present disclosure.

The description herein provides examples of embodiments of the invention, and variations and substitutions may be made in other embodiments. Several examples will now be provided to further clarify various embodiments of the present disclosure:

Example 1. A tape head for writing tracks of data on magnetic tape having a plurality of servo bands and a tape width $W_{Tape}$ extending between longitudinal edges of the tape, comprising: a module having a substrate, an array of $N_E$ transducer elements carried on the substrate and configured to one of 1) write to, and 2) read from a single band of data on the tape having a single data band width $W_{DB}$ where the $N_E$ transducer element array and the single data band width $W_{DB}$ each extend over most of the tape width $W_{Tape}$. The tape head module further comprises an array of four servo transducer elements carried on the substrate for each servo band of the tape for a total of eight servo transducer elements on the tape head module. Thus, embodiments having an array of transducer elements extending over most of the tape width for a single data band advantageously increase data storage capacity. Further, embodiments having an array of four servo transducer elements for each servo band of the tape advantageously increase data storage capacity.

Example 2. The limitations of any of Examples 1 and 3-8, where the $N_E$ transducer element array of the tape head module is an array of $N_E$ writer transducer elements configured to write $N_E$ sub data bands in the single data band, so that each writer transducer element of the array of $N_E$ writer transducer elements is configured to write data in an associated sub data band in four write region quadrants. Each writer transducer element is further configured to write data in two of the write region quadrants in a first longitudinal direction and to write data in two of the write region quadrants in a second longitudinal direction opposite to that of the first longitudinal direction. Thus, embodiments having four write region quadrants in each sub data band advantageously increase data storage capacity.

Example 3. The limitations of any of Examples 1-2 and 4-8, where the $N_E$ transducer element array is an array of one of 1) $N_E$ writer transducer elements and 2) $N_E$ reader transducer elements, where the eight servo transducer elements comprise a top array of four servo transducer elements positioned in a first placement pattern adjacent one end of the $N_E$ transducer elements array and configured to read a top servo band of two servo bands in a first tape head module position, and a bottom array of four servo transducer element positioned in a second placement pattern adjacent a distal end of the $N_E$ transducer elements array and configured to read a bottom servo band of two servo bands in the first tape head module position. The first and second placement patterns are symmetric mirror images of each other relative to a tape head center of rotation so that rotation of the tape head module by 180 degrees to a second tape head module position results in the bottom array of servo transducer elements being positioned in the second tape head module position to read the top servo band in a placement pattern identical to that of top array of servo transducer elements positioned to read the top servo band in the first tape head module position. Thus, embodiments having symmetric placement patterns for arrays of servo transducer elements advantageously permit tape head modules of the same design to be rotated 180 degrees relative to each other.

Example 4. The limitations of any of Examples 1-3 and 5-8, where the tape has an edge guard band having a width $W_{Edge}$, the $N_E$ transducer elements of the array of $N_E$ transducer elements are evenly spaced at an element pitch $W_{EP}$, the tape head is configured to write tracks as the tape moves in a direction x, and in a track pitch direction y which is orthogonal to that of the tape motion direction x, the tape head is configured to be tilted at an angle $\Theta$ relative to the track pitch direction y, and the element pitch $W_{EP}$ is selected to be within a range of $$\frac{2 \cdot W_{Tape} - 4 \cdot W_{Edge}}{\cos(\Theta) \cdot (2 \cdot N_E + 1)} \pm 1 \text{ microns}.$$

The top array of servo transducer elements is an array of servo transducer elements S1a, S1b, S1c, S1d, the bottom array servo transducer elements is an array of servo transducer elements S2a, S2b, S2c, S2d, the first placement pattern is adjacent a top transducer element E.1 of the $N_E$ transducer elements array and includes spacing $W_{S1a.E1}$ between servo transducer element S1a and top transducer element E.1, spacing $W_{S1b.E1}$ between servo transducer element S1b and top transducer element E.1, spacing $W_{S1c.E1}$ between servo transducer element S1c and top transducer element E.1, and spacing $W_{S1d.E1}$ between servo transducer element S1d and top transducer element E.1, the second placement pattern is adjacent a bottom) transducer element NE.1 of the $N_E$ transducer elements array and includes spacing $W_{S2a.NE}$ between servo transducer element S2a and bottom transducer element NE.1, spacing $W_{S2b.NE}$ between servo transducer element S2b and bottom transducer element NE.1, spacing $W_{S2c.NE}$ between servo transducer element S2c and bottom transducer element NE.1, and spacing $W_{S2d.NE}$ between servo transducer element S2d and bottom transducer element NE.1, and where $W_{S2d.NE} = W_{S1a.E1}$ and are each within a range of $\frac{W_{EP}}{4}$ −

1 micron and $\frac{W_{EP}}{4} + 8$ microns;

-continued $W_{S2c.NE} = W_{S1b.E1}$ and are each within a range of $\frac{W_{EP}}{2}$ −

1 micron and $\frac{W_{EP}}{2} + 8$ microns;

$W_{S2b.NE} = W_{S1c.E1}$ and are each within a range of $3 \cdot \frac{W_{EP}}{4}$ −

1 micron and $3 \cdot \frac{W_{EP}}{4} + 8$ microns; and $W_{S2a.NE} = W_{S1d.E1}$ and are each within a range of $W_{EP}$ −

1 micron and $W_{EP} + 8$ microns.

Thus, embodiments having placement patterns for arrays of servo transducer elements within specified ranges determined as a function of selected values, advantageously facilitate preferred or optimized values for such head parameters.

Example 5. The limitations of any of Examples 1-4 and 6-8, where the servo elements S1a, S2a of the top and bottom servo arrays, respectively, are spaced to define a head span distance $W_{HeadSpan}$, which is equal to the servo band pitch on the tape media, $W_{servoBandPitch}$, divided by cos (θ) such that $W_{HeadSpan} = W_{servoBandPitch}/\cos(\theta)$ where $W_{HeadSpan}$ is within a range of $$\left(N_E + \frac{1}{4}\right) \cdot W_{EP} \pm 10 \text{ microns}.$$

Thus, embodiments having tape Head parameters such as headspan width within specified ranges determined as a function of selected values, advantageously facilitate preferred or optimized values for such head parameters.

Example 6. The limitations of any of Examples 1-5 and 7-8, where the tape head is for use with a servo band buffer having a width $W_{SBuf}$ and where the servo elements S1a, S2a of the top and bottom servo arrays, respectively, are spaced to define a head span distance $W_{HeadSpan}$, each servo transducer element has a width $W_S$, and each writer has width $W_W$, and a $W_{HeadSpan}$ is within a range of $$\left(N_E + \frac{1}{4}\right) \cdot W_{EP} + W_S + \frac{W_W}{4} + \frac{W_{SBuf}}{\cos(\Theta)} \pm 1 \text{ microns}.$$

Thus, embodiments having tape head parameters such as headspan width within specified ranges determined as a function of additional selected values, advantageously facilitate preferred or optimized values for such head parameters of increased precision.

Example 7. The limitations of any of Examples 1-6 and 8, where the tape head is for use with a servo band buffer having a width $W_{SBuf}$ and where the tape head has an array of $N_E$ writer transducer elements configured to write data, and where each writer transducer element has a width $W_W$ and each servo transducer element has a width $W_S$, where:

$W_{S1a.E1}$ is within a range of $\frac{W_{EP}}{4} + \frac{W_S}{2} + \frac{W_W}{4} + \frac{W_{SBuf}}{2 \cdot \cos(\Theta)} \pm 0.3$ microns;

-continued $W_{S1b,E1}$ is within a range of $2 \cdot \frac{W_{EP}}{4} + \frac{W_S}{2} + \frac{W_{SBuf}}{2 \cdot \cos(\Theta)} \pm 0.3$ microns;

$W_{S1c,E1}$ is within a range of $3 \cdot \frac{W_{EP}}{4} +$ $\frac{W_S}{2} + \frac{W_W}{4} + \frac{W_{SBuf}}{2 \cdot \cos(\Theta)} \pm 0.3$ microns; and $W_{S1d,E1}$ is within a range of $4 \cdot \frac{W_{EP}}{4} + \frac{W_S}{2} + \frac{W_{SBuf}}{2 \cdot \cos(\Theta)} \pm 0.3$ microns.

Thus, embodiments having tape head parameters such as placement patterns for arrays of servo transducer elements within specified ranges determined as a function of additional selected values, advantageously facilitate preferred or optimized values for such head parameters of increased precision.

Example 8. The limitations of any of Examples 1-7, where the number $N_E$ of writer transducer elements equals 64 writer transducer elements, the element pitch $W_{EP}$ is within a range of 183 microns±3 microns, the tape width $W_{Tape}$ is within a range of 12,650 microns±3 microns; and the edge guard band width $W_{Edge}$ is within a range of 500 microns±3 microns; and where the tape has two servo bands, each having a width $W_{SB}$ within a range of 48 microns±3 microns, and two servo buffer regions each having a width $W_{SBuf}$ and each being positioned between a servo band and an adjacent sub data band; and where:

$W_{S2d,NE}=W_{S1a,E1}$ and are each within a range of 52.4 microns+($W_{SBuf}$−7 microns)/2±3 microns;

$W_{S2c,NE}=W_{S1b,E1}$ and are each within a range of 95.8 microns+($W_{SBuf}$−7 microns)/2±3 microns;

$W_{S2b,NE}=W_{S1c,E1}$ and are each within a range of 144.0 microns+($W_{SBuf}$−7 microns)/2±3 microns; and $W_{S2a,NE}=W_{S1d,E1}$ and are each within a range of 187.3+($W_{SBuf}$−7 µm)/2±3 microns. Thus, embodiments having tape head parameters such as placement patterns for arrays of servo transducer elements within specified ranges determined as a function of fewer selected values, advantageously facilitate preferred or optimized values within wider ranges for such head parameters.

Example 9: A computer system comprising one or more processors, one or more computer-readable memories and one or more computer-readable, tangible storage devices, and program instructions, stored on at least one of the one or more computer-readable, tangible storage devices for execution by at least one of the one or more processors via at least one of the one or more computer-readable memories, in combination with a tape head according to any of Examples 1-8. Thus, embodiments having an array of transducer elements extending over most of the tape width for a single data band advantageously increase data storage capacity. Further, embodiments having an array of four servo transducer elements for each servo band of the tape advantageously increase data storage capacity. Still further, embodiments having tape head parameters within specified ranges determined as a function of selected values, advantageously facilitate preferred or optimized values for such head parameters.

Example 10. A method, comprising: transferring data between a first tape head module and a single data band of a magnetic tape having a tape width $W_{Tape}$ extending between longitudinal edges of the tape, where the transferring data includes one of writing to or reading from the single data band which extends over most of the tape width $W_{Tape}$, using an array of $N_E$ transducer elements of the first tape head module where the array of $N_E$ transducer elements extends over most of the tape width $W_{Tape}$. The method further including controlling the lateral position of the first tape head module relative to the magnetic tape using an array of four servo transducer elements on the first tape head module for each servo band of the tape for a total of eight servo transducer elements on the first tape head module. Thus, embodiments using an array of transducer elements extending over most of the tape width to write in a single data band advantageously increase data storage capacity. Further, embodiments using an array of four servo transducer elements for each servo band of the tape advantageously increase data storage capacity.

Example 11. The limitations of any of Examples 10 and 12-16, where the $N_E$ transducer element array of the first tape head module is an array of $N_E$ writer transducer elements configured to write data in the single data band and where the transferring data between the tape head module and the single data band includes writing to $N_E$ sub data bands in the single data band, which includes each writer transducer element of the array of $N_E$ writer transducer writing data in an associated sub data band in four write region quadrants. The method further includes each writer transducer element of the array of $N_E$ writer transducer writing data in two of the write region quadrants of the associated sub data band in a first longitudinal direction and writing data in two of the write region quadrants of the associated sub data band in a second longitudinal direction opposite to that of the first longitudinal direction. Thus, embodiments writing data in four write region quadrants in each sub data band advantageously increase data storage capacity.

Example 12. The limitations of any of Examples 10-11 and 13-16 where the $N_E$ transducer element array is an array of one of 1) $N_E$ writer transducer elements and 2) $N_E$ reader transducer elements, where controlling the lateral position of the tape head module relative to the magnetic tape includes: a top array of four servo transducer elements of the eight servo transducer elements of the first tape head module positioned in a first placement pattern adjacent one end of the $N_E$ transducer elements array and reading a top servo band of two servo bands in a first tape head module position, and a bottom array of four servo transducer element of the eight servo transducer elements of the first tape head module positioned in a second placement pattern adjacent a distal end of the $N_E$ transducer elements array and reading a bottom servo band of two servo bands in the first tape head module position, and a top array of four servo transducer elements of a second tape head module positioned in the second placement pattern adjacent one end of $N_E$ transducer elements array and reading a top servo band of two servo bands in a second tape head module position, and a bottom array of four servo transducer element of second tape head module positioned in the first placement pattern adjacent a distal end of the $N_E$ transducer elements array and reading a bottom servo band of two servo bands in the second tape head module position, where the first and second placement patterns are symmetric mirror images of each other relative to a tape head center of rotation, and where the second tape head module is rotated by 180 degrees relative to the first tape head module position. Thus, embodiments using symmetric placement patterns for arrays of servo transducer elements advantageously permit tape head modules of the same design to be rotated 180 degrees relative to each other.

Example 13. The limitations of any of Examples 10-12 and 14-16 where the tape has an edge guard band having a width $W_{Edge}$, the $N_E$ transducer elements of the array of $N_E$ transducer elements are evenly spaced at an element pitch $W_{EP}$, and where the transferring data includes the tape head writing tracks in the single data band of the tape as the tape moves in a direction x, and in a track pitch direction y which is orthogonal to that of the tape motion direction x, with the tape head tilted at an angle @ relative to the track pitch direction y, and the element pitch $W_{EP}$ is within a range of $$\frac{2 \cdot W_{Tape} - 4 \cdot W_{Edge}}{\cos(\Theta) \cdot (2 \cdot N_E + 1)} \pm 1 \text{ microns};$$

where controlling the lateral position of the first tape head module relative to the magnetic tape using the eight servo transducer elements includes using a top array of servo transducer elements S1a, S1b, S1c, S1d, a bottom array servo transducer elements S2a, S2b, S2c, S2d, where the first placement pattern is adjacent a top transducer element E.1 of the $N_E$ transducer elements array and includes spacing $W_{S1a.E1}$ between servo transducer element S1a and top transducer element E.1, spacing $W_{S1b.E1}$ between servo transducer element S1b and top transducer element E.1, spacing $W_{S1c.E1}$ between servo transducer element S1c and top transducer element E.1, and spacing $W_{S1d.E1}$ between servo transducer element S1d and top transducer element E.1, and where the second placement pattern is adjacent a bottom transducer element NE.1 of the $N_E$ transducer elements array and includes spacing $W_{S2a.NE}$ between servo transducer element S2a and bottom transducer element NE.1, spacing $W_{S2b.NE}$ between servo transducer element S2b and bottom transducer element NE.1, spacing $W_{S2c.NE}$ between servo transducer element S2c and bottom transducer element NE.1, and spacing $W_{S2d.NE}$ between servo transducer element S2d and bottom transducer element NE.1, and where $W_{S2d.NE}=W_{S1a.E1}$ and are each within a range of $$\frac{W_{EP}}{4} - 1 \text{ micron and } \frac{W_{EP}}{4} + 8 \text{ microns};$$

$W_{S2c.NE}=W_{S1b.E1}$ and are each within a range of $$\frac{W_{EP}}{2} - 1 \text{ micron and } \frac{W_{EP}}{2} + 8 \text{ microns};$$

$W_{S2b.NE}=W_{S1c.E1}$ and are each within a range of $$3 \cdot \frac{W_{EP}}{4} - 1 \text{ micron and } 3 \cdot \frac{W_{EP}}{4} + 8 \text{ microns};$$

and $W_{S2a.NE}=W_{S1d.E1}$ and are each within a range of $W_{EP}-1$ micron and $W_{EP}+8$ microns. Thus, embodiments using placement patterns for arrays of servo transducer elements within specified ranges determined as a function of selected values, advantageously facilitate using preferred or optimized values for such head parameters.

Example 14. The limitations of any of Examples 10-13 and 15-16 where the servo elements S1a, S2a of the top and bottom servo arrays, respectively, used to control the lateral position of the first tape head module relative to the magnetic tape are spaced to define a head span distance $W_{HeadSpan}$, which is equal to the servo band pitch on the tape media, $W_{ServoBandPitch}$, divided by cos (θ) such that $W_{HeadSpan}=W_{ServoBandPitch}/\cos(\theta)$ where each servo transducer element has a width $W_S$, and each writer has width $W_W$ and where $W_{HeadSpan}$ is within range of one of $$\left(N_E + \frac{1}{4}\right) \cdot W_{EP} \pm 10 \text{ microns} \quad 1)$$

and $$\left(N_E + \frac{1}{4}\right) \cdot W_{EP} + W_S + \frac{W_W}{4} + \frac{W_{SBuf}}{\cos(\Theta)} \pm 1 \text{ microns}. \quad 2)$$

Thus, embodiments using tape head parameters such as headspan width within specified ranges determined as a function of selected values, advantageously facilitate using preferred or optimized values for such head parameters.

Example 15. The limitations of any of Examples 10-14 and 16 where the number $N_E$ of writer transducer elements equals 64 writer transducer elements, the element pitch $W_{EP}$ is within a range of 183 microns±3 microns, the tape width $W_{Tape}$ is within a range of 12,650 microns±3 microns; and the edge guard band width $W_{Edge}$ is within a range of 500 microns±3 microns; and where the tape has two servo bands, each having a width $W_{SB}$ within a range of 48 microns±3 microns, and two servo buffer regions each having a width $W_{SBuf}$ and each being positioned between a servo band and an adjacent sub data band; and where: $W_{S2d.NE}=W_{S1a.E1}$ and are each within a range of 52.4 microns+($W_{SBuf}-7$ microns)/2+3 microns; $W_{S2c.NE}=W_{S1b.E1}$ and are each within a range of 95.8 microns+($W_{SBuf}-7$ microns)/2+3 microns; $W_{S2b.NE}=W_{S1c.E1}$ and are each within a range of 144.0 microns+($W_{SBuf}-7$ microns)/2+3 microns; and $W_{S2a.NE}=W_{S1d.E1}$ and are each within a range of 187.3+ ($W_{SBuf}-7$ μm)/2+3 microns. Thus, embodiments using tape head parameters such as placement patterns for arrays of servo transducer elements within specified ranges determined as a function of fewer selected values, advantageously facilitate preferred or optimized values within wider ranges for such head parameters.

Example 16. The limitations of any of Examples 10-15 where the method uses a servo band buffer having a width $W_{SBuf}$ and where the transferring data includes an array of $N_E$ writer transducer elements, each writing data in the single data band, and where each writer transducer element has a width $W_W$ and each servo transducer element has a width $W_S$, where:

$W_{S1a.E1}$ is within a range of $\frac{W_{EP}}{4} + \frac{W_S}{2} + \frac{W_W}{4} + \frac{W_{SBuf}}{2 \cdot \cos(\Theta)} \pm 0.3$ microns;

$W_{S1b.E1}$ is within a range of $2 \cdot \frac{W_{EP}}{4} + \frac{W_S}{2} + \frac{W_{SBuf}}{2 \cdot \cos(\Theta)} \pm 0.3$ microns;

$W_{S1c.E1}$ is within a range of $3 \cdot \frac{W_{EP}}{4} +$ $\frac{W_S}{2} + \frac{W_W}{4} + \frac{W_{SBuf}}{2 \cdot \cos(\Theta)} \pm 0.3$ microns; and $W_{S1d.E1}$ is within a range of $4 \cdot \frac{W_{EP}}{4} + \frac{W_S}{2} + \frac{W_{SBuf}}{2 \cdot \cos(\Theta)} \pm 0.3$ microns.

Thus, embodiments using tape head parameters such as placement patterns for arrays of servo transducer elements within specified ranges determined as a function of additional selected values, advantageously facilitate using preferred or optimized values for such head parameters of increased precision.

Example 17. A data storage tape for a tape head having an array of $N_E$ writer transducer elements carried on a substrate for writing tracks of data on the tape, the tape having a top longitudinal edge and a bottom longitudinal edge and a tape width $W_{Tape}$ extending between the top and bottom longitudinal edges of the tape, and a plurality of longitudinal regions between the top and bottom longitudinal edges including: a top edge guard band of width $W_{Edge}$ positioned adjacent the top longitudinal edge of the tape; a bottom edge guard band of width W Edge positioned adjacent the bottom longitudinal edge of the tape; a top servo band of width $W_{SB}$ positioned adjacent the top guard band of the tape; a bottom servo band of width $W_{SB}$ positioned adjacent the bottom guard band of the tape; and a single data band of width $W_{DB}$ positioned between the top and bottom servo bands and configured to receive tracks of data written by the tape head where the data band width $W_{DB}$ extends over most of the tape width $W_{Tape}$. Thus, embodiments having a single data band extending over most of the tape width advantageously increase data storage capacity. Further, embodiments having two servo bands advantageously increase data storage capacity.

Example 18. The limitations of any of Examples 17 and 19-22 where the width of the tape, $W_{Tape}$, is 12,650+20 microns; the width of the servo band on Tape, $W_{SB}$, is within a range of $$\frac{W_{EP.Tape}}{4} - 3 \text{ microns and } \frac{W_{EP.Tape}}{4} + 12 \text{ microns};$$

the top and bottom servo bands are separated by a width $W_{HeadSpan.Tape}$ where:
$W_{HeadSpan.Tape}$ is within a range of $$\left(N_E + \frac{1}{4}\right) \cdot W_{EP.Tape} - 3 \text{ microns}$$

and $$\left(N_E + \frac{1}{4}\right) \cdot W_{EP.Tape} + 12 \text{ microns};$$

and where the Element pitch on tape, $$W_{EP.Tape}, \text{ is } \frac{W_{Tape} - 2 \cdot W_{Edge}}{N_E + 1/2}.$$

Thus, embodiments having two servo bands of reduced width advantageously increase data storage capacity. Further, embodiments having tape parameters such as separation of the servo bands within specified ranges determined as a function of selected values, advantageously facilitate preferred or optimized values for such tape parameters.

Example 19. The limitations of any of Examples 17-18 and 20-22 where $W_{SB}$ is within a range of 48 microns−3 microns to 48 microns+7 microns. Thus, embodiments having two servo bands of reduced width within a specified range advantageously increase data storage capacity. Further, embodiments having tape parameters such as servo band width within specified ranges determined as a function of selected values, advantageously facilitate preferred or optimized values for such tape parameters.

Example 20. The limitations of any of Examples 17-19 and 21-22 where the tape width $W_{Tape}$ is within a range of 12,650 microns±20 microns. Thus, embodiments having tape parameters within specified ranges determined as a function of a value such as tape width within a specified range, advantageously facilitate preferred or optimized values for such tape parameters.

Example 21. The limitations of any of Examples 17-20 and 22 where the top and bottom servo bands are separated by a width $W_{HeadSpan.Tape}$, which is within a range of 11,594 microns±5 microns. Thus, embodiments having tape parameters such as separation of the servo bands within specified ranges of values, advantageously facilitate preferred or optimized values for such tape parameters.

Example 22. The limitations of any of Examples 17-21 where the data band has a sub data band for each writer transducer element of the array of $N_E$ writer transducer elements, and the tape has two servo buffer regions each having a width $W_{SBuf}$ and each being positioned between a servo band and an adjacent sub data band, where: $W_{SB}$ is within a range of 48 microns−3 microns and 48 microns+7 microns. Thus, embodiments having tape parameters such as servo band width within specified ranges determined as a function of a servo buffer width value, advantageously facilitate preferred or optimized values for such tape parameters.

Example 23: A computer system comprising one or more processors, one or more computer-readable memories and one or more computer-readable, tangible storage devices, and program instructions, stored on at least one of the one or more computer-readable, tangible storage devices for execution by at least one of the one or more processors via at least one of the one or more computer-readable memories, in combination with a tape according to any of Examples 17-22. Thus, embodiments having a data storage tape having a single data band extending over most of the tape width advantageously increase data storage capacity. Further, embodiments having two servo bands on the storage tape advantageously increase data storage capacity.

Example 24. A method, comprising: formatting a data storage tape for use with a tape head having an array of $N_E$ writer transducer elements carried on a substrate for writing tracks of data on the tape, the tape having a top longitudinal edge and a bottom longitudinal edge and a tape width $W_{Tape}$ extending between the top and bottom longitudinal edges of the tape, the formatting including forming a plurality of longitudinal regions between the top and bottom longitudinal edges of the tape including: forming a top edge guard band of width $W_{Edge}$ positioned adjacent the top longitudinal edge of the tape; forming a bottom edge guard band of width $W_{Edge}$ positioned adjacent the bottom longitudinal edge of the tape; forming a top servo band of width $W_{SB}$ positioned adjacent the top guard band of the tape; forming a bottom servo band of width $W_{SB}$ positioned adjacent the bottom guard band of the tape; and forming space for a single data band of width $W_{DB}$ positioned between the top and bottom servo bands and configured to receive tracks of data written by the tape head where the data band width $W_{DB}$ extends over most of the tape width $W_{Tape}$. Thus, embodiments formatting a data storage tape for a single data band extending over most of the tape width advantageously increase data storage capacity. Further, embodiments formatting two servo bands on the storage tape advantageously increase data storage capacity.

Example 25. The limitations of any of Examples 24 and 26-30 where the width of the $$W_{EP.Tape}, \text{ is } \frac{W_{Tape} - 2 \cdot W_{Edge}}{N_E + 1/2}.$$

Thus, embodiments formatting tape parameters within specified ranges determined as a function of selected values, advantageously facilitate preferred or optimized values for such tape parameters.

Example 26. The limitations of any of Examples 24-25 and 27-30 where the width of the servo band on Tape, $W_{SB}$ is within a range of $$\frac{W_{EP.Tape}}{4} - 3 \text{ microns and } \frac{W_{EP.Tape}}{4} + 12 \text{ microns;}$$

and where the top and bottom servo bands are separated by a width $W_{HeadSpan.Tape}$ where: $W_{HeadSpan.Tape}$ is within a range of $$\left(N_E + \frac{1}{4}\right) \cdot W_{EP.Tape} - 3 \text{ microns and } \left(N_E + \frac{1}{4}\right) \cdot W_{EP.Tape} + 12 \text{ microns.}$$

Thus, embodiments formatting two servo bands of reduced width advantageously increase data storage capacity. Further, embodiments formatting tape parameters such as width of the servo bands within specified ranges determined as a function of selected values, advantageously facilitate preferred or optimized values for such tape parameters.

Example 27. The limitations of any of Examples 24-26 and 28-30 where $W_{SB}$ is within a range of 48 microns−3 microns to 48 microns+7 microns. Thus, embodiments formatting tape parameters such as width of the servo bands within specified ranges, advantageously facilitate preferred or optimized values for such tape parameters.

Example 28. The limitations of any of Examples 24-27 and 29-30 where the tape width $W_{Tape}$ is within a range of 12,650 microns±20 microns. Thus, embodiments having tape parameters within specified ranges determined as a function of a value such as tape width within a specified range, advantageously facilitate preferred or optimized values for such tape parameters.

Example 29. The limitations of any of Examples 24-28 and 30 where the top and bottom servo bands are separated by a width $W_{HeadSpan.Tape}$ which is within a range of 11,594 microns±5 microns. Thus, embodiments formatting tape parameters such as separation of the servo bands within specified ranges, advantageously facilitate preferred or optimized values for such tape parameters.

Example 30. The limitations of any of Examples 24-29 where the data band has a sub data band for each writer transducer element of the array of $N_E$ writer transducer elements, and the tape has two servo buffer regions each having a width $W_{SBuf}$ and each being positioned between a servo band and an adjacent sub data band, where: $W_{SB}$ is within a range of 48 microns−3 microns and 48 microns+7 microns. Thus, embodiments having tape parameters such as servo band width within specified ranges, advantageously facilitate preferred or optimized values for such tape parameters.

Example 31: A computer program product, the computer program product comprising a computer readable storage medium having program instructions embodied therewith, the program instructions executable by a processor to cause the processor to perform a method according to any one of Examples 10-16 and 24-30. Thus, embodiments employing a method for a data storage tape having a single data band extending over most of the tape width advantageously increase data storage capacity. Further, embodiments employing a method for a data storage tape having two servo bands on the storage tape advantageously increase data storage capacity.

Example 32: A computer system comprising one or more processors, one or more computer-readable memories and one or more computer-readable, tangible storage devices, and program instructions, stored on at least one of the one or more computer-readable, tangible storage devices for execution by at least one of the one or more processors via at least one of the one or more computer-readable memories, to perform a method according to any of Examples 10-16 and 24-30. Thus, embodiments employing a method for a data storage tape having a single data band extending over most of the tape width advantageously increase data storage capacity. Further, embodiments employing a method for a data storage tape having two servo bands on the storage tape advantageously increase data storage capacity.

Example 33 is an apparatus comprising means to perform a method as claimed in any preceding claim. Thus, embodiments employing a method for a data storage tape having a single data band extending over most of the tape width advantageously increase data storage capacity. Further, embodiments employing a method for a data storage tape having two servo bands on the storage tape advantageously increase data storage capacity.

Example 34 is a machine-readable storage including machine-readable instructions, when executed, to implement a method or realize an apparatus as claimed in any preceding claim. Thus, embodiments employing a data storage tape or a method for a data storage tape having a single data band extending over most of the tape width advantageously increase data storage capacity. Further, embodiments employing a data storage tape or a method for a data storage tape having two servo bands on the storage tape advantageously increase data storage capacity.

Described embodiments provide improvements to computer technology for storing and retrieving data in storage systems such as tape drives, for example, having a tape head having a substrate and an array of writer elements carried on the substrate, to write data to a magnetic tape media. A single band data storage system in accordance with the present description can increase data storage capacity for a tape media of a given size. In one embodiment, the number of servo bands is reduced such that the writer transducer array of the tape head and the single data band to which the tape head writes, each extend over most of the width of the tape. As a result, tape areas formerly used for servo bands between data bands can be used for user data storage within the single data band, thereby increasing data storage capacity of the tape.

Moreover, in another aspect of a single band data storage in accordance with the present description, the widths of each of the remaining servo bands may be reduced. In one embodiment, the single band tape head has at one end of the tape head, an upper or top array of servo elements positioned to read an upper servo band above the single data band. At the other or distal end of the tape head, a lower or bottom array of servo elements is positioned to read a lower servo band below the single data band. By increasing the number of servo elements carried in arrays at each end of the single data band tape head, the width $W_{SB}$ of each of the two servo bands may be decreased, also contributing to increased data storage capacity of the tape.

It is appreciated herein that the lateral data capacity of a tape data storage system can increase with an increase in the element pitch between transducer elements. However, the element pitch is limited by the lateral width of each data band which in turn is limited by the lateral width of adjacent servo bands used to position the head for data reading and writing. By reducing the number of servo bands and increasing the width of the single data band, an increase in element pitch and a corresponding increase in number of tracks and data capacity may be achieved.

Reducing the number of data bands to one (1) and the number of servo bands to two (2) is believed to be a more efficient use of space for highest capacity. In one embodiment, in order to fill the available space with data, an increase in the spacing between elements, termed element pitch, $W_{EP}$ is provided the width of the servo band, $W_{SB}$, generally is sufficient for the elements to span their data sub bands. With a single servo per servo band, this value is $\sim W_{EP}$. It is appreciated herein that increasing the number of servos per servo band reduces the required width $W_{SB}$. Moreover, for optimum track following using servo band transit time, the maximum transit time is preferably short. For a chevron servo pattern, the transit time between adjacent lines in the chevron pattern is shorter near the apex of the chevron pattern and longer at the base of the chevron pattern and increases with higher angles of the chevron pattern. The wider the value for $W_{SB}$, the longer the transit time at the base of the pattern. By decreasing the width $W_{SB}$ of each of the two servo bands, the servo band transit time at the base of the chevron pattern is correspondingly shortened to facilitate track following for precision reading from and writing to tracks of data.

In one embodiment, the tape head is configured to write the single band of data in a plurality of sub data bands, one sub data band for each writer element of an array of writer elements carried by the tape head. In this embodiment, which utilizes four (4) servos per servo band, each sub data band is in turn subdivided into four writer regions referred to herein as quadrants, two of which each receive data written in a forward longitudinal direction of tape travel and two of which each receive data written in a reverse longitudinal direction of tape travel, opposite to that of the forward longitudinal direction.

To control the motion of the tape head relative to the moving tape, the single band tape head has at one end, a servo element for each quadrant to which data is being written to or read from. In one embodiment, the single band tape head has at one end of the tape head, an upper or top array of four servo elements for the four quadrants and, at the other or distal end of the tape head, a lower or bottom array of four servo elements for the four quadrants. Each array of servo elements has an associated top or bottom servo band which is read by servo elements of the tape head to control the motion of the tape head relative to the moving tape.

In one embodiment, within each sub data band, data is written to or read from a single quadrant at a time, using a pair of servo elements for motion control, a servo element from the top array of servo elements and a servo element from the bottom array of servo elements. Thus, there is a pair of top and bottom servo elements assigned to each quadrant of a sub data band. Each pair of servo elements is spaced from the array of writer elements, so each writer element associated with a particular sub data band is positioned within a particular sub data band quadrant associated with the assigned pair of servo elements, when the pair of servo elements is positioned within the top and bottom servo bands, respectively. Thus, a pair of servo elements positioned within the top and bottom servo bands, respectively, control the position of each writer element as data is written in each track in one of the four quadrants in each sub data band. Once, the tracks of data have been written in a particular quadrant in each sub data band, the tape head moves so that a different pair of servo elements is positioned within the top and bottom servo bands, respectively, to control the position of each writer element as data is written in each track in a different quadrant of the four quadrants in each sub data band. In this manner, the top and bottom servo bands may be shared by each pair of servo elements in turn. As a result, the width of each of the servo bands may be reduced by a factor approximately equal to the number of servo elements in each servo element array, as compared to the width of servo bands for a tape head having a single pair of servo elements, for example.

In another aspect of a single data band data storage in accordance with the present description, examples of preferred or optimized values for head parameters such as the element pitch $W_{EP}$ between the writer (or reader) transducer elements of the tape head, and tape parameters such as the servo band width $W_{SB}$, may be determined as a function of selected values. In one embodiment, the selected values include determinable parameters defined by the media, such as the width $W_{Tape}$ of the tape media and widths $W_{Edge}$ of edge guard bands of the tape, for example, transducer element parameters of the tape head such as, the number $N_E$ of writer (or reader) transducer elements, for example, and an operating point value, such as, the track pitch $W_{TP}$, for example. In another aspect, suitable ranges for the element pitch $W_{EP}$ and the servo band width $W_{SB}$ are provided in addition to optimized values for these parameters of single data band data storage in accordance with the present description.

In one embodiment, the top array of servo elements is positioned in a top placement pattern to read the top servo band above the single data band as data is read from or written to the write region quadrants of each sub data band of the single data band. At the other or distal end of the tape head, the bottom array of servo elements is positioned in a bottom placement pattern to read the bottom servo band below the single data band as data is read from or written to the write region quadrants of each sub data band of the single data band. In another aspect of a single data band data storage in accordance with the present description, examples of preferred or optimized values for servo to element spacings of the top and bottom servo placement patterns, may be determined as a function of selected values. In one embodiment, the top and bottom placement patterns may match to provide a symmetric layout of the top and bottom servo placement patterns. In another aspect, suitable ranges for the servo to element spacings of the top and bottom servo placement patterns are provided in addition to optimized values for these parameters of single data band data storage in accordance with the present description.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. Moreover, the figures are schematic figures in which components are represented by shapes simplified for purposes of clarity. In such schematic diagrams, the relative proportional sizes of the various depicted components are not intended to reflect any particular proportional relationships. For example, components such as write transducers typically measured in microns may be depicted disproportionally large with respect to other much larger components such as tape media or tape heads, typically measured in millimeters, for example, for clarity in presentation.

FIG. 1A is a schematic diagram illustrating a storage system which includes a tape drive 100 having a tape head 110 for recording shingled data tracks in a single data band on magnetic tape media 122. As described in greater detail below, the tape drive 100 employs single data band data storage in accordance with the present description, to increase data storage capacity of the tape 122.

While one specific implementation of a tape drive is shown in FIG. 1, it should be noted that the embodiments described herein may be implemented in the context of any type of tape drive system employing magnetic tape media. In some embodiments, the tape drive 100 may represent a half-height tape drive and in other embodiments, the tape drive 100 may represent a full-height tape drive. Furthermore, it is appreciated that embodiments described herein may be implemented in other types of storage devices having write or read heads for storing or retrieval of data on other types of magnetic media, such as disk drives having sliders, for example. Still further, it is appreciated that a tape head in accordance with the present description may also be employed in other types of magnetic systems such as tape servo formatting systems, for example.

As shown, a tape supply cartridge 120 and a take-up reel 121 are provided to support a magnetic tape 122 referred to herein as magnetic tape, or simply tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over the tape head 110. The head 110 includes one or more arrays of transducers such as reader, writer, or servo transducers.

Guides 125 guide the tape 122 across the tape head 110. Such tape head 110 is in turn coupled to a controller 128 via a cable 130. The controller 128 having a memory 134 typically controls head functions such as servo following, writing, reading, etc. The controller may operate under logic known in the art or which may be subsequently developed, modified as appropriate for the tape head 110 of the present description, as well as any logic disclosed herein. The cable 130 may include read/write circuits or channels to transmit data to the head 110 to be recorded on the tape 122 and to receive data read by the head 110 from the tape 122. An actuator 132 is configured to control position of the head 110 relative to the tape 122. An interface of the controller 128 may also be provided for communication between the tape drive and a host (integral or external) or other computer 140 of the storage system to send and receive the data and for controlling the operation of the tape drive and communicating the status of the tape drive to the host, all as will be understood by those of skill in the art.

The storage system represented by the tape drive 100 may include an automated tape library for example, having one or more tape drives 100 docked in the library system. An example of such a tape library is an LTO tape library such as the TS4500 marketed by IBM, which has been modified to include tape drives having single band data storage in accordance with the present description.

The computer 140 represents one or more of host computers, user computers, workstations, storage controllers, or other computers coupled to each other and to the tape drive 100 by one or more networks 150. In one embodiment, a host computer 140 coupled to the tape drive 100 receives requests over a network from user computers to access data in tape cartridges 120 internal to the tape library using tape drives 100 of the tape library.

The computer 140 may be an enterprise computer system in which aspects of a storage system in accordance with the present description may be realized. Examples of enterprise-wide applications include, without limitation, banking transactions, payroll, warehouse, transportation, and batch jobs.

The magnetic tape 122 (FIG. 1) passes over the tape or media facing surfaces 152 of the head 110 in linear, longitudinal forward and reverse (or backward) directions which are generally parallel to the directions represented by an arrow 160. The longitudinal motion of the tape 122 is provided by linear actuators which includes reels 120, 121 (FIG. 1). The linear actuators are configured to move the magnetic tape 122 in the linear, longitudinal directions represented by the arrow 160 past the media facing surfaces 152 of the tape head 110. In this embodiment, the arrow 160 represents the linear, longitudinal directions of motion of the tape caused when being wound and unwound from the reels 120, 121 of the tape drive 100.

As the tape 122 and the head 110 move relative to each other, the tape 122 may be supported by the media facing surfaces 152 of the head 110. Hence, the media facing surfaces are sometimes referred to as media bearing surfaces. The tape 122 and the media facing surfaces 152 of the head 110 are typically in direct contact with each other at least in the region of the tape head where the read and write transducers are located. The head 110 has transducers which provide one or more media facing surfaces 152 of the head 110, and are adapted to at least one of read data from and write data to the magnetic tape 122 moving past the tape head transducers of the head 110. A transducer configured to write data on the tape 122 is referred to herein as a writer transducer, writer element, or simply a "writer."

Figure 1B:
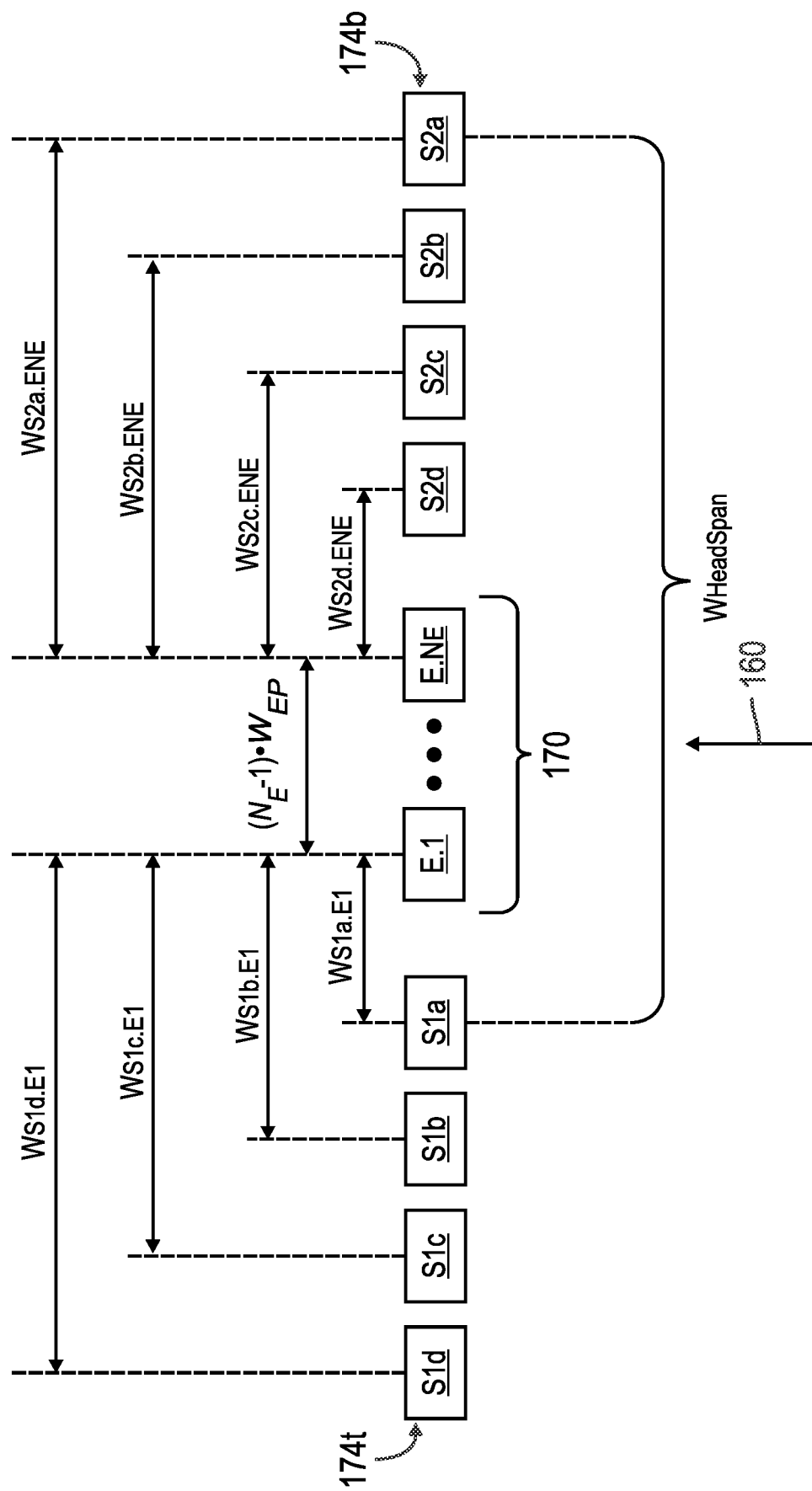
FIGS. 1B-1C depict various embodiments of arrays of transducer elements for the single data band tape head of FIG. 1A.

FIG. 1B is a schematic diagram representing an array 170 of $N_E$ transducer elements E.1. E.2 . . . E.$N_E$ carried by a reader or a writer module of the tape head 110 (FIG. 1A) where $N_E$ is a variable representing the number of transducer elements in the array 170 which may be 64, 128, etc. transducer elements, for example, depending upon the particular application. For reader modules, the elements are reader transducers, and for writer modules, the elements are writer transducers. The transducer elements of the array 170 are spaced at an element pitch of $W_{EP}$. In the illustrated embodiment, the tape head 110 has three modules, a left writer module, a center reader module and a right writer module. In this embodiment, the left writer module has an array 170LW (FIG. 1C) of $N_E$ writer transducer elements $WR_{E.1}$, $WR_{E.2}$ . . . $WR_{E.NE}$ carried by the tape head 110 (FIG. 1A) spaced at an element pitch of $W_{EP}$. The center reader module has an array 170R (FIG. 1C) of $N_E$ reader transducer elements $R_{E.1}$, $R_{E.2}$ . . . $R_{E.NE}$ carried by the tape head 110 (FIG. 1A) and having the same spacings as the array 170LW of $N_E$ writer transducer elements. The right writer module may be fabricated in the same manner as the left writer module and rotated 180 degrees from the orientation depicted in FIG. 1C for the left writer module. Thus the right writer module, like the left writer module, has an array 170RW (FIG. 1C) of $N_E$ writer transducer elements $WR_{E.1}$, $WR_{E.2}$ ... $WR_{E.NE}$ carried by the tape head 110 (FIG. 1A) and spaced at an element pitch of $W_{EP}$, and top and bottom servo arrays 174t. 174b, in which the arrays are aligned in the same manner as those of the left writer module.

Figure 1C:
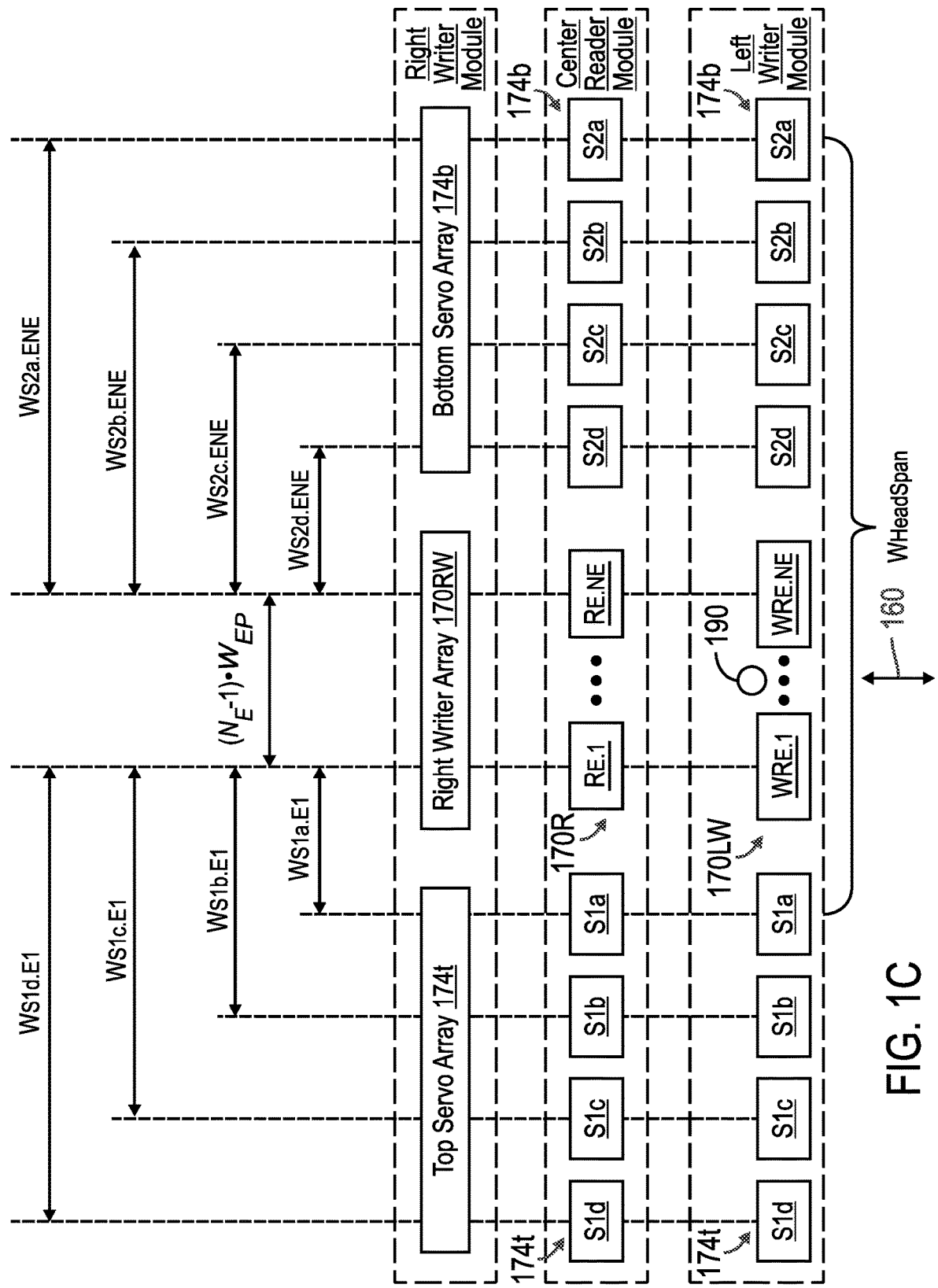

For purposes of clarity, FIG. 1B depicts just a single array 170 of $N_E$ transducer elements which can represent either an array 170LW or 170RW of $N_E$ writer transducer elements of the left or right writer module, or the array 170R of $N_E$ reader elements of the center reader module of the tape head 110. Thus, the top writer element of the array 170LW of $N_E$ writer elements of the left writer module (FIG. 1C), for example, is referred to herein as the writer element $WR_{E.1}$ since it is represented by the transducer element E.1 of FIG. 1B. In the same manner, the top writer element of the array 170RW of $N_E$ writer elements of the right writer module (FIG. 1C), for example, is referred to herein as the writer element $WR_{E.1}$ since it is represented by the transducer element E.1 of FIG. 1B. Similarly, the top reader element of the array 170R of $N_E$ reader elements of the center reader module is referred to herein as the reader element $R_{E.1}$ since it is also represented by the transducer element E.1 of FIG. 1B. In the illustrated embodiment, the arrays 170, 170LW, 170R, 170RW of $N_E$ transducer elements are each generally a linear array spaced at an element pitch of $W_{EP}$ and oriented generally transverse to the longitudinal forward and reverse (or backward) direction of travel of the tape 122 as represented by then arrow 160 (FIGS. 1A-1C).

In one embodiment, the single band tape head 110 has at one end of the tape head, an upper or top array 174t of four servo elements S1a, S1b, S1c, S1d, positioned in a top placement pattern to read an upper servo band above the single data band. At the other or distal end of the tape head 110, a lower or bottom array 174b of four servo elements S2a, S2b, S2c, S2d is positioned in a bottom placement pattern to read a lower servo band below the single data band. As explained in greater detail below, by increasing the number of servo elements carried in arrays at each end of the single data band tape head, the width of each of the two servo bands may be decreased, also contributing to increased data storage capacity of the tape.

As noted above, the array 170 (FIG. 1B) of $N_E$ transducer elements E.1, E.2 ... E.$N_E$ carried by the tape head 110 (FIG. 1A) may have as many as $N_E$=64, 128 or more writer transducer elements, and a corresponding number $N_E$=64, 128 or more reader transducer elements, for example. Thus, the arrays 170, 170LW, 170R, 170RW of $N_E$ transducer elements are not depicted in FIGS. 1B-1C proportionally in length to the servo arrays 174t, 174b, but are schematically represented for purposes of clarity. In one embodiment, each array 170, 170LW. 170R, 170RW of $N_E$ transducer elements extends over most of the width of the tape 122 (FIG. 1A). As a result, as explained in greater detail below, tape areas formerly used for servo bands between data bands can be used for user data storage within the single data band, thereby increasing data storage capacity of the tape. For purposes of clarity, the transducer elements of FIG. 1B are depicted schematically and do not represent actual shapes or proportions.

FIGS. 2A, 2B show in schematic form, a simplified example of two linear, longitudinal data tracks 202a, 202b written on the tape 122 (FIG. 1) by a writer 210 of the tape bearing surface of the head 110 (FIG. 1) in two different lateral positions of the head 110 and hence the writer 210 relative to the tape 122. The writer 210 represents one of the writer transducer elements of the array 170LW (FIG. 1C) such as the transducer element $WR_{E.1}$, for example.

The track 202 is written first by the writer 210 on the tape 122 as shown in FIG. 2A. The track 202a is written as the tape 122 is moved past the writer 210 of the head 110 in a forward tape direction which is left to right as viewed in the example of FIG. 2A. As used herein, the term "data" written on a magnetic tape includes data such as user data which may be written by a tape drive, for example, and servo data which may be written by a tape servo formatting system, for example.

Note that various types of read/write heads could be formed. FIG. 1B shows the format for a module of a 3-module head, which can be formed by: a left writer (LW) module, a center reader (CR) module, and a right writer (RW) module. The CR module reads data written by both LW and RW modules. During writing operations, when tape travels from left-to-right, the LW module writes data and the CR module read verifies. During writing operations, when tape travels from right-to-left, the RW module writes data and the CR module read verifies. During read-only operations, the CR module again reads for both left and right tape motion. FIG. 1B is a schematic representation of one such module in which the transducer elements, E.n are writers W.n for write modules or readers R.n for reader modules.

It is appreciated that other module designs may be suitable depending upon the particular application. For example, a "piggy-back" module may have both readers and writers in the same module and utilize only two such "identical" modules rotated 180 degrees from one another and with all elements and servos aligned. During write operations, one module writes and the other read verifies. The elements are aligned vertically with tape moving left-to-right or right-to-left. Thus, for tape motion from left-to-right, the writers on the left module write and the readers on the right module read. Conversely, for tape motion from right to left, the writers on the right module write and the readers on the left module read.

In the example of FIGS. 2A-2C, the writer 210 is positioned behind the tape 122 and therefore is depicted schematically in phantom. The writer 210 has one or more media facing surfaces 152w facing the tape 122 as the tape 122 moves past the writer 210.

The forward tape direction of the tape 122 relative to the head 110, is represented by a vector 160f superimposed over the media facing surfaces 152w of the writer 210. The media facing surfaces 152w of the writer 210 are generally planar but is appreciated that such generally planar media facing surfaces may be slightly curved in whole or in part to reduce the potential for tape damage as the tape moves past the writer 210.

The forward tape direction vector 160f is generally parallel to the linear, longitudinal direction of movement of the tape 122 as represented by the arrow 160 of FIG. 1. As a result, the track 202a as it is written, defines a linear, longitudinal axis x parallel to the linear, longitudinal forward motion of the tape 122 as represented by the vector 160f. The track 202a has longitudinal top and bottom edges 208a1, 208a2 which are generally parallel to the longitudinal axis x of the track 202a, and the forward tape direction vector 160f of movement of the tape 122.

In this example, the "forward" tape direction represented by the vector 160f represents the linear, longitudinal direction of motion of the tape 122 past the writer 210 caused when the tape is being unwound from the supply reel of the cartridge 120 (FIG. 1) and is being wound onto the take up reel 121 of the tape drive 100. Conversely, the "reverse" tape direction represented by the vector 160r (FIG. 4) represents the linear, longitudinal motion of the tape caused when the tape is being wound onto the supply reel of the cartridge 120 (FIG. 1) and is being unwound from the take up reel 121 of the tape drive 100. It is appreciated that forward and reverse tape directions of the tape 122 may be defined in an opposite manner or using other tape actuation components, depending upon the particular application.

After completing the writing of the first track 202a in the forward tape direction, and then completing the writing of a track (not shown) in the reverse tape direction of tape motion at a different lateral head position, the head 110 and the writer 210 carried on the head 110 (FIG. 1) is again moved laterally relative to the tape 122 to the lateral position depicted in FIG. 2B to write the next forward tape motion track 202b as shown in FIG. 2B. Tape drive lateral actuators 132 (FIG. 1) are configured to cause lateral motion of the head 110 in a direction represented by an arrow 222 which is generally parallel to the lateral head motion. The direction of lateral motion as represented by the arrow 222 is generally transverse to, or in this embodiment, orthogonal to that of the linear, longitudinal forward tape direction 160f of the tape 122 relative to the head 110. As viewed in FIGS. 2A, 2B, the direction of lateral motion represented by the arrow 222 may be referred to as an "up" or "down" motion, relative to the linear, longitudinal directions 160 (FIG. 1), 160f of movement of the tape 122 past the writer 210.

At the subsequent lateral position of the writer 210 depicted in FIG. 2B, the track 202b is written on the tape 112 (FIG. 1) as the tape is again moved forward past the stationary writer 210 of the head 110 in the forward tape direction parallel to the vector 160f. As a result, the track 202b as it is written, defines a longitudinal axis x parallel to the linear, longitudinal forward motion of the tape 122 past the writer 210 as represented by the vector 160f. The longitudinal top and bottom edges 208b1, 208b2 of the track 202b are generally parallel to the longitudinal axis x of the track 202b and the forward tape direction 160f of the tape 122 past the head 110.

In the example of FIGS. 2A-2B, the writer 210 writes the tracks so that each track 202a, 202b when initially written has an initial width (indicated as Width0 in FIG. 2A) which is wider the desired target track pitch, to enable features such as read while write verification or backwards write compatibility, or both. However, the tracks 202a, 202b are written in a "shingled" format in reduce the effective width of each shingled track and hence reduce the pitch of the shingled tracks. Thus, in the example of FIG. 2B, the newly written forward motion track 202b is written below but partially overwrites the previously written neighboring forward motion track 202a (FIG. 2A), leaving a residual neighboring track 202a' having a substantially smaller width (indicated as Width0' in FIG. 2B). This overlapping by track 202b over the previously written adjacent track 202a (FIG. 2A) leaving a residual track 202a' (FIG. 2B), is similar to the spatial overlapping of shingles on a roof, hence the tracks 202a', 202b (FIG. 2B) are referred to herein as being shingled tracks.

To write another forward motion track 202c (FIG. 2C) after completing the writing of the track 20b and then completing the writing of a reverse motion track (not shown) at a different lateral head position, the writer 210 on the head 110 is again subsequently moved laterally relative to the tape 122 in the direction of arrow 222 to the lateral position of FIG. 2C, to write forward motion track 202c as shown in FIG. 2C. At this subsequent lateral position of the writer 210, the track 202c is written on the tape 112 as the tape is again moved past the writer 210 in the forward tape direction represented by the vector 160f. In the example of FIG. 2C, the newly written forward tape motion track 202c is written below and partially overwrites the previously written neighboring forward tape motion track 202b (FIG. 2B), leaving a residual neighboring track 202b' with the final target track pitch $W_{TP}$ (FIG. 2C) equal to the Width0'(FIG. 2B) of each shingled track and is also the spacing between residuals tracks 202a', 202b' as shown in FIG. 2C. The track pitch direction is represented by a y axis orthogonal to the x axis, which define an x, y coordinate system in the plane of the tape 122.

Figure 3:
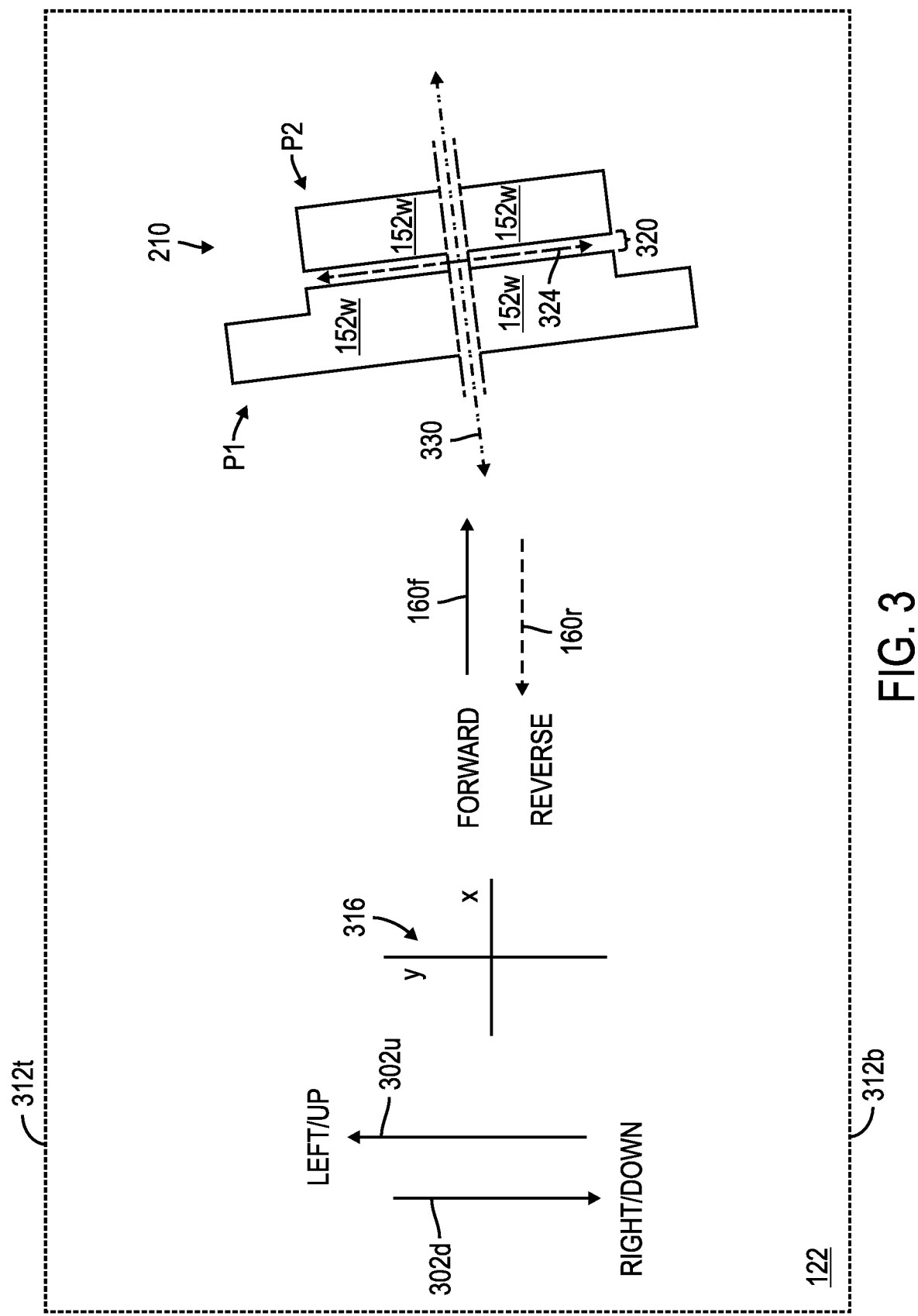
FIG. 3 is a diagram illustrating an embodiment of spatial directions relative to longitudinal tape motion, lateral tape head motion, and lateral pitch direction for single band data storage in accordance with one embodiment of the present description.

FIG. 3 depicts a schematic representation of the longitudinal tape 122 (depicted in phantom) positioned over tape facing surfaces 152w of poles P1, P2 of the writer 210. In this example, the "up" spatial direction is defined with respect to the direction of forward movement of the tape as represented by the vector 160f. More specifically, the "up" spatial direction is represented by a vector 302u which is transverse to the tape forward tape direction vector 160f and is directed to an observer's left or counter-clockwise direction with respect to the forward tape direction vector 160f. Conversely, the "down" spatial direction is represented by a vector 302d which is also transverse to the tape forward tape direction vector 160f but is directed to an observer's right or clockwise direction with respect to the forward tape direction vector 160f.

If the tape 122 is moving in the backward or reverse tape direction as represented by the vector 160r, the "up" and "down" directions defined herein remain unchanged in these examples. Accordingly, the "up" spatial direction remains defined by the vector 302u which is transverse to the tape reverse tape direction vector 160r but is directed to the observer's right or clockwise direction with respect to the tape reverse tape direction vector 160r. Similarly, the down spatial direction remains represented by the vector 302d which is also transverse to the reverse tape direction vector 160r but is directed to the observer's left or counter-clockwise direction with respect to the reverse tape direction vector 160r.

In accordance with this "up" and "down" direction convention, the tape 122 has an upper longitudinal edge 412p which is referred to herein as the "top" edge 312t, and a lower longitudinal edge 312b referred to as the "bottom" edge 312b as shown in FIG. 4. In this example, the up direction vector 302u points toward the tape top edge 312t and the down direction vector 302d points toward the tape bottom edge 312b.

It is seen that the forward and reverse tape direction vectors 160f, 160r and the upper and lower spatial direction vectors 302u, 302d can define an x, y coordinate system 316 in the plane of the tape in which the forward and reverse tape direction vectors 160f, 160r are parallel to the x axis and the up and down spatial direction vectors 302u, 302d are parallel to the y axis and orthogonal to the x axis. Accordingly, the x axis defines a direction of tape motion and the y axis orthogonal to the x axis, defines a direction of track pitch (FIG. 2C) orthogonal to the direction of tape motion.

In one embodiment, the writer 210 is a ring writer transducer, which includes two poles made of ferro-magnetic material and referred to herein as P1 and P2. The poles P1, P2 are separated at one end to form a gap 320 adjacent the moving tape. The gap 320 between the poles P1, P2 defines an axis 324 parallel to the edges of the gap 320. A center axis 330 of the poles P1, P2 of the writer 210 is transverse to the gap axis 324 and in the illustrated embodiment, is orthogonal to the gap axis 324.

An electromagnetic coil (not shown) when energized generates a magnetic field which bridges the gap 320 (FIGS. 3A-3C, 4) between the two poles P1, P2 to form a write bubble which writes data on the moving tape 122. The polarity of the magnetic field bridging the gap 320 may be reversed back and forth as the tape moves past the gap to create transitions in the ferromagnetic material of the tape to encode digital data. For purposes of simplicity, FIG. 3 depicts a single writer 210 which may be one of the writer transducer elements of the array 170LW of the left module. Not shown is a corresponding reader transducer element of the array 170R of the center reader module which would be placed to the right of the left writer module writer 210 of FIG. 3 and a corresponding writer transducer element of the right writer module, which would be placed to the right of the reader of the center reader module of FIG. 1C. As noted above, in one embodiment, the right writer module RW and left writer module LW are substantially identical parts but the right writer module RW is rotated 180 degrees relative to the left writer module LW and the centers of all NE writer elements and the servos are aligned vertically so the centers of all elements are aligned as shown in FIG. 1C. The right writer (RW) module writes when the tape moves right-to-left so that pole P1 (FIG. 3) is the leading edge and pole P2 is the trailing edge. In this manner, a single writer module design may be used for both left and right writer modules and can function with pole P2 as the trailing edge. Thus, in one embodiment, when the tape 122 is moving in the forward tape direction represented by the vector 160f (FIG. 3), the pole P1 is the leading pole of the writer 210 and the pole P2 is the trailing pole of the writer 210.

In another embodiment, the writer 210 of the left writer (LW) module may be rotated 180 deg from the view shown in FIG. 3 so that pole P1 is to the right and pole P2 is the leading edge and P1 is the trailing edge. In this embodiment, a writer of the right writer (RW) module, then would be in the same orientation as the writer transducer 210 shown in FIG. 3 and would also have P2 as the leading edge and P1 as the trailing edge. In one aspect of a single data band tape head in accordance with the present description, the symmetric design described herein provides a capability of using the same writer module design for pole P1 trailing as well as for pole P2 trailing.

Figure 4A:
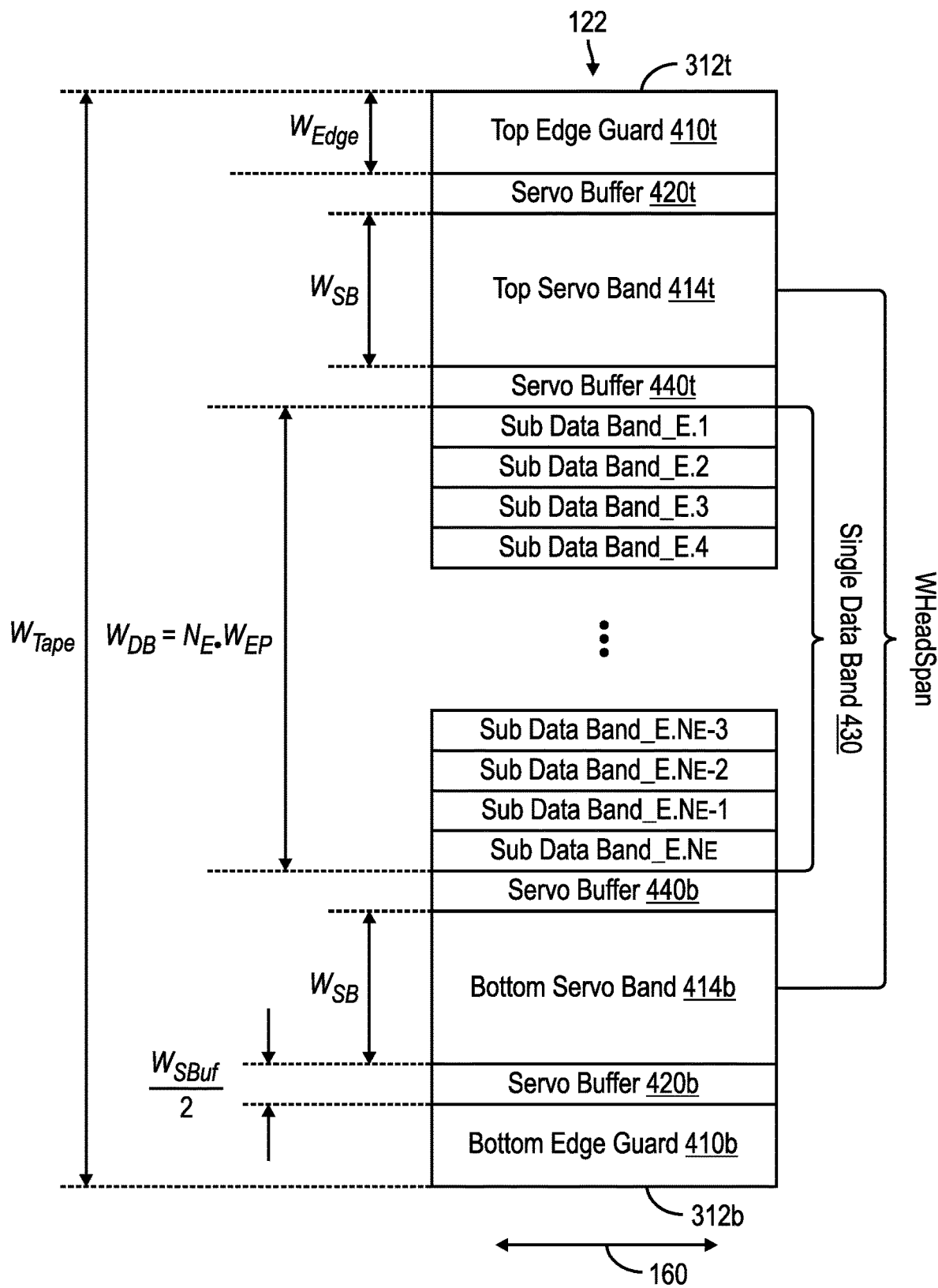
FIGS. 4A, 4B depict an embodiment of longitudinal regions of a tape employing single band data storage in accordance with the present description.

FIG. 4A depicts in schematic form one example of regions of a tape 122 suitable for use with a single data band tape head 110 (FIG. 1) in accordance with the present description. In this embodiment, the tape 122 has a width $W_{Tape}$ which extends between the longitudinal edges 312t, 312b of the tape 122. The tape head 110 has an array of $N_E$ writer elements and $N_E$ reader elements. The regions of the tape 122 include a top edge guard band 410t having a width $W_{Edge}$ at the top longitudinal tape edge 312t, and a bottom edge guard band 410b also having a width $W_{Edge}$ at the bottom longitudinal tape edge 312b of the tape 122.

In one aspect of a single band data storage in accordance with the present description, the tape 122 of this embodiment has just two servo bands, a top servo band 414t having a width $W_{SB}$ positioned below the top edge guard 410t and a bottom servo band 414b also having a width $W_{SB}$ and positioned above the bottom edge guard 410b. In one embodiment, the number of servo bands is reduced to two servo bands 414t, 414b. As a result, tape regions formerly used for servo bands between data bands can be used for user data storage within the single data band, thereby increasing data storage capacity of the tape. In the illustrated embodiment, the top servo band 414t is separated from the top edge guard band 410t by a top servo buffer region 420t and similarly, the bottom servo band 414b is separated from the bottom edge guard band 410b by a bottom servo buffer region 420b. The servo buffer regions 420t, 420b have a combined width $W_{SBuf}$ such that each servo buffer region 420t, 420b has a width $W_{SBuf}/2$.

In another aspect of single band data storage in accordance with the present description, the tape 122 of this embodiment has just a single data band 430 having a width $W_{DB}$ which extends over most of the width $W_{Tape}$ extending between the top and bottom longitudinal edges 312t and 312b, respectively, of the tape 122. As explained in greater detail below, by increasing the width of the single data band 430, the element pitch $W_{EP}$ between adjacent transducer elements of the arrays 170, 170LW. 170R. 170RW (FIGS. 1B, 1C) may be increased for a tape having a given width $W_{Tape}$, such that such that data storage capacity of the tape 122 may also be increased.

The single data band 430 is sub-divided into $N_E$ sub data bands, that is, sub data band_E.1, sub data band_E.2 . . . sub data band_E.$N_E$, such that there is a sub data band associated with each transducer element of the array 170 (FIG. 1B) of $N_E$ transducer elements carried by the single data band tape head 110. As a result, the array 170 of $N_E$ transducer elements, like the width $W_{DB}$ of the single data band 430, extends over most of the width $W_{Tape}$ of the tape 122.

As noted above, the array 170 (FIG. 1B) of $N_E$ transducer elements represents the each of the writer arrays 170LW. 170RW (FIG. 1C) of writer elements carried by the tape head 110 and also represents the array 170R of reader elements carried by the tape head 110. Thus, each sub data band is associated with both a writer element and a reader element of the tape head 110. The particular writer element associated with a particular sub data band writes the data within the boundaries of the associated sub data band. In a similar manner, each reader element of the array of $N_E$ reader elements is associated with one of the $N_E$ sub data bands and reads the data within the boundaries of the associated sub data band. By increasing the element pitch $W_{EP}$ between adjacent transducer elements of the arrays 170, 170LW. 170R, 170RW (FIGS. 1B, 1C) for a tape having a given width $W_{Tape}$, the width of each sub data band may be increased, thereby increasing the number of tracks which may be written in each sub data band, such that data storage capacity of the tape 122 may also be increased.

The top and bottom servo bands 414t, 414b, respectively, are used to control the lateral position of the tape head 110 (FIG. 1) relative to the moving tape 122, while data is written to (or read from) the single data band 430. As noted above, the top servo band 414t is separated from the top edge guard band 410t by a top servo buffer region 420t and the bottom servo band 414b is separated from the bottom edge guard band 410b by a bottom servo buffer region 420b. The top servo band 414t is similarly separated from the top sub data band_E.1 by a top servo buffer region 440t and the bottom servo band 414b is separated from the bottom sub data band_E.$N_E$ by a bottom servo buffer region 440b. Each servo buffer region 420t, 420b, 440t, 440b has a width $W_{SBuf}/2$ and provides tolerances for writing servo patterns in the adjacent servo bands 414t, 414b.

Figure 4B:
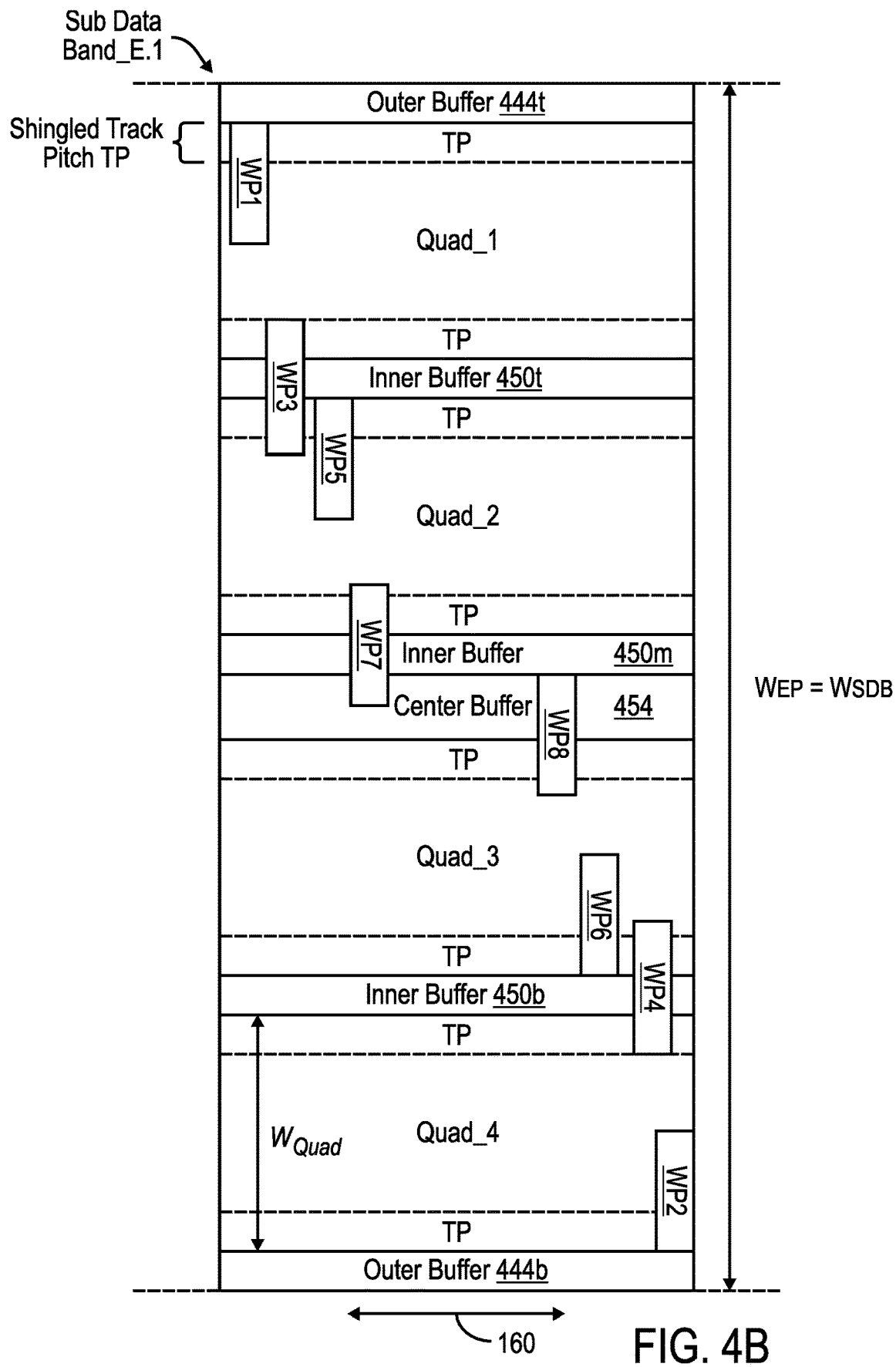

FIG. 4B depicts in schematic form a more detailed example of a sub data band which in this example is the top sub data band_E.1, and is representative of each of the $N_E$ sub data bands, sub data band_E.1, sub data band_E.2 . . . sub data band_E.$N_E$ of the single data band 430 (FIG. 4A). In this embodiment, each sub data band has a width $W_{EP}$, where $W_{EP}$ is the element-to-element separation or pitch between adjacent transducer elements of the array 170 (FIG. 1B) of $N_E$ transducer elements of the single band tape head 110 (FIG. 1). Thus, the width $W_{DB}$ of the single data band 430 is equal to $N_E$, the number of transducer elements of the writer or reader array, times $W_{EP}$, the element-to-element separation or pitch between adjacent transducer elements of the array 170 (FIG. 1B) of $N_E$ transducer elements of the single band tape head 110 (FIG. 1). By increasing the element pitch $W_{EP}$ between adjacent transducer elements of the arrays 170, 170LW, 170R, 170RW (FIGS. 1B, 1C) for a tape having a given width $W_{Tape}$, the width of each sub data band may be increased, thereby increasing the number of tracks which may be written in each sub data band, such that data storage capacity of the tape 122 may also be increased.

As noted above, the writer element associated with each sub data band writes the data within the boundaries of the associated sub data band. In this example, the writer element associated with the sub data band_E.1 is the top-most writer element $WR_{E.1}$ (FIG. 1C) of the array 170LW of writer elements, as represented by the top-most transducer element E.1 (FIG. 1B) of the array 170 of $N_E$ transducer elements of the single band tape head 110 (FIG. 1). In a similar manner, the top-most reader element $R_{E.1}$ (FIG. 1C) of the array 170R of $N_E$ reader elements is associated with the sub data band_E.1 depicted in FIG. 4B, and reads the data within the boundaries of the associated sub data band_E.1.

As shown in FIG. 4B, each sub data band as represented by the sub data band_E.2, is subdivided into four writer regions or quadrants, quad_1, quad_2, quad_3 and quad_4. The top two quadrants, quad_1, quad_2, each receive data written in a forward longitudinal direction of tape travel parallel to the direction of travel of the tape 122 as represented by the arrow 160 (FIGS. 1A, 4B). Similarly, the bottom two quadrants, quad_3, quad_4, each receive data written in a reverse longitudinal direction opposite to that of the forward longitudinal direction and parallel to the direction of travel of the tape 122 as represented by the arrow 160 (FIGS. 1A, 4B).

As explained in greater detail below, the servos of the top and bottom servo arrays 174t. 174b operate in pairs, one servo from the top array 174t (FIG. 1B) and one from the bottom array 174b such that there are four pairs of servos, each pair being associated with one of the four quadrants of each sub data band. Thus, a pair of servo elements positioned within the top and bottom servo bands 414t, 414b, respectively, control the position of each writer element as data is written in a track in one of the four quadrants in each sub data band. Once, the track of data has been written in a particular quadrant in each sub data band, the tape head moves so that a different pair of servo elements is positioned within the top and bottom servo bands 414t, 414b., respectively, to control the position of each writer element as data is written in a track in a different quadrant of the four quadrants in each sub data band.

In this manner, the top and bottom servo bands 414t, 414b may be shared by each of the four pairs of servo elements in turn. As a result, the width $W_{SB}$ (FIG. 4A) of each of the servo bands 414t, 414b, may be reduced by a factor approximately equal to the number of servo elements in each servo element array 174t (FIG. 1B), 174b, as compared to the width of servo bands for a tape head having a single pair of servo elements, for example. In one embodiment, the width $W_{SB}$ (FIG. 4A) of each servo band 414t, 414b is approximately one fourth the transducer element pitch $W_{EP}$ in one embodiment. By comparison, in one known design, having five servo bands instead of two, the width of each of the five servo bands is approximately equal to the transducer element pitch in that design.

The sub data bands each include portions of an outer buffer having a width $W_{OutBuf}$ which separates adjacent quadrants of adjacent sub data bands to protect against overwriting in an adjacent sub data band. For example, a top outer buffer portion 444t of the sub data band_E.2 (FIG. 4A) is positioned over quad_1 of the sub data band_E.2, and a bottom outer buffer portion 444b of the sub data band_E.2 is positioned below quad_4 of the sub data band_E.2. Thus, the top outer buffer portion 444t of the sub data band_E.2, together with the bottom outer buffer portion of the sub data band_E.1 (FIG. 4A), separate the top and bottom quadrants of the sub data band_E.2 and sub data band_E.1 (FIG. 4A), respectively. Similarly, the bottom outer buffer portion 444b of the sub data band_E.2, together with the top outer buffer portion of the sub data band_E.3 (FIG. 4A) separate the bottom and top quadrants of the sub data band_E.2 and sub data band_E.3, respectively.

Each sub data band as represented by the sub data band_E.1 (FIG. 4B) further includes three inner buffers, a top inner buffer 450t, a middle inner buffer 450m, and a bottom inner buffer 450b, each of which has a width $W_{InBuf}$ a to protect against overwriting in an adjacent quadrant of the sub data band. Thus, the top inner buffer 450t separates the top two quadrants quad_1 and quad_2 of the sub data band, the middle inner buffer 450m separates the middle two quadrants quad_2 and quad_3 of the sub data band, and the bottom inner buffer 450b separates the bottom two quadrants quad_3 and quad_4 of the sub data band. A center buffer having a width WCenterBuf also separates the middle two quadrant write regions, quad_2 and quad_3.

Table 1 below provides examples of definitions of variables used herein.

TABLE 1

Definition of terms

| Symbol | Term | Symbol | Term | Symbol | Term |
| --- | --- | --- | --- | --- | --- |
| $W_{Tape}$ | Tape Width | $W_{EP}$ | Element Pitch | $W_{Edge}$ | Edge Guard Width |
| $N_{DB}$ | # Data Bands | $W_W$ | Writer Width | $W_{OutBuf}$ | Outer Buffer Width |
| $N_E$ | # Elements | $W_S$ | Servo Width | $W_{InBuf}$ | Inner Buffer Width |
| $W_{SB}$ | Servo Band Width | $W_R$ | Reader Width | $W_{CenterBuf}$ | Center Buffer Width |
| $W_{DB}$ | Data Band Width | $W_{TP}$ | Track Pitch | $W_{SBuf}$ | Servo Buffer Width |
| $W_{Quad}$ | Width of sub data band Quads using a pair of servos | | | $N_{trk}$ | # tracks per Element |
| $W_{S1j.E1}$ | Spacing from Top Servos S1j {j = a, b, c, d} to Element E1 | $W_{S2j.ENE}$ | Spacing from Bottom Servos S2j {j = a, b, c, d} to Element $N_E$ | $W_{headSpan}$ | Distance between paired servos: $S1_j$ – to – $S2_j$ |

In another aspect of a single data band data storage in accordance with the present description, examples of preferred values for the element pitch $W_{EP}$ (FIG. 4B) between the writer (or reader) transducer elements E.1, E.2, . . . E.$N_E$ (FIGS. 1B, 1C) of the tape head 110, and the servo band width $W_{SB}$ (FIG. 4A), for example, may be determined in one embodiment, as a function of selected values defined by the media, such as the width $W_{Tape}$ of the tape 122 (FIG. 1) and widths of edge guard band of the tape for example, transducer element parameters of the tape head 110 (FIG. 1), such as, the number $N_E$ (FIG. 1C) of writer (or reader) transducer elements E.1, E.2, . . . E.$N_E$ (FIG. 1B), for example, and an operating point value, such as, the track pitch $W_{TP}$, for example. In one embodiment, each edge guard band region is neither used for servo pattern nor data patterns. It is appreciated that the values selected as determinable, predetermined or given values, and the values to be calculated based upon selected values, may be varied, depending upon the particular application.

Figure 5:
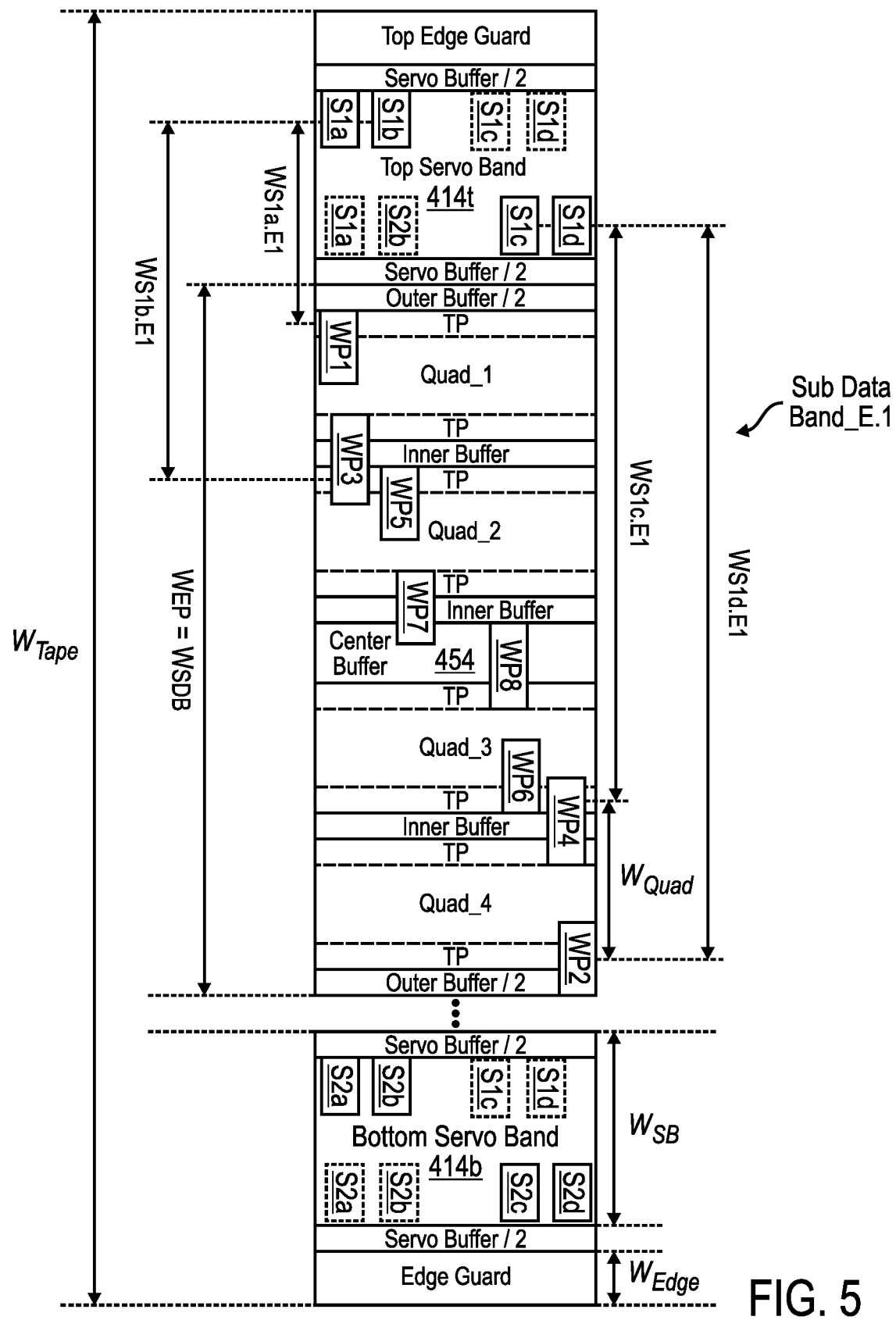
FIG. 5 depicts an embodiment of transducer element motions in servo bands and a sub data band for a tape head and tape employing single band data storage in accordance with the present description.

FIG. 5 is a schematic representation of regions of the tape 112 depicting both servo bands 414t, 414b, but only a single sub data band such as the sub data band_E.1, is represented for purposes of clarity in connection with a description of the motions of servo elements and transducer elements. Because the transducer elements of each array are aligned with the same spacing, $W_{EP}$, in one embodiment, they will follow the same motions in that embodiment.

As best seen in FIG. 4A, the tape width $W_{Tape}$ is an accumulation of the widths of the following tape regions:

$$W_{Tape} = 2 \cdot (W_{Edge} + W_{SB} + W_{SBuf}) + W_{DB} \qquad 2$$

where $W_{Edge}$, $W_{SB}$ and $W_{SBuf}$ are the widths of each edge guard band 410t, 410b, each servo band 414t, 414b, the combined widths of the servo buffers 420t, 440t (or 420b, 440b) and the single data band 430, respectively. The width of the single data band, $W_{DB}$, is turn given as a function of the number $N_E$ of transducer elements in the array 170 (FIGS. 1B, 1C) times the element pitch $W_{EP}$ as follows:

$$W_{DB} = N_E \cdot W_{EP}. \qquad 3$$

Combining Equations 2 and 3 gives:

$$W_{Tape} = 2 \cdot (W_{Edge} + W_{SB} + W_{SBuf}) + N_E \cdot W_{EP}. \qquad 4$$

In this example, the widths $W_{Tape}$, $W_{SBuf}$, and $W_{Edge}$ and $N_E$, the number of transducer elements in each array 170 (FIG. 1B) are readily determinable. Accordingly, the two unknowns in Equation 4 are the element pitch $W_{EP}$ and the width $W_{SB}$ of each servo band 414t, 414b (FIGS. 4A, 5).

FIG. 5 depicts the top servo band 414t and the top sub data band, that is, sub data band_E.1, which is representative of each of the sub data bands, sub data band_E.1, sub data band_E.2 . . . sub data band_E.NE, of the single data band 430 FIG. 4A. As noted above, in the illustrated embodiment, data is written in each sub data band in four write regions referred to herein as "quadrants," that is, quad_1, quad_2, quad_3 and quad_4. As explained in greater detail below, the number of write regions in each sub data band is a function of the number of servo transducer elements in each servo element array 174t, 174b, which is four servo transducer elements in each servo element array in the illustrated embodiment. It is appreciated that the number of servo element transducers and corresponding number of write regions in each sub data band may vary depending upon the particular application. In one embodiment, the number of servo element transducers in each servo element array and the corresponding number of write regions in each sub data band is selected from 1, 2, 4, . . . $N_S$ where $N_S$ is an even integer.

The total number of tracks written in the four quadrants of each sub data band is represented herein by the variable $N_{trkR}$. The width of each track, that is, the track pitch $W_{TP}$, is, in this embodiment, a predetermined value selected by the operator. With a total of $N_{trkR}$ tracks written at a track pitch of $W_{TP}$, each quadrant, quad_1, quad_2, quad_3 and quad_4, spans a width $W_{Quad}$ of:

$$W_{Quad} = \left(\frac{N_{trkR}}{4}\right) \cdot W_{TP} \qquad 5$$

In one embodiment, within each sub data band, data is written to or read from a single quadrant at a time. Quad_1 is written in the forward tape direction as represented by the vector 160f (FIG. 3), and quad_4 is written in the reverse tape direction as represented by the vector 160r (FIG. 3). Each quad, quad_1, quad_4, receives $N_{trk}/4$ shingled tracks of at a track pitch of $W_{TP}$. As best seen in FIG. 5, the top writer transducer $WR_{E.1}$ represented by the transducer element E.1 (FIG. 1B) and associated with the top sub data band_E.1 of FIG. 5, is initially positioned at the top of write region quad_1 of the sub data band_E.1, to write the first track of write region quad_1. The position of the top writer transducer $WR_{E.1}$ (FIG. 1C) while writing the first track of write region quad_1 is represented schematically as writer position WP1 in FIG. 5. Upon completing the first track of write region quad_1, the top writer transducer $WR_{E.1}$ (FIG. 1C) associated with the top sub data band_E.1 of FIG. 5, is repositioned at the bottom of write region quad_4 to write the first track of write region quad_4. The position of the top writer transducer $WR_{E.1}$ (FIG. 1C) while writing the first track of write region quad_4 is represented graphically as writer position WP2 in FIG. 5.

Upon completing the first track of write region quad_4, the top writer transducer $WR_{E.1}$ (FIG. 1C) is repositioned near the top of write region quad_1 to write the next track of write region quad_1 below the first track of the write region quad_1. This next track is spaced below the first track by the track pitch $W_{TP}$ to shingle the previously written first track of the write region quad_1. Upon completing that track of write region quad_1, the top writer transducer $WR_{E.1}$ (FIG. 1C) is repositioned near the bottom of write region quad_4 to write the next track of write region quad_4 above the first track of the write region quad_4. This next track of write region quad_4 is spaced above the first track of write region quad_4 by the track pitch $W_{TP}$ to shingle the previously written first track of the write region quad_4.

The remaining tracks are written in the write regions quad_1, quad_4 in this manner, top-to-bottom in write region quad_1 and bottom-to-top in write region quad_4. The position of the top writer transducer $WR_{E.1}$ (FIG. 1C) while writing the last track of write region quad_1 is represented schematically as writer position WP3 in FIG. 5. The position of the top writer transducer $WR_{E.1}$ (FIG. 1C) while writing the last track of write region quad_4 is represented schematically as writer position WP4 in FIG. 5.

Following completion of writing the tracks of write regions quad_1, quad_4 of each sub data band, data is written to the write regions quad_2, quad_3 of each sub data band in a manner similar to that described above for write regions quad_1, quad_4, respectively Thus, write region quad_2 is written in the forward tape direction as represented by the vector 160f (FIG. 3), and quad_3 is written in the reverse tape direction as represented by the vector 160r (FIG. 3). Each quad, quad_2, quad_3, receives $N_{trk}/4$ shingled tracks of at a track pitch of $W_{TP}$.

As best seen in FIG. 5, the top writer transducer $WR_{E.1}$ (FIG. 1C) associated with the top sub data band_E.1 of FIG. 5, is positioned at the top of write region quad_2 to write the first track of write region quad_2. The position of the top writer transducer $WR_{E.1}$ (FIG. 1C) while writing the first track of write region quad_2 is represented schematically as position WP5 in FIG. 5. Upon completing the first track of write region quad_2, the top writer transducer $WR_{E.1}$ (FIG. 1C) associated with the top sub data band_E.1 of FIG. 5, is repositioned at the bottom of write region quad_3 to write the first track of write region quad_3. The position of the top writer transducer $WR_{E.1}$ (FIG. 1C) while writing the first track of write region quad_3 is represented schematically as writer position WP6 in FIG. 5.

Upon completing the first track of write region quad_3, the top writer transducer $WR_{E.1}$ (FIG. 1C) is repositioned near the top of write region quad_2 to write the next track of write region quad_2 below the first track of the write region quad_2. This next track is spaced below the first track by the track pitch $W_{TP}$ to shingle the previously written first track of the write region quad_2. Upon completing that track of write region quad_2, the top writer transducer $WR_{E.1}$ (FIG. 1C) is repositioned near the bottom of write region quad_3 to write the next track of write region quad_3 above the first track of the write region quad_3. This next track of write region quad_3 is spaced above the first track of write region quad_3 by the track pitch $W_{TP}$ to shingle the previously written first track of the write region quad_3.

The remaining tracks are written in the write regions quad_2, quad_3 in this manner, top-to-bottom in write region quad_2 and bottom-to-top in write region quad_3. The position of the top writer transducer $WR_{E.1}$ (FIG. 1C) while writing the last track of write region quad_2 is represented schematically as position WP7 in FIG. 5. The position of the top writer transducer $WR_{E.1}$ (FIG. 1C) while writing the last track of write region quad_3 is represented schematically as position WP8 in FIG. 5.

It is noted that in writing the last track of write region quad_1 as represented by the writer transducer position WP3, the width of this last track of write region quad_1 may extend into write region quad_2. However, this is not of concern since the first track of write region quad_2 will be positioned (as represented by the writer transducer position WP5) a distance of the track pitch $W_{TP}$ plus the inner buffer width $W_{InBuf}$ below the position of the last track of the write region quad_1 as represented by the writer transducer position WP3, thereby preserving at least the track pitch width $W_{TP}$ of the last track of write region quad_1. Similarly, in writing the last track of write region quad_4 as represented by the write transducer position WP4, the width of this last track of write region quad_4 may extend up into write region quad_3. However, this is not of concern since the first track of write region quad_3 will be positioned (as represented by the writer transducer position WP6) a distance of the track pitch $W_{TP}$ plus the width of the inner buffer $W_{InBuf}$ above the last track of the write region quad_4 as represented by the writer transducer position WP4, thereby preserving at least the track pitch width $W_{TP}$ of the last track of write region quad_4.

The inner buffer spacing $W_{InBuf}$ provides for minor nonlinearities in the spacing between servo elements. To prevent the upper track writing in write region quad_3 from overwriting tracks in write region quad_2, the final track written in write region quad_3 will extend the full width $W_W$, of the writer, and the top of the writer will be spaced below the bottom of the write region quad_2 by the width of the inner buffer $W_{InBuf}$ as shown in FIG. 5. Referring to FIGS. 4B, 5, the width $W_{SDB}$ of each sub data band is shown to be:

$$W_{SDB} = W_{EP} = W_{OutBuf} + 4 \cdot W_{Quad} + 3 \cdot W_{InBuf} + W_{CenterBuf}. \quad \text{6a}$$

with $W_{CenterBuf} = W_W - W_{TP}$.  6b where $W_{EP}$ is the pitch between the $N_E$ elements of the array 170 (FIGS. 2, 6), $W_{OutBuf}$ is the combined widths of the outer buffers 444t, 444b, W Quad is the width of each writer region quad_1, ... quad_4), $W_{InBuf}$ is the width of each inner buffer 450t, 450m, 450b, $W_{CenterBuf}$ is the width of the center buffer 454. $W_W$ is the width of each writer element of the array 170 (FIGS. 1B, 1C) and $W_{TP}$ is the track pitch. Combining Equations 5, 6a and 6b gives:

$$W_{EP} = W_{OutBuf} + N_{trkR} \cdot W_{TP} + W_W - W_{TP} + 3 \cdot W_{InBuf}. \quad \text{6c}$$

Solving for $N_{trkR}$ gives:

$$N_{trkR} = \frac{W_{EP} - W_W - W_{OutBuf} - 3 \cdot W_{InBuf} + W_{TP}}{W_{TP}}. \quad \text{7a}$$

$N_{trkR}$ is a real number which may include a fractional component and therefore is not the actual number of tracks, $N_{trk}$, which is an integer number divisible by 4 in this embodiment. Accordingly, once the real number $N_{trkR}$ is calculated solving the equations herein, it may be round down in a floor function as follows:

$$N_{trk} = 4 \cdot \text{floor}\left(\frac{N_{trkR}}{4}\right) \quad \text{7b}$$

The number of unknowns has increased from two (see Equation 4) to three: $W_{EP}$, $W_{SB}$ and $N_{trk}$ with only two Equations: 4 and 6b. The width $W_{Quad}$ of each write region is given by Equation 5. Replacing $N_{trkR}$ of equation 5 with Equation 7a yields:

$$W_{Quad} = \frac{W_{EP} - W_W - W_{OutBuf} - 3 \cdot W_{InBuf} + W_{TP}}{4}. \quad \text{7c}$$

An approximation to $W_{Quad}$ IS:

$$W_{Quad} \sim \frac{W_{EP} - W_W}{4}. \quad \text{7d}$$

Thus, it is seen that the width $W_{Quad}$ of each write region can be expressed as a function of the unknown transducer element pitch $W_{EP}$ with the remaining variables of Equation 7c having readily determinable values in this embodiment.

Turning now to a determination of $W_{SB}$, the width of each servo band 414t, 414b (FIG. 4A), movements of the servo elements, reader elements and writer elements may be examined to assist in the determination of $W_{SB}$. More specifically, to control the lateral motion of the tape head 110 FIG. 1A) relative to the moving tape 122, the single band tape head 110 has at each end in one embodiment, a servo element for each write region quadrant, quad_1, quad_2, quad_3, quad_4, to which data is being written to or read from. As described above in connection with FIG. 1B, in one embodiment, the single band tape head 110 has at one end of the tape head, an upper or top array 174t of four servo elements S1a, S1b, S1c, S1d, each of which is associated with one of the four quadrant write region quadrants, quad_1, quad_2, quad_3, quad_4, of each sub data band. At the other or distal end of the tape head 110, is a lower or bottom array 174*b* of four servo elements S2*a*, S2*b*, S2*c*. S2*d*, each of which is also associated with one of the four quadrant write regions quad_1, quad_2, quad_3, quad_4 of each sub data band. Each array 174*t*, 174*b* of servo elements has an associated top or bottom servo band 414*t*. 414*b* (FIG. 4A), which is read by the associated servo elements of the tape head to control the lateral motion of the tape head relative to the moving tape.

In one embodiment, within each sub data band, data is written to or read from a single quadrant at a time, using a pair of servo elements, for lateral motion control, that is, a servo element from the top array 174*t* of servo elements and a servo element from the bottom array 174*b* of servo elements. Thus, there is a pair of top and bottom servo elements assigned to each quadrant of a sub data band. For operation, the servos are paired as {S1*j*, S2*j*}, where j is a, b, c or d. The Servo-to-Servo distance, S1*j*-to-S2*j*, is the Head Span, $W_{headSpan}$.

For example, the servo S1*a* of the top array 174*t* and the servo S2*a* of the bottom array 174*b* form a pair of servos which control the lateral motion of each writer transducer element when writing to the writer region quad_1 of each sub data band of the single data band. Similarly, the servo pair of servos S1*a* and S2*a* control the lateral motion of each reader transducer element when reading from the region quad_1 of each sub data band of the single data band.

Figure 6:
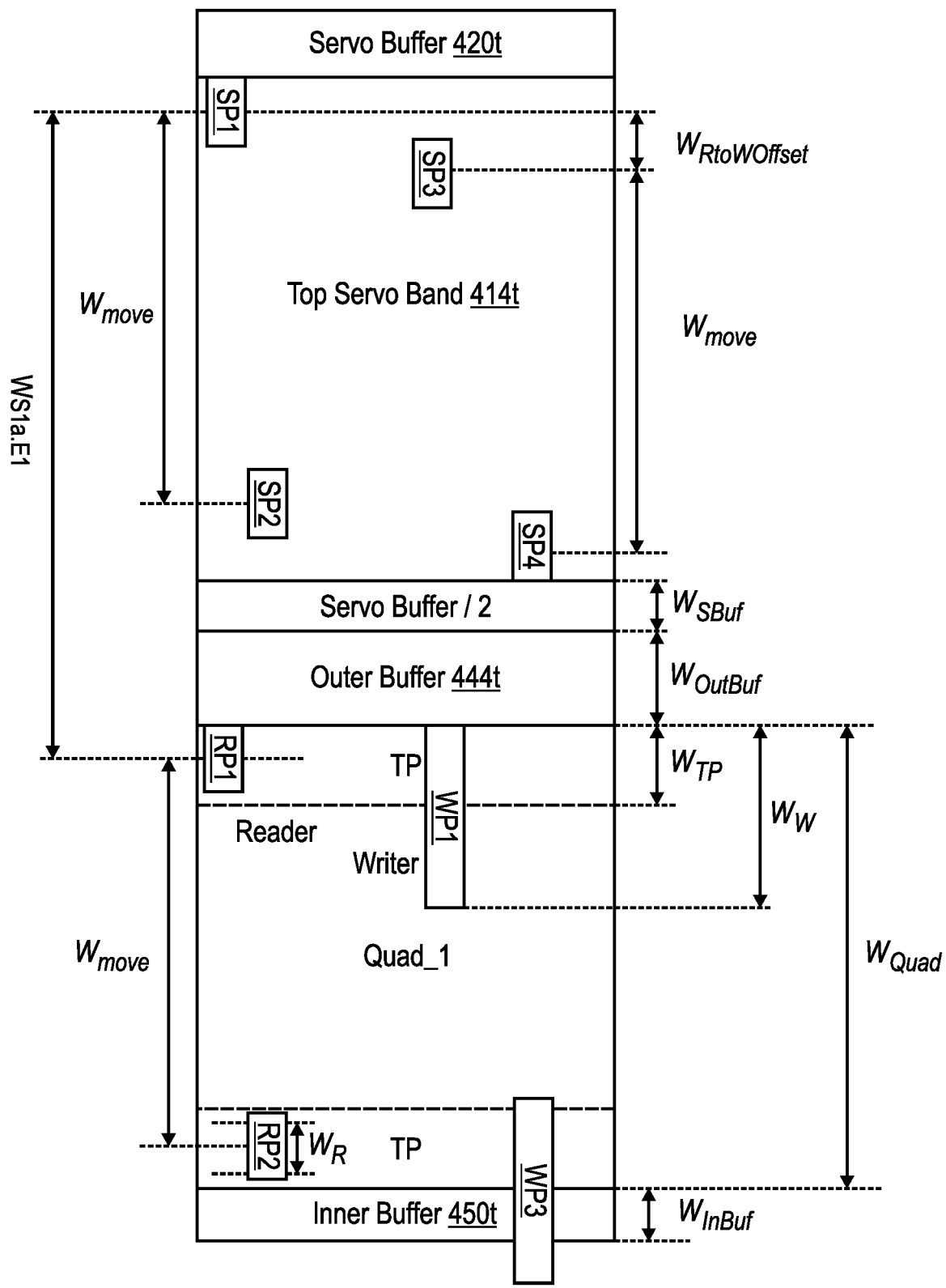
FIG. 6 depicts an embodiment of transducer element motions in a servo band and writer region quadrant for a tape head and tape employing single band data storage in accordance with the present description.
Figure 7:
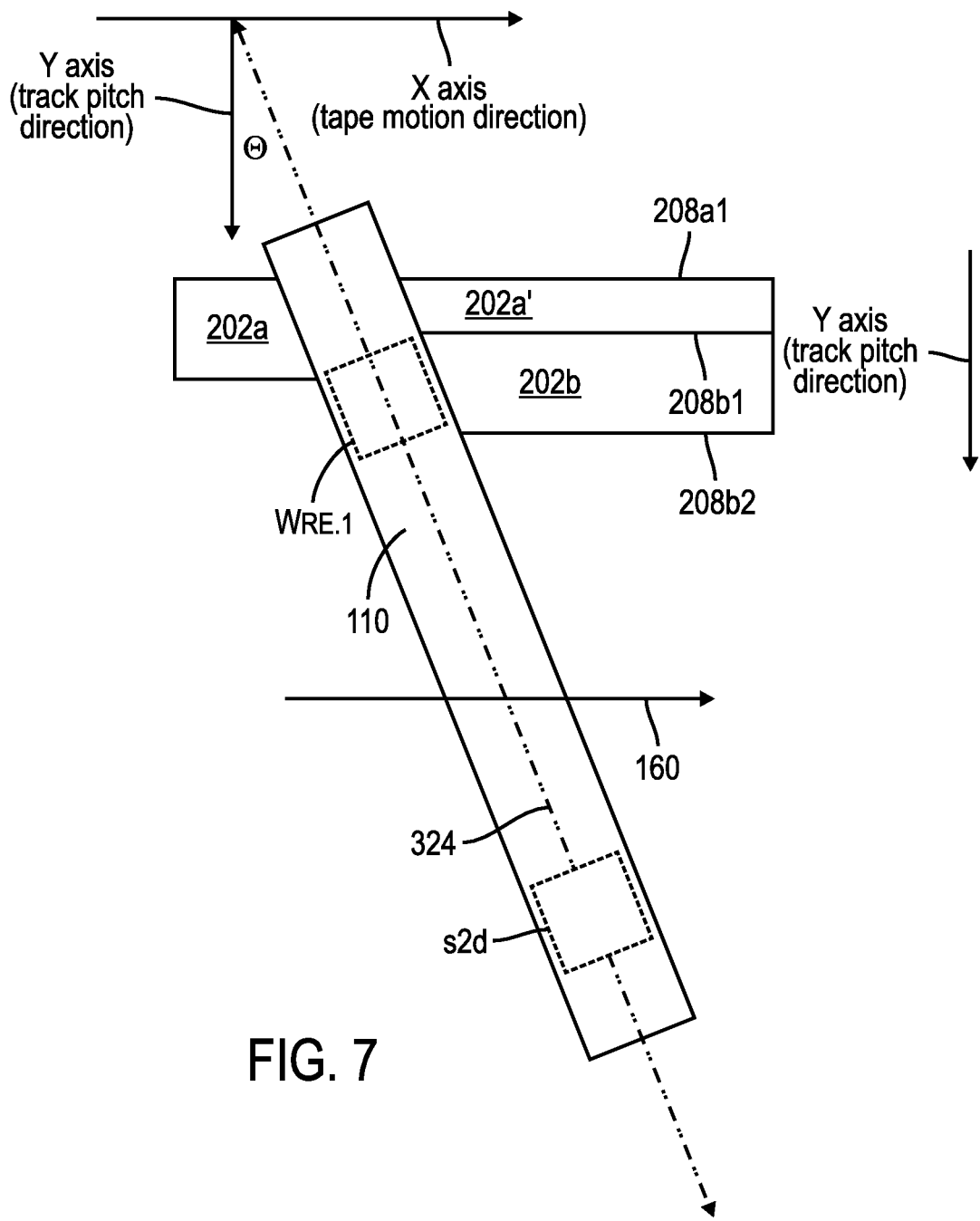
FIG. 7 depicts an embodiment of rotation of transducer elements in a tape head relative to a tape, in a system employing single band data storage in accordance with the present description.

FIG. 6 is a schematic diagram of the top servo band 414*t* and the top writer region quad_1 of the top sub data band_E.1 (FIG. 5) in which movements of the servo element S1*a* (FIGS. 1B, 6), and the top reader element $R_{E.1}$ (FIG. 1C) represented by the top transducer element E1 (FIG. 1B) of the reader/writer transducer array 170, are depicted while reading from the writer region quad_1 of the top sub data band_E.1. FIG. 6 also depicts movements of the servo element S1*a* (FIGS. 1B, 6), and the top writer element $WR_{E.1}$ (FIG. 1C) also represented by the top transducer element E1 of the reader/writer transducer array 170, while writing to the top writer region quad_1 of the top sub data band_E.1.

In this example, servo S1*a* is initially positioned at the top of the top servo band 414*t* for the first wrap of a read operation so the top of servo element S1*a* abuts the bottom edge of the top servo buffer 420*t*. The servo element S1*a* positioned for the first wrap of a read operation is schematically represented in FIG. 6 at servo position SP1. At the same time, in this example, the top reader element $R_{E.1}$ (FIG. 1C) is centered half a track pitch $W_{TP}$ below the top outer buffer 444*t*. The reader element $R_{E.1}$ positioned for the first wrap of a read operation is schematically represented in FIG. 6 at reader position RP1.

In this example, in the final wrap of the read operation of the top writer region quad_1, the top reader element $R_{E.1}$ is centered half a track pitch $W_{TP}$ above the top of the top inner buffer 450*t* separating the writer region quad_1 from the adjacent writer region quad_2 of the top sub data band_E.1. The reader element $R_{E.1}$ positioned for the final wrap of a read operation of the top writer region quad_1 is schematically represented in FIG. 6 at reader position RP2. The servo element S1*a* positioned for the final wrap of a read operation is schematically represented in FIG. 6 at servo position SP2.

To span the width of the writer region quad_1 to read all the data wraps of the writer region quad_1, the reader element $R_{E.1}$ will laterally move a distance $W_{move}$ which is the distance $W_{Quad}$ less $2 \cdot W_{TP}/2$, since the reader element $R_{E.1}$ is centered at reader position RP1, $W_{TP}/2$ below the top of the quad_1 in the first wrap and $W_{TP}/2$ above the bottom of the writer region quad_1 during the last wrap as represented by reader position RP2. Thus, the servo element S1*a* guiding the lateral movement of the tape head 110 by reading the top servo band 414*t* will move the same distance $W_{move}$ from servo position SP1 to servo position SP2, as the top reader element $R_{E.1}$ moves the distance $W_{move}$. The movement distance $W_{move}$ is therefore defined as:

$$W_{move} = W_{Quad} - W_{TP}. \quad\quad 8a$$

In one embodiment, to write the first wrap of the writer region quad_1, the top edge of the top writer element $WR_{E.1}$ (FIG. 1C) abuts the top of writer region quad_1 and the bottom edge of the top outer buffer 444*t*. The writer element $WR_{E.1}$ positioned for the first wrap of a write operation in writer region quad_1 is schematically represented in FIG. 6 at writer position WP1. The servo element S1*a* positioned for the first wrap of a write operation in writer region quad_1 is schematically represented in FIG. 6 at servo position SP3.

In one embodiment, the width $W_W$ of the writer element $WR_{E.1}$ is wider than the width $W_R$ of the reader element $R_{E.1}$. Accordingly, the servo element S1*a* is initially positioned at servo position SP3 a distance $W_{RtoWOffset}$ down from the servo position SP1 associated with the reader position RP1 of the first read wrap where $W_{RtoWOffset}$ is given by:

$$W_{RtoWOffset} = (W_W - W_{TP})/2. \quad\quad 8b$$

Inspection of FIG. 6 yields a servo band width $W_{SB}$ for a servo width $W_S$, of:

$$W_{SB} = \frac{W_S}{2} + W_{RtoWOffset} + W_{move} + \frac{W_S}{2}. \quad\quad 8c$$

Combining Equation 8c with Equations 8a and 8b yields:

$$W_{SB} = W_{Quad} + W_S + \frac{W_W}{2} - \frac{3 \cdot W_{TP}}{2}. \quad\quad 8d$$

Combining Equation 5 for $W_{Quad}$ with Equation 8d yields:

$$W_{SB} = \left(\frac{N_{trkR}}{4}\right) \cdot W_{TP} + W_S + \frac{W_W}{2} - \frac{3 \cdot W_{TP}}{2}. \quad\quad 8e$$

Combining Equations 7a for $N_{trkR}$ and Equation 8e yields:

$$W_{SB} = \frac{W_{EP} + W_W}{4} + W_S - \frac{W_{OutBuf} + 3 \cdot W_{InBuf} + 5 \cdot W_{TP}}{4}. \quad\quad 9a$$

An approximation to $W_{SB}$ is:

$$W_{SB} \sim \frac{W_{EP}}{4} + \frac{W_W}{4} + W_S \quad\quad 9b$$

Combining Equations 4 for $W_{Tape}$ and Equation 9 yields:

$$W_{EP} = \frac{2 \cdot W_{Tape} - 4 \cdot W_{Edge} - W_W - 4 \cdot W_S + 5 \cdot W_{TP} + W_{OutBuf} + 3 \cdot W_{InBuf} - 4 \cdot W_{SBuf}}{2 \cdot N_E + 1}. \quad\quad 10a$$

An approximation of WEP is:

$$W_{EP} = \frac{W_{Tape} - 2 \cdot W_{Edge} - W_W/2 - 2 \cdot W_S}{N_E + 1/2} \quad 10b$$

A further approximation of WEP is:

$$W_{EP} = \frac{W_{Tape} - 2 \cdot W_{Edge}}{N_E + 1/2} \quad 10c$$

Equation 10 defines the transducer element pitch $W_{EP}$ in terms of selected values defined by the media, that is, the width $W_{Tape}$ of the tape 122 (FIG. 1) the width $W_{Edge}$ of the edge guard band 410t, 410b, and the width $W_{SBuf}$ of the servo buffer region 440t, 440b; readily determinable transducer element parameters of the tape head 110 (FIG. 1), that is, the width $W_W$ of each writer element and the width $W_S$ of each servo element; and readily determinable drive code buffer parameters, that is, the width $W_{OutBuf}$ of each outer buffer 444t, 444b and the width $W_{InBuf}$ of each inner buffer region 450t, 450m, 450b; and a readily determinable operating point value, that is the track pitch $W_{TP}$. Similarly, Equation 9 defines the servo band width $W_{SB}$ in terms of readily determinable values, that is, the readily determinable transducer element pitch $W_{EP}$ as defined in equation 10, the readily determinable transducer element parameters of the tape head 110 (FIG. 1), that is, the width $W_W$ of each writer element and the width $W_S$ of each servo element; the readily determinable drive code buffer parameters, that is, the width $W_{OutBuf}$ of each outer buffer 444t, 444b and the width $W_{InBuf}$ of each inner buffer region 450t, 450m, 450b; and the readily determinable operating point value, that is the track pitch $W_{TP}$. Note that in this embodiment, the width $W_R$ of the reader element is not included in the calculations of equations 9 and 10. Instead, width $W_R$ of the reader element is part of the operating point. $W_R \leq W_{TP}$, but the actual difference between $W_R$ and $W_{TP}$ is determined by the drive function, that is, the track pitch selected by the operator.

Having calculated a suitable transducer element pitch $W_{EP}$ based upon readily determinable values defined by the media, transducer element parameters of the tape head 110 (FIG. 1), drive code buffer parameters, and operating point values as described above, spacings of the top and bottom placement patterns of servo elements relative to the reader/writer transducer elements may be calculated to provide improved performance and increased data capacity. In the illustrated embodiment, each pair of servo elements (one selected from the top array 174t (FIG. 1B) and one selected from the bottom array 174b) is spaced from the array 170 of reader or writer transducer elements, so each reader or writer transducer element associated with a particular sub data band is positioned within a particular sub data band quadrant associated with the assigned pair of servo elements, when the pair of servo elements is positioned within the top and bottom servo bands, respectively. Thus, the top array 174t of four servo elements S1a, S1b, S1c, S1d, is positioned in a top placement pattern to read the top servo band 414t (FIG. 5) above the single data band. At the other or distal end of the tape head 110, the bottom array 174b of four servo elements S2a, S2b, S2c. S2d is positioned in a bottom placement pattern to read the bottom servo band 414b below the single data band.

FIG. 1B designates the spacings of the top servo placement pattern between the top transducer element E.1 of the transducer array 170, and each servo element S1a, S1b, S1c and S1d of the top servo array 174t, as $W_{S1a.NE}$, $W_{S1b.NE}$, $W_{S1c.NE}$, and $W_{S1d.NE}$, respectively. FIG. 1B further designates the spacings of the bottom placement pattern between the bottom transducer element $N_E$ of the transducer array 170, and each servo element S2a, S2b, S2c and S2d of the bottom servo array 174b, as $W_{S2a.NE}$, $W_{S2b.NE}$, $W_{S2c.NE}$, and $W_{S2d.NE}$, respectively.

As described above, the top transducer element E.1 (FIG. 1B) represents either the top writer element or the top reader element and is associated with the top sub data band_E.1. Thus, the top writer element $WR_{E.1}$ (FIG. 1C) represented by the transducer element E.1 of FIG. 1B, writes the data in the writer region quadrants of the top sub data band_E.1. Similarly, the top reader element $R_{E.1}$ (FIG. 1C) represented by the transducer element E.1 of FIG. 1B, reads the data written in the writer region quadrants of the top sub data band_E.1.

FIG. 5 depicts the servo to top transducer element E1 spacings $W_{S1a.E1}$, $W_{S1b.E1}$, $W_{S1c.E1}$ and $W_{S1a.E1}$ (FIGS. 1B, 1C) of the top placement pattern for the top array 174t of servo elements as extending across regions of the top sub data band_E.1 associated with the top writer and top reader represented by the top transducer element E.1. In another aspect of single data band data storage in accordance with the present description, these servo to top reader/writer element E.1 spacings $W_{S1a.NE}$, $W_{S1b.NE}$, $W_{S1c.NE}$, and $W_{S1d.NE}$ (FIG. 1B, 1C) for the top array 174t of servo elements, and the corresponding servo to bottom reader/writer element $E.N_E$ spacings $W_{S2a.NE}$, $W_{S2b.NE}$, $W_{S2c.NE}$, and $W_{S2d.NE}$, (FIG. 1B, 1C) for the bottom array 174b of servo elements, may be calculated as follows as a function of readily determinable parameters to values which facilitate operation of a single data band tape head and increase data capacity.

As shown in FIG. 5, the servo to top transducer element E.1 spacings $W_{S1b.E1}$, $W_{S1c.E1}$ and $W_{S1a.E1}$ (FIGS. 1B,1C) for the top array 174t of servo elements each extend across one or more writer region quadrants of the top sub data band_E.1 associated with the top writer and top reader represented by the top transducer element E.1.

The width $W_{Quad}$ of each quadrant quad_1, quad_2, quad_3, quad_4 may be expressed in terms of readily determinable parameters by combining Equation 5 for $W_{Quad}$ with Equation 7a for $N_{trkR}$ which yields:

$$W_{Quad} = \frac{W_{EP} - W_W - W_{OutBuf} - 3 \cdot W_{InBuf} + W_{TP}}{4}. \quad 11a$$

Since $W_{OutBuf} + 3W_{InBuf} - W_{TP}$ is small ($<<W_{EP} - W_W$), an approximation to $W_{Quad}$ is:

$$W_{Quad} \sim \frac{(W_{EP} - W_W)}{4}. \quad 11b$$

Inspecting FIG. 5, the spacing $W_{S1a.E1}$ (FIGS. 1B, 1C) is indicated as:

$$W_{S1a.E1} = W_{SB} - \frac{W_S}{2} + \frac{W_{SBuf}}{2} + \frac{W_{TP} + W_{OutBuf}}{2}. \quad 12$$

Inserting $W_{SB}$ from Equation 9a into Equation 12 yields:

$$W_{S1a.E1} = \frac{W_{EP}}{4} + \frac{W_W}{4} + \frac{W_S}{2} + \frac{W_{SBuf}}{2} + \frac{W_{OutBuf} - 3 \cdot W_{InBuf} - 3 \cdot W_{TP}}{4}. \quad 13a$$

Inspecting FIG. 5, and using the location of the Reader element in the 1$^{st}$ wrap for Quad 2, the spacing $W_{S1b.E1}$ is:

$$W_{S1b.E1} = W_{S1a.E1} + W_{Quad} + W_{InBuf}. \quad 13b$$

Inspecting FIG. 5, and using the location of the Reader element in the 1st wrap for Quad 4, the spacing $W_{S1c.E1}$ is:

$$W_{S1c.E1} = \frac{W_S}{2} + \frac{W_{SBuf}}{2} + \frac{W_{OutBuf}}{2} + 3 \cdot W_{Quad} + 2 \cdot W_{InBuf} + W_{CenterBuf} - \frac{W_{TP}}{2}. \quad 13c$$

Inspecting FIG. 5, and using the location of the Reader element in the 1st wrap for Quad 4, the spacing $W_{S1d.E1}$ is:

$$W_{S1d.E1} = W_{S1a.E1} + 3 \cdot W_{Quad} + 3 \cdot W_{InBuf} + W_{CenterBuf}. \quad 13d$$

From Equation 6b, $W_{CenterBuf} = W_W - W_{TP} \cdot W_{Quad}$ is given by Equation 11a; $W_{SB}$ is given by Equation 9a. By inserting Equations 6b, 11a and 9a into Equations 13a-c, $W_{S1a.E1}$, $W_{S1b.E1}$, $W_{S1c.E1}$, and $W_{S1d.E1}$ can be rewritten to parameters of the head design:

$$W_{S1a.E1} = \frac{W_{EP}}{4} + \frac{W_S}{2} + \frac{W_{SBuf}}{2} + \frac{W_W}{4} + \frac{W_{OutBuf} - 3 \cdot W_{InBuf} - 3 \cdot W_{TP}}{4}. \quad 14a$$

$$W_{S1b.E1} = 2 \cdot \frac{W_{EP}}{4} + \frac{W_S}{2} + \frac{W_{SBuf}}{2} - \frac{W_{InBuf} + W_{TP}}{2}. \quad 14b$$

$$W_{S1c.E1} = 3 \cdot \frac{W_{EP}}{4} + \frac{W_S}{2} + \frac{W_{SBuf}}{2} + \frac{W_W}{4} - \frac{W_{OutBuf} + W_{InBuf} + 3 W_{TP}}{4}. \quad 14c$$

$$W_{S1d.E1} = 4 \cdot \frac{W_{EP}}{4} + \frac{W_S}{2} + \frac{W_{SBuf}}{2} - \frac{W_{OutBuf} + W_{TP}}{2}. \quad 14d$$

Realizing that $W_{OutBuf}$, $W_{InBuf}$, and $W_{TP}$ are small (a few hundred nm each), approximations to $W_{S1a.E1}$ to $W_{S1d.E1}$ are:

$$W_{S1a.E1} \sim \frac{W_{EP}}{4} + \frac{W_S}{2} + \frac{W_{SBuf}}{2} + \frac{W_W}{4}. \quad 15a$$

$$W_{S1b.E1} \sim 2 \cdot \frac{W_{EP}}{4} + \frac{W_S}{2} + \frac{W_{SBuf}}{2}. \quad 15b$$

$$W_{S1c.E1} \sim 3 \cdot \frac{W_{EP}}{4} + \frac{W_S}{2} + \frac{W_{SBuf}}{2} + \frac{W_W}{4}. \quad 15c$$

$$W_{S1d.E1} \sim 4 \cdot \frac{W_{EP}}{4} + \frac{W_S}{2} + \frac{W_{SBuf}}{2}. \quad 15d$$

In another aspect of a single data band tape head in accordance with the present description, in one embodiment, the servo spacings of the top and bottom placement patterns with respect to the array 170 (FIG. 1B) of transducer elements of the tape head 110 are symmetric mirror images of each other. As a result, the servo to E.1 reader/writer spacings $W_{S1a.E1}$, $W_{S1b.E1}$, $W_{S1c.E1}$ and $W_{S1a.E1}$ (FIG. 1B, 1C) calculated above for the top array 174t of servo elements, match the corresponding servo to bottom transducer element $N_E$ spacings for the bottom array 174b of servo elements, except the order {a, b, c, d} is inverted such that:

$$W_{S2d.E_{NE}} = W_{S1a.E1} \quad 16a$$

$$W_{S2c.E_{NE}} = W_{S1b.E1} \quad 16b$$

$$W_{S2b.E_{NE}} = W_{S1c.E1} \quad 16c$$

$$W_{S2a.E_{NE}} = W_{S1d.E1} \quad 16d$$

It is seen from Equations 16a-16d that the top and bottom servo placement patterns are symmetric mirror images of each other relative to a tape head center of rotation 190 (FIG. 1C). FIG. 1C depicts the servo and writer transducer elements of the left writer module in a first tape head writer module position. As previously noted, the right writer module may be fabricated in the same manner as the left writer module and rotated 180 degrees from the orientation depicted in FIG. 1C for the left writer module, to a second tape head writer module position. Rotation of the tape head by 180 degrees from the first tape head writer module position (FIG. 1C) of the left writer module to the second tape head writer module position of the right writer module results in the bottom array of servo transducer elements being positioned in the second tape head writer module position of the right writer module to read the top servo band 414t (FIG. 4A) in a placement pattern substantially identical to that of top array 174t of servo transducer elements positioned to read the top servo band 414t in the first tape head writer module position of the left writer module. Accordingly, the top array of servo transducer elements of the right writer module is referenced as the top servo array 174t in FIG. 1C. Conversely, rotation of the tape head left writer module by 180 degrees from the first tape head writer module position (FIG. 1C) to the second tape head writer module position for the right writer module also results in the top array of servo transducer elements being positioned in the second tape head writer module position of the right writer module to read the bottom servo band 414b (FIG. 4A) in a placement pattern substantially identical to that of bottom array 174b of servo transducer elements positioned to read the bottom servo band 414b in the first tape head writer module position of the left writer module. Accordingly, the bottom array of servo transducer elements of the right writer module is referenced as the bottom servo array 174b in FIG. 1C. As a result, a writer module of the tape head 110 may operate as expected whether or not the writer module of the tape head is rotated 180 degrees from the position depicted in FIG. 1C for the left writer module.

In writing tracks in wraps, the direction of tape motion is reversed after writing tracks in the forward tape motion direction, to write tracks in the reverse tape direction to complete a wrap. In one embodiment, an edge of the pole P2 (FIG. 3) is the trailing edge of the writer 210 in the forward direction of tape motion. Hence, track writing in the forward tape motion direction with the pole orientation of FIG. 3 is referred to herein as P2 trailing writing. To write tracks in the reverse tape motion direction, another writer module may be used in which the positions of the poles P1 and P2 may be swapped so as to maintain P2 trailing writing in the reverse tape motion direction. Alternatively, the tape head may be rotated so as to maintain P2 trailing writing in the reverse tape motion direction. It is appreciated that in other embodiments, P1 trailing writing may be appropriate, depending upon the particular application.

In one embodiment, the pair of servo elements S1a, S2a of the top and bottom servo array 174t, 174b, respectively, are spaced from the array of $N_E$ writer elements, so that when the servo elements S1a, S2a of the top and bottom servo array 174t, 174b, respectively, are positioned to read from the top and bottom servo bands 414t and 414b, respectively, the top writer $WR_{E.1}$ and the top reader $R_{E.1}$ are positioned in the quadrant quad_1 to write to or read from the quadrant quad_1 of the sub data band_E.1. Similarly, the pair of servo elements S1b, S2b of the top and bottom servo array 174t, 174b, respectively, are spaced from the array of $N_E$ writer elements, so that when the servo elements S1b, S2b of the top and bottom servo array 174t, 174b, respectively, are positioned to read from the top and bottom servo bands 414t and 414b, respectively, the top writer $WR_{E.1}$ and the top reader $R_{E.1}$ are positioned in the quadrant quad_2 to write to or read from the quadrant quad_2 of the sub data band_E.1. In this manner, the pair of servo elements S1c, S2c of the top and bottom servo array 174t, 174b, respectively, are also spaced from the array of $N_E$ writer elements, so that when the servo elements S1c, S2c of the top and bottom servo array 174t, 174b, respectively, are positioned to read from the top and bottom servo bands 414t and 414b, respectively, the top writer $WR_{E.1}$ and the top reader $R_{E.1}$ are positioned in the quadrant quad_3 to write to or read from the quadrant quad_3 of the sub data band_E.1. Similarly, the pair of servo elements S1d, S2d of the top and bottom servo array 174t, 174b, respectively, are spaced from the array of $N_E$ writer elements, so that when the servo elements S1d, S2d of the top and bottom servo array 174t, 174b, respectively, are positioned to read from the top and bottom servo bands 414t and 414b, respectively, the top writer $WR_{E.1}$ and the top reader $R_{E.1}$ are positioned in the quadrant quad_4 to write to or read from the quadrant quad_1 of the sub data band_E.1. The servo elements of the top and bottom servo arrays 174t, 174b position the remaining transducer elements E.2 ... $\cdot N_E$ of the array 170 in the quadrants of the remaining sub data bands, sub data band_E.1 ... sub data band $N_E$, in a similar manner.

Thus, a pair of servo elements positioned within the top and bottom servo bands 414t, 414b, respectively, controls the position of each writer element (or reader element) as data is written in (or read from) a track in one of the four quadrants in each sub data band. Once, a track of data has been written in (or read from) a particular quadrant in each sub data band, the tape head moves so that a different pair of servo elements is positioned within the top and bottom servo bands 414t, 414b, respectively, to control the position of each writer element (or reader element) as data is written in (or read from) a track in a different quadrant of the four quadrants in each sub data band. In this manner, the top and bottom servo bands may be shared by each pair of servo elements in turn. As a result, the width of each of the servo bands may be reduced by a factor approximately equal to the number of servo elements in each servo element array, such as four for example in one embodiment, as compared to the width of servo bands for a tape head having a single pair of servo elements, for example.

As used herein, the term head span refers to the distance between the center of the two servo bands 414t, 414b, operating simultaneously, as shown in FIG. 4A. It is also the distance between each pair of servo elements S1j and S2j where j is {a, b, c or d} as shown for the servo pair S1a, S2a for example in FIGS. 1B, 1C. Direct observation of FIG. 4A indicates that the width $W_{HeadSpan}$ of the head span is:

$$W_{HeadSpan} = N_E \cdot W_{EP} + W_{SB} + W_{SBuf}. \quad 17a$$

Combining Equation 17a with Equation 9 for the servo band width WSB yields:

$$W_{HeadSpan} = N_E \cdot W_{EP} + W_S + W_{SBuf} + \frac{W_{EP} + W_W - 5 \cdot W_{TP} - W_{OutBuf} - 3 \cdot W_{InBuf}}{4} \quad 17b$$

where $W_{EP}$ is given by Equation 10 above.

Examination of FIGS. 1B, 1C indicates that the width $W_{HeadSpan}$ of the head span may also be expressed as:

$$W_{HeadSpan} = W_{S1a.E1} + W_{S2a.E_{NE}} + (N_E - 1) \cdot W_{EP} \quad 18a$$

Combining Equation 18a above and Equation 16d for the servo spacing WS2a.ENE yields:

$$W_{HeadSpan} = W_{S1a.E1} + W_{S1d.E1} + (N_E - 1) \cdot W_{EP} \quad 18b$$

Inserting Equation 12b for the spacing $W_{S1a.E1}$ and Equation 15 for the spacing $W_{S1d.E1}$ into 18b yields:

$$W_{HeapSpan} = \left(N_E + \frac{1}{4}\right) \cdot W_{EP} + W_S + W_{SBuf} + \frac{W_W}{4} - \frac{5 \cdot W_{TP} + W_{OutBuf} + 3 \cdot W_{InBuf}}{4} \quad 18c$$

Equation 18c for the head span width $W_{HeadSpan}$ agrees with Equation 17b for the head span width $W_{HeadSpan}$. For future tape capacities, $W_{TP} \leq 500$ nm. $W_{OutBuf}$ and $W_{InBuf}$ are each $\leq 250$ nm. So, an approximation of $W_{HeadSpan}$ to within less than 1 µm is:

$$W_{HeadSpan} \sim \left(N_E + \frac{1}{4}\right) \cdot W_{EP} + W_S + W_{SBuf} + \frac{W_W}{4} \quad 18d$$

As a verification of these design calculations, the tape width $W_{Tape}$ can be verified from calculated parameters. FIG. 4A indicates that the tape width $W_{Tape}$ can be determined as a function of the calculated head span width (Equation 18c) as:

$$W_{Tape} = W_{HeadSpan} + 2 \cdot W_{Edge} + W_{SBuf} + W_{SB}. \quad 19$$

Repeating Equation 2 for the tape width $W_{Tape}$:

$$W_{Tape} = 2 \cdot (W_{Edge} + W_{SB} + W_{SBuf}) + W_{DB}. \quad 20$$

In one embodiment, if the values for the tape width $W_{Tape}$ as specified by Equations 19 and 20 agree, the design calculations above are verified.

It is appreciated that a change in the width $W_W$ of each writer element of the tape head can affect the resultant calculated dimensions for various parameters calculated above. For example, viewing Equation 10 for the calculation of a transducer element pitch $W_{EP}$, and Equation 18c for the calculation of the head span width $W_{HeadSpan}$, provides the change in head span width $W_{HeadSpan}$ as a function of a change in the writer element width $W_W$ as follows:

$$\Delta W_{HeadSpan} = \left(\frac{\partial W_{HeadSpan}}{\partial W_W}\right) \cdot \Delta W_W = \left(\frac{-1}{2 \cdot N_E + 1} + \frac{1}{4}\right) \cdot \Delta W_W \sim \frac{\Delta W_W}{4} \quad 21$$

Equation 21 indicates that the calculated head span width $W_{HeadSpan}$ changes proportionally to changes in writer width $W_W$. In one embodiment, the calculated head span width $W_{HeadSpan}$ changes at ¼ the change in writer width $W_W$.

Equation 9 for the servo band width $W_{SB}$ indicates that a change in servo band width $W_{SB}$ correlates with a change in writer width $W_W$ as:

$$\Delta W_{SB} = \left(\frac{\partial W_{SB}}{\partial W_W}\right) \cdot \Delta W_W = \frac{\Delta W_W}{4} \qquad 22$$

Equation 22 indicates that the servo band width $W_{SB}$ changes proportionally to changes in writer width $W_W$. In one embodiment, the servo band width $W_{SB}$ changes at ¼ the change in writer width $W_W$.

Equation 10 for the element pitch $W_{EP}$ provides the change in element pitch $W_{EP}$ with a change in writer width $W_W$ as:

$$\Delta W_{EP} = \left(\frac{\partial W_{EP}}{\partial W_W}\right) \cdot \Delta W_W = -\frac{\Delta W_W}{2 \cdot N_E + 1} \qquad 23$$

In one embodiment, a change in the writer width has a relatively small effect upon an optimized element pitch $W_{EP}$.

Equation 12b for the servo S1a to transducer element E.1 spacing $W_{S1a.E1}$ provides the change in spacing $W_{S1a.E1}$ with a change in writer width $W_W$ as:

$$\Delta W_{S1a.E1} = \left(\frac{\partial W_{S1aE1}}{\partial W_W}\right) \cdot \Delta W_W = -\frac{\Delta W_W}{2 \cdot N_E + 1} + \frac{\Delta W_W}{4} \sim \frac{\Delta W_W}{4} \qquad 24$$

Equation 13b provides the change in $W_{S1b.E1}$ with a change in writer width $W_W$ as:

$$\Delta W_{S1b.E1} = \left(\frac{\partial W_{S1b.E1}}{\partial W_W}\right) \cdot \Delta W_W = -\frac{\Delta W_W}{2 \cdot N_E + 1} \sim 0 \qquad 25$$

Equation 14b provides the change in $W_{S1c.E1}$ with a change in writer width $W_W$ as:

$$\Delta W_{S1c.E1} = \left(\frac{\partial W_{S1c.E1}}{\partial W_W}\right) \cdot \Delta W_W = -\frac{3 \cdot \Delta W_W}{2 \cdot N_E + 1} + \frac{\Delta W_W}{4} \sim \frac{\Delta W_W}{4} \qquad 26$$

Equation 15a provides the change in $W_{S1d.E1}$ with a change in writer width $W_W$ as:

$$\Delta W_{S1d.E1} = \left(\frac{\partial W_{S1d.E1}}{\partial W_W}\right) \cdot \Delta W_W = -\frac{\Delta W_W}{2 \cdot N_E + 1} \sim 0 \qquad 27$$

Accordingly, it is seen that, in one embodiment, optimized values for $W_{S1a.E1}$ and $W_{S1c.E1}$ change by $$\frac{\Delta W_W}{4}$$

for a change in writer width $W_W$, while optimized values for $W_{S1b.E1}$ and $W_{S1d.E1}$ are hardly affected by a change in writer width $W_W$. As a result, a head design calculated as a function of one writer width $W_W$ value, may be suitable for other writer widths, but an optimum data capacity may not be achieved. In one embodiment, the servo buffer width $W_{SBuf}$ may be selected to be sufficiently wide to accommodate changes in writer width $W_W$ selected by an operator.

It is appreciated that in writing data to tape with arrays of transducer elements, the spacing $W_{EP}$ between elements can increase or decrease due to changes in spacing on the head or in the media. Expansion or contraction of the head or media width due to thermal or humidity or other stresses can occur. One known means of correcting for these changes is to tilt the head at various angles relative to the direction of tape motion and hence the track direction for active compensation. The effective span of the head can be increased or decreased by decreasing or increasing, respectively, the absolute value of the rotation angle to facilitate active control.

Figure 8:
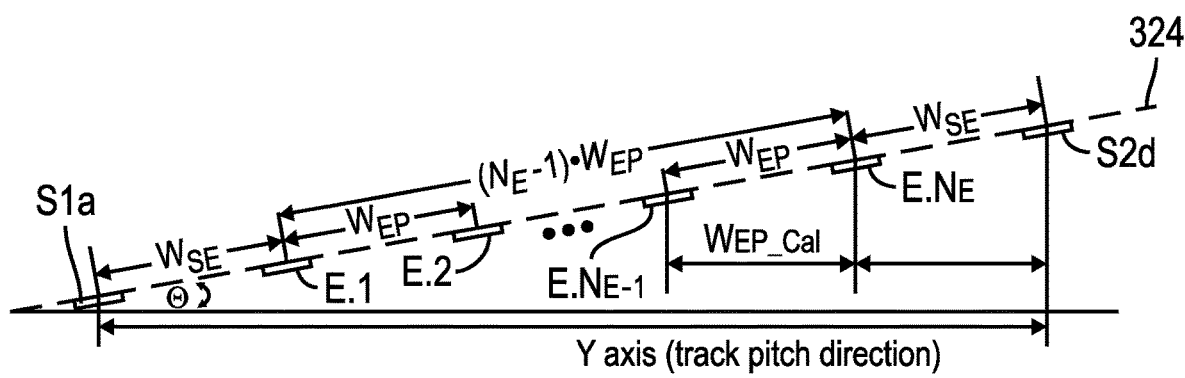
FIG. 8 depicts another embodiment of rotation of transducer elements in a tape head relative to a track written in a tape, in a system employing single band data storage in accordance with the present description.

As described above in connection with FIG. 3, the tape 122 has an x, y coordinate system 316 in which the x axis is defined by a direction of tape motion and the y axis orthogonal to the x axis, is defined by a direction of track pitch $W_{TP}$ (FIG. 2C) orthogonal to the direction of tape motion. Referring to FIG. 8, rotating the head 110 so that the axis 324 of each array of transducer elements of the head is rotated at an angle θ relative to the track pitch direction as represented by the y axis will shorten the element pitch $W_{EP}$ and hence the track pitch $W_{TP}$ (FIG. 2C) in the y axis frame of the tape. In one embodiment, the head 110 can be built with an initial fixed value of 0 and active compensation of the angle about a center 190 (FIG. 1D) may be applied.

Calculations of tape head and tape parameters provided above can be generalized to include embodiments in which the tape head is rotated at an angle θ relative to the track pitch direction as represented by the y axis, by analyzing the dimensions in the reference of the tape media. It is noted that tape parameters such as tape width $W_{Tape}$ and edge guard band width $W_{Edge}$ are in many applications predetermined values independent of tape head rotation. Tape head parameters such as servo width $W_S$, writer width $W_W$, reader width $W_R$, servo to element spacings such as $W_{S1a.E1}$, and head span width $W_{HeadSpan}$ are translated or projected to the media reference plane as represented by the y coordinate axis, by multiplying each such tape head parameter by cos (θ). Thus, the tape head parameter $W_S$ may be projected to the media reference plane as represented by the y coordinate axis y, to a value $W_{S.Tape}$ representing the projected value of the servo width $W_S$, by multiplying $W_S$ by cos (θ) such that $W_{S.Tape}$ equals $W_S$*cos (θ). The tape head parameter $W_W$ may similarly be projected to the media reference plane to a value $W_{W.Tape}$ representing the projected value of the writer width $W_W$, by multiplying $W_W$ by cos (θ) such that $W_{W.Tape}$ equals $W_W$*cos (θ).

Having projected the tape head parameters $W_S$ and $W_W$ to their corresponding projected values $W_{S.Tape}$ and $W_{W.Tape}$, respectively, optimum or preferred tape head parameters may be calculated in the media reference plane using these projected values $W_{S.Tape}$ and $W_{W.Tape}$ instead of the actual measured dimensions of $W_S$ and $W_W$. Thus, the projected value $W_{EP.Tape}$ for the element pitch $W_{EP}$ may be calculated using Equation 10 above based upon readily determinable values as described above and using the projected values $W_{S.Tape}$ and $W_{W.Tape}$ instead of the actual measured dimensions of $W_S$ and $W_W$. The projected values for the data band width $W_{DB}$, servo band width $W_{SB}$, the and the servo to element spacings such as $W_{S1a.E1}$, for example, and the head span width $W_{HeadSpan}$ may similarly be calculated usings Equations 3, 9, 12b, 13b, 14b, 15, 18c as described above and using the projected values $W_{S.Tape}$ and $W_{W.Tape}$ instead of the actual measured dimensions of $W_S$ and $W_W$.

Having calculated projected values for head parameters X (where X is S, W, HeadSpan EP, etc) in the media reference plane, these calculated projected values as represented by $W_{X.Tape}$ may be reverted to head module dimensions as represented by $W_{X.Head}$ by dividing each calculated projected value by cos (θ). Thus, the projected value $W_{EP.Tape}$ may be reverted to a head module dimension $W_{EP}$ by dividing the projected value $W_{EP.Tape}$ by cos (θ) such that $W_{EP}$ equals $W_{EP.Tape}/\cos(\theta)$. The projected values for the servo to element spacings such as $W_{S1a.E1}$, for example, and the head span width $W_{HeadSpan}$ may similarly be reverted to a corresponding head module dimension as represented as $W_X$ by dividing each calculated projected value $W_{X.Tape}$ by cos (θ) as indicated in Equation 28 below:

$$W_X = \frac{W_{X.Tape}}{\cos(\Theta)} \qquad 28$$

Tape parameters include: $W_{Tape}$, $W_{Edge}$, $W_{SB}$, $W_{DB}$, $W_{TP}$, $W_{SBuf}$, $W_{CenterBuf}$, $W_{OutBuf}$, $W_{InBuf}$. Head parameters include: $W_{EP}$, $W_S$, $W_W$, $W_{S1a.E1}$, $W_{S1b.E1}$, $W_{S1c.E1}$, $W_{S1d.E1}$, $W_{S2a.NE}$, $W_{S2b.NE}$, $W_{S2c.NE}$, $W_{S2d.NE}$.

In another aspect of single data band data storage in accordance with the present description, calculations of suitable head and tape dimensions as set forth above can be simplified as approximations to provide ranges of values also suitable for single data band data storage in accordance with the present description, depending upon the particular application. In one embodiment, it is believed that suitable approximations of head and tape dimensions may be achieved which are within a few microns of more detailed calculated values. More specifically, in various applications of single data band data storage in accordance with the present description, it is believed that tape dimensional values such as those represented by buffer widths such as the outer buffer width $W_{OutBuf}$, and the inner buffer width $W_{InBuf}$, will frequently be less than a micron in size in many applications, such that their contributions to the head parameters such as the element pitch $W_{EP}$, for example, and the tape parameters $W_{SB}$ or $W_{DB}$, for example, are relatively small in many applications. As such, calculations of suitable head and tape dimensions may be simplified by omitting such relatively small parameters from calculations of the element pitch $W_{EP}$ and the tape parameters $W_{SB}$ or $W_{DB}$, for example.

In one embodiment, Equation 10 for the element pitch $W_{TP}$ with compensation for rotation of the tape head at an angle θ in which head parameters are divided by cos (θ) as indicated by Equation 28, may be simplified to the following approximation:

$$W_{EP} \sim \left(\frac{W_{Tape} - 2 \cdot W_{Edge}}{N_E + 1/2}\right)/\cos(\Theta) \text{ or } \frac{2 \cdot W_{Tape} - 4 \cdot W_{Edge}}{\cos(\Theta) \cdot (2 \cdot N_E + 1)} \qquad 29a$$

Thus, in the above approximation of the element pitch, $W_{EP}$ is a function of just the tape width $W_{Tape}$, the width $W_{Edge}$ of the tape edge guard band and the number $N_E$ of transducer elements in each reader/writer array 170 (FIG. 1B). In one embodiment, a value for $W_{EP}$ may be approximated as a function of a tape often referred to as a "half inch" tape having a value of $W_{Tape}$ on the order of 12,650+3 microns or 12,650+20 microns, a value of $W_{Edge}$ on the order of 250+3 microns to 500+3 microns, the tape head having arrays of 64 reader/writer transducer elements, and the tape head being rotated at an angle θ=10 degrees. In one embodiment, for a tape head having arrays of 64 transducer elements and being rotated at an angle θ=10 degrees, $W_{EP}$ has a suitable range of 180 to 186 microns which may be expressed more simply as 183+3 microns. In another embodiment, $W_{EP}$ may be approximated as $$\frac{2 \cdot W_{Tape} - 4 \cdot W_{Edge}}{\cos(\Theta) \cdot (2 \cdot N_E + 1)} \pm 1 \text{ microns.}$$

As another example, the servo S1a to transducer element E1 spacing as set forth in Equation 14a and approximated in 15a may be further approximated as follows:

$$W_{S1a.E1} \sim \frac{W_{EP}}{4} + \frac{W_W}{4} + \frac{W_S}{2} + \frac{W_{SBuf}}{2} \sim \frac{W_{EP}}{4}. \qquad 29b$$

Thus, in these approximations, the servo S1a to transducer element E1 spacing can be approximated in one embodiment as a function of the $W_{EP}$ approximation provided by Equation 29a and the writer width $W_W$, the servo width $W_S$ and the servo buffer width $W_{SBuf}$, and in another embodiment, as a function of just the $W_{EP}$ approximation of Equation 29a.

Moreover, it is believed that these approximations of calculated head and tape dimensions can provide ranges of values which are also suitable for single data band data storage in accordance with the present description, depending upon the particular application. For example, in one embodiment, approximations of calculated tape head parameters can provide suitable ranges of tape head dimensions which extend at one end of a range from the approximation value plus a few hundred nm (nanometers), such as 0.3 microns, for example, to the approximation value less a few hundred nanometers, such as 0.3 microns, for example, if the writer width WW and the servo width WS are included in a more precise approximation.

Thus, in the example of Equation 29b above, the approximation for $W_{S1a.E1}$ as being approximately equal to $$\frac{W_{EP}}{4} + \frac{W_W}{4} + \frac{W_S}{2} + \frac{W_{SBuf}}{2}$$

provides a suitable range for $W_{S1a.E1}$ of to $$\frac{W_{EP}}{4} + \frac{W_W}{4} + \frac{W_S}{2} + \frac{W_{SBuf}}{2}$$

plus 0.3 microns, to $$\frac{W_{EP}}{4} + \frac{W_W}{4} + \frac{W_S}{2} + \frac{W_{SBuf}}{2}$$

less 0.3 microns, in one embodiment. This range may be expressed more simply as $W_{S1a.E1}$ having a suitable range of a range of to $$\frac{W_{EP}}{4} + \frac{W_W}{4} + \frac{W_S}{2} + \frac{W_{SBuf}}{2} \pm 0.3 \text{ microns.}$$

In another embodiment, approximations of calculated tape head parameters can provide suitable ranges of tape head dimensions which extend at one end of a range from the approximation value plus a few microns such as 3 microns, for example, to the approximation value less a few microns, such as 3 microns, for example, if the writer width $W_W$, the servo width $W_S$ and the servo buffer width $W_{SBuf}$ are excluded in a less precise approximation. Thus, in the example of Equation 29b above, the approximation for $W_{S1a.E1}$ as being approximately equal to $W_{EP}/4$ provides an example of a suitable and more broad range for $W_{S1a.E1}$ of $W_{EP}/4$ plus 3 microns, to $W_{EP}/4$ less 3 microns, or expressed more simply as, $W_{S1a.E1}$ having a suitable range of $W_{EP}/4\pm3$ microns. In one embodiment, for a tape head having arrays of 64 transducer elements and being rotated at an angle θ=10 degrees, $W_{S1a.E1}$ has a suitable range of 52.4 microns+ $(W_{SBuf}-7$ microns$)/2\pm3$ microns. In another embodiment, $W_{S1a.E1}$ is within a range of $$\frac{W_{EP}}{4} - 1 \text{ microns to } \frac{W_{EP}}{4} + 8 \text{ microns}.$$

The servo $S1b$ to transducer element $E1$ spacing as set forth in Equation 14b and approximated in 15b may be further approximated as follows:

$$W_{S1b.E1} \sim \frac{2W_{EP}}{4} + \frac{W_S}{2} + \frac{W_{SBuf}}{2} \sim \frac{W_{EP}}{2}. \qquad 29c$$

In one embodiment, the spacing $W_{S1b.E1}$ has a suitable range of $$\frac{2W_{EP}}{4} + \frac{W_S}{2} + \frac{W_{SBuf}}{2} \pm 0.3$$

microns. In another embodiment, $W_{S1b.E1}$ has a suitable range of $W_{EP}/2\pm3$ microns and in another embodiment, for a tape head having arrays of 64 transducer elements and being rotated at an angle θ=10 degrees, $W_{S1b.E1}$ has a suitable range of 95.8 microns+$(W_{SBuf}-7$ microns$)/2\pm3$ microns. In another embodiment, $W_{S1b.E1}$ is within a range of $$\frac{W_{EP}}{2} - 1 \text{ micron to } \frac{W_{EP}}{2} + 8 \text{ microns}.$$

The servo $S1c$ to transducer element $E1$ spacing as set forth in Equation 15c and Equation 28, may be approximated as follows:

$$W_{S1c.E1} \sim 3 \cdot \frac{W_{EP}}{4} + \frac{W_S}{2} + \frac{W_{SBuf}}{2} + \frac{W_W}{4} \sim 3 \cdot \frac{W_{EP}}{4}. \qquad 29d$$

In one embodiment, the approximation of spacing $W_{S1c.E1}$ is expressed as being within a suitable range of $$3 \cdot \frac{W_{EP}}{4} + \frac{W_S}{2} + \frac{W_{SBuf}}{2} + \frac{W_W}{4} \pm 0.3 \text{ microns},$$

in another embodiment, $W_{S1c.E1}$ has a range of suitable range of $$3 \cdot \frac{W_{EP}}{4} \pm 3 \text{ microns}$$

and in another embodiment, for a tape head having an arrays of 64 transducer elements and being rotated at an angle θ=10 degrees, $W_{S1c.E1}$ has a suitable range of 144.0 microns+ $(W_{SBuf}-7$ microns$)/2\pm3$ microns. In another embodiment, $W_{S1c.E1}$ is within a range of $$3 \cdot \frac{W_{EP}}{4} - 1 \text{ micron to } 3 \cdot \frac{W_{EP}}{4} + 8 \text{ microns}.$$

The servo $S1d$ to transducer element $E1$ spacing as set forth in Equation 14d and approximated in 15d, may be approximated as follows:

$$W_{S1d.E1} \sim 4 \cdot \frac{W_{EP}}{4} + \frac{W_S}{2} + \frac{W_{SBuf}}{2} \sim W_{EP}. \qquad 29e$$

In one embodiment, the approximation of spacing $W_{S1d.E1}$ is expressed as being within a suitable range of $$W_{EP} + \frac{W_S}{2} + \frac{W_{SBuf}}{2} \pm 0.3 \text{ microns},$$

in another embodiment, $W_{S1d.E1}$ has a suitable range of $W_{EP}\pm3$ microns, and in another embodiment, for a tape head having arrays of 64 transducer elements and being rotated at an angle θ=10 degrees, $W_{S1d.E1}$ has a suitable range of 187.3 microns+$(W_{SBuf}-7$ microns$)/2\pm3$ microns. In another embodiment, $W_{S1d.E1}$ is within a range of $W_{EP}-1$ micron to $W_{EP}\pm8$ microns.

In an embodiment having symmetry between the spacings of the top and bottom servo arrays 174t, 174b, respectively, this symmetry may be expressed as:

$$W_{S2a.ENE} = W_{S1d.E1}. \qquad 30a$$

$$W_{S2b.ENE} = W_{S1c.E1}. \qquad 30b$$

$$W_{S2c.ENE} = W_{S1b.E1}. \qquad 30c$$

$$W_{S2d.ENE} = W_{S1a.E1}. \qquad 30d$$

Accordingly, the approximations and suitable ranges provided above for the servo $S1a$, $S1b$, $S1c$, $S1d$ to transducer element $E1$ spacings, also apply for the servo $S2d$, $S2c$, $S2b$, $S2a$ to transducer element $N_E$ spacings, respectively, as set forth above in equations 30a, 30b, 30c and 30d, respectively.

Furthermore, the head span width $W_{HeadSpan}$ may be further approximated from the definition of Equation 18b, and complete value of 18c and approximation Equations 18d as Equation 30e:

$$W_{HeadSpan} \sim \left(N_E + \frac{1}{4}\right) \cdot W_{EP} + W_S + W_{SBuf} + \frac{W_W}{4} \sim \left(N_E + \frac{1}{4}\right) \cdot W_{EP} \qquad 30e$$

Thus, in the example of Equation 30e above, the calculation of the value $W_{HeadSpan}$ as being equal to $W_{S1a.E1}+W_{S1d.E1}+(N_E-1)\cdot W_{EP}$ provides a suitable range for $W_{HeadSpan}$ as being within a range of $W_{S1a.E1}+W_{S1d.E1}+(N_E-1)\cdot W_{EP}\pm0.3$ microns in one embodiment. The approximation of the value $W_{HeadSpan}$ as being approximately equal to $$\left(N_E + \frac{1}{4}\right) \cdot W_{EP} + W_S + W_{SBuf}$$

provides a suitable range for $W_{HeadSpan}$ as being within a range of $$\left(N_E + \frac{1}{4}\right) \cdot W_{EP} + W_S + W_{SBuf} \pm 0.3 \text{ microns}$$

in another embodiment. Similarly, the approximation for $W_{HeadSpan}$ as being approximately equal to $$\left(N_E + \frac{1}{4}\right) \cdot W_{EP}$$

provides a suitable range for $W_{HeadSpan}$ as being within a range of $$\left(N_E + \frac{1}{4}\right) \cdot W_{EP} \pm 10 \text{ microns}$$

in another embodiment. In yet another embodiment, for a tape head having arrays of 64 transducer elements and being rotated at an angle θ=10 degrees, $W_{HeadSpan}$ has a suitable range of 11,774+3 microns.

In another aspect of single data band data storage in accordance with the present description, approximations of calculated tape parameters can also provide suitable ranges of tape region dimensions which extend at one end of a range from the approximation value plus a few hundred nm (nanometers), such as 0.3 microns, for example, to the approximation value less a few hundred nanometers, such as 0.3 microns, for example. In one embodiment, the transducer element pitch $W_{EP.Tape}$ (also referred to as $W_{EP.Tape}$ above) is the transducer element pitch of Equation 10 projected to the x, y coordinate system in the tape reference plane (FIG. 3) in which the x axis is parallel to the tape longitudinal motion directions 160f, 160r and the y axis is parallel to the lateral track pitch directions 302u, 302d. The projection of the transducer element pitch $W_{EP.Tape}$ may be approximated from Equation 10 as:

$$W_{EP.Tape} \sim \frac{W_{Tape} - 2 \cdot W_{Edge}}{N_E + 1/2} \qquad 31a$$

Thus, in the example of Equation 31a above, the approximation of the value $W_{EP.Tape}$ provides a suitable range for $W_{EP.Tape}$ as being within a range of $(W_{Tape}-2W_{Edge})/(N_E+½)\pm0.3$ microns in one embodiment. In another embodiment, for a tape head having arrays of 64 transducer elements and being rotated at an angle θ=10 degrees, the value $W_{HeadSpan.Tape}$ has a suitable range of 11,595 microns+3 microns.

The servo band width $W_{SB}$ may be approximated from Equations 9a and 31a and using the definition from Equation 28 as:

$$W_{SB} \sim \frac{W_{EP.Tape}}{4} + \frac{W_{W.Tape}}{4} + W_{S.Tape} \qquad 31b$$

In the example of Equation 31b above, the approximation of the value $W_{SB}$ provides a suitable range for $W_{SB}$ as being within a range of $W_{EP.Tape}/4\pm6$ microns. In one embodiment, for a tape head having arrays of 64 transducer elements and being rotated at an angle θ=10 degrees, $W_{SB}$ has a suitable range of 48 microns+3 microns. In another embodiment, $W_{SB}$ is within a range of 48 microns−3 microns to 48 microns+7 microns. In one embodiment, $W_{SB}$, is within a range of $$\frac{W_{EP.Tape}}{4} - 3 \text{ microns to } \frac{W_{EP.Tape}}{4} + 12 \text{ microns.}$$

The data band width $W_{DB}$ may be approximated from Equations 3 and 31a:

$$W_{DB} = N_E \cdot W_{EP.Tape}. \qquad 31c$$

In the example of Equation 31c above, the value for $W_{DB}$ provides a suitable range for $W_{DB}$ as being within a range of $N_E \cdot W_{EP.Tape} \pm 0.3$ microns. In one embodiment, for a tape head having arrays of 64 transducer elements and being rotated at an angle θ=10 degrees, $W_{DB}$ has a suitable range of 11,540 microns+3 microns.

The head span width $W_{HeadSpan.Tape}$ is the head span width $W_{HeadSpan}$ projected to the x, y coordinate system in the tape reference plane (FIG. 3). From Equation 18c, $W_{HeadSpan.Tape}$ is given as:

$$W_{Headspan.Tape} = \left(N_E + \frac{1}{4}\right) \cdot W_{EP.Tape} + W_{S.Tape} + \qquad 32a$$
$$\frac{W_{W.Tape}}{4} + W_{SBuf} - \frac{5 \cdot W_{TP} + W_{OutBuf} + 3 \cdot W_{InBuf}}{4}$$

With Equation 28

$$W_{HeadSpan.Tape} = \cos(\theta) \cdot \left(\left(N_E + \frac{1}{4}\right) \cdot W_{EP} + W_S + \frac{W_W}{4}\right) + \qquad 32b$$
$$W_{SBuf} - \frac{5 \cdot W_{TP} + W_{OutBuf} + 3 \cdot W_{InBuf}}{4}$$

and is approximated as:

$$W_{HeadSpan.Tape} \sim \cos(\theta) \cdot \left(\left(N_E + \frac{1}{4}\right) \cdot W_{EP} + W_S + \frac{W_W}{4}\right) + W_{SBuf}. \qquad 32c$$

In the example of Equation 32c above, the approximation of the value $W_{HeadSpan.Tape}$ provides a suitable range for $W_{HeadSpan.Tape}$ as being within a range of $$\left(N_E + \frac{1}{4}\right) \cdot W_{EP.Tape} + W_{S.Tape} + \frac{W_{W.Tape}}{4} + W_{SBuf} \pm 0.3 \text{ microns.}$$

$W_{HeadSpan.Tape}$ can be further approximated as:

$$W_{HeadSpan.Tape} \sim \cos(\theta) \cdot \left(N_E + \frac{1}{4}\right) \cdot W_{EP}. \qquad 32d$$

where the approximation 32d provides a suitable range for $W_{HeadSpan.Tape}$ as being within a range of $$\cos(\theta) \cdot \left(N_E + \frac{1}{4}\right) \cdot W_{EP} \pm 12 \text{ microns.}$$

In one embodiment, for a tape head having arrays of 64 transducer elements and being rotated at an angle θ=10 degrees, $W_{HeadSpan.Tape}$ has a suitable range of 11,594±3 microns. In one embodiment, the top and bottom servo bands are separated by the width $W_{HeadSpan.Tape}$ wherein $W_{HeadSpan.Tape}$ is within a range of $$\left(N_E + \frac{1}{4}\right) \cdot W_{EP.Tape} - 3 \text{ microns to } \left(N_E + \frac{1}{4}\right) \cdot W_{EP.Tape} + 12 \text{ microns.}$$

The parameters can be translated into the head reference plane using Equation 28 by Modifying Equations 14a-d to include the head tilting by an angle θ:

$$W_{S1a.E1} = \frac{W_{EP}}{4} + \frac{W_S}{2} + \frac{W_W}{4} + \frac{W_{SBuf}}{2 \cdot \cos(\Theta)} + \frac{W_{OutBuf} - 3 \cdot W_{InBuf} - 3 \cdot W_{TP}}{4 \cdot \cos(\Theta)}. \quad 33a$$

$$W_{S1b.E1} = 2 \cdot \frac{W_{EP}}{4} + \frac{W_S}{2} + \frac{W_{SBuf}}{2 \cdot \cos(\Theta)} - \frac{W_{InBuf} + W_{TP}}{2 \cdot \cos(\Theta)}. \quad 33b$$

$$W_{S1c.E1} = 3 \cdot \frac{W_{EP}}{4} + \frac{W_S}{2} + \frac{W_W}{4} + \frac{W_{SBuf}}{2 \cdot \cos(\Theta)} - \frac{W_{OutBuf} + W_{InBuf} + 3W_{TP}}{4 \cdot \cos(\Theta)} \quad 33c$$

$$W_{S1d.E1} = 4 \cdot \frac{W_{EP}}{4} + \frac{W_S}{2} + \frac{W_{SBuf}}{2 \cdot \cos(\Theta)} - \frac{W_{OutBuf} + W_{TP}}{2 \cdot \cos(\Theta)}. \quad 33d$$

Realizing that $W_{OutBuf}$, $W_{InBuf}$, and $W_{TP}$ are small (a few hundred nm each), approximations to $W_{S1a.E1}$ to $W_{S1d.E1}$ are:

$$W_{S1a.E1} \sim \frac{W_{EP}}{4} + \frac{W_S}{2} + \frac{W_W}{4} + \quad 34a$$
$$\frac{W_{SBuf}}{2 \cdot \cos(\Theta)} \cdot (\text{error} = +0.22 \ \mu m, \text{ error from } WEP/4: -6.7 \ \mu m)$$

$$W_{S1b.E1} \sim 2 \cdot \frac{W_{EP}}{4} + \frac{W_S}{2} + \quad 34b$$
$$\frac{W_{SBuf}}{2 \cdot \cos(\Theta)} \cdot (\text{error} = +0.36 \ \mu m, \text{ error from } WEP/2: -4.1 \ \mu m)$$

$$W_{S1c.E1} \sim 3 \cdot \frac{W_{EP}}{4} + \frac{W_S}{2} + \frac{W_W}{4} + \quad 34c$$
$$\frac{W_{SBuf}}{2 \cdot \cos(\Theta)} \cdot (\text{error} = +0.49 \ \mu m, \text{ error from } 3 * WEP/4: -6.5 \ \mu m)$$

$$W_{S1d.E1} \sim 4 \cdot \frac{W_{EP}}{4} + \frac{W_S}{2} + \quad 34d$$
$$\frac{W_{SBuf}}{2 \cdot \cos(\Theta)} \cdot (\text{error} = +0.36 \ \mu m, \text{ error from } WEP: -4.1 \ \mu m)$$

In one embodiment, the spacings $W_{S1a.E1}$ to $W_{S1d.E1}$ are each within a range of +/−0.3 microns of each approximation above, respectively. In another embodiment, $W_{HeadSpan}$ is within a range of $$\left(N_E + \frac{1}{4}\right) \cdot W_{EP} + W_S + \frac{W_W}{4} + \frac{W_{SBuf}}{\cos(\Theta)} \pm 1 \text{ microns.}$$

Figure 9:
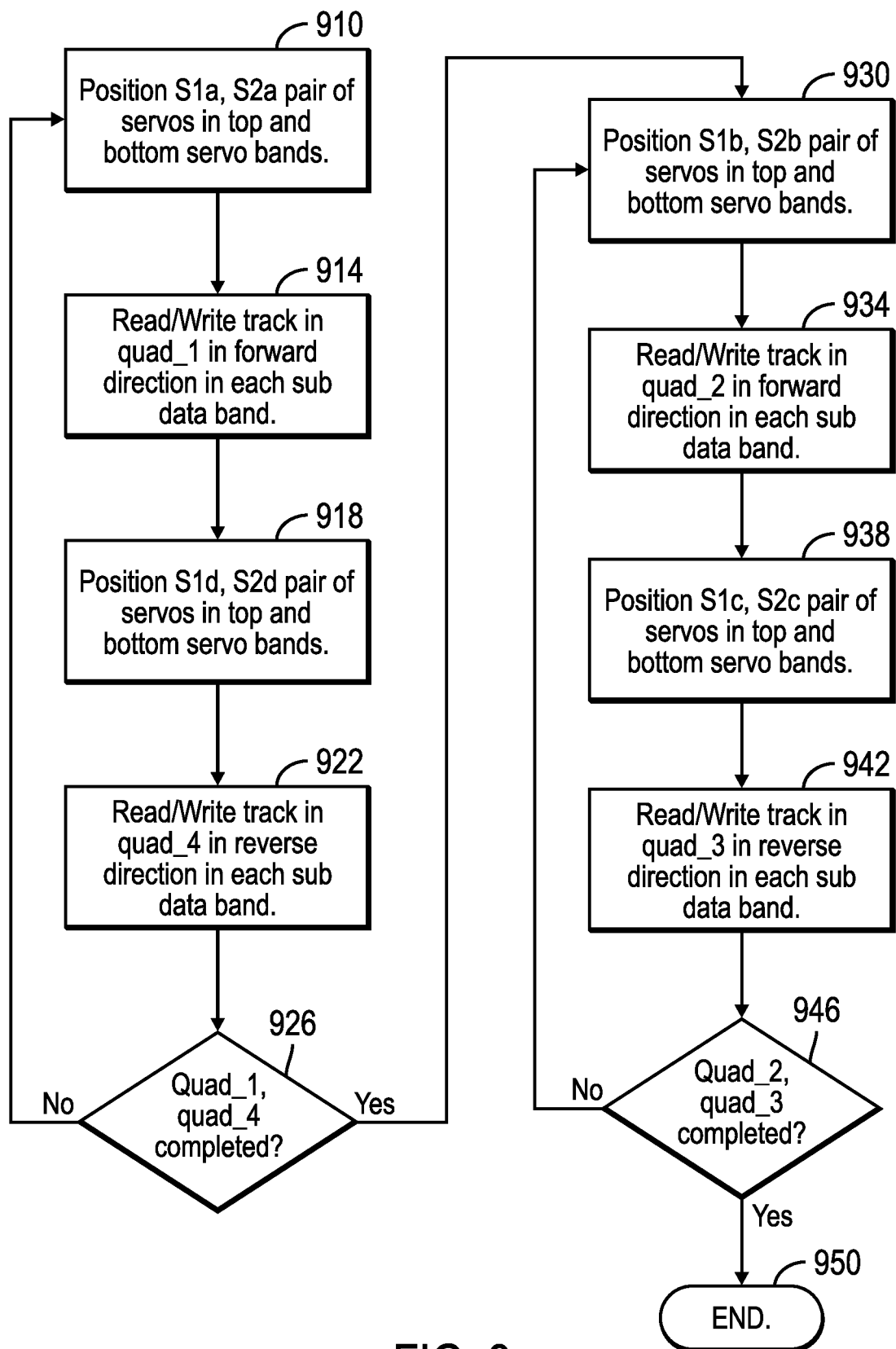
FIG. 9 is an example of operations of a tape drive of a data storage system employing single band data storage in accordance with one embodiment of the present disclosure.

FIG. 9 depicts one example of tape drive operations of the tape drive controller 128 (FIG. 1A) of a tape drive 100 employing one embodiment of single band data storage in accordance with the present description. As shown in FIG. 9, the tape drive operations of the controller 128 in this example are directed to read or write operations of the entire single data band 430 (FIG. 4A) and are represented by blocks 910-950 of FIG. 9. It is appreciated that the number and types of operations of a tape drive controller 128 of a tape drive in accordance with embodiments of the present description, may vary, depending upon the particular application. Furthermore, operations may be performed in sequences other than those depicted in FIG. 9. For example, operations may be performed in reverse order or substantially in parallel, depending upon the particular application. As another example, read or write operations may be directed to just a portion of the single data band 430.

In the embodiment of FIG. 9, a read or write operation to read from or write to the entire single data band 430 (FIG. 4A) is initiated by positioning (block 910, FIG. 9) the pair of servos S1a, S2a in the top and bottom servo bands 414t, 414b, respectively. For example, FIG. 5 depicts positioning (block 910, FIG. 9) the pair of servos S1a, S2a (FIGS. 1B, 1C) of the left writer module in the top and bottom servo bands 414t, 414b, respectively, for a write operation to write region quad_1 for each sub data band. With the pair of servos S1a, S2a positioned in the top and bottom servo bands 414t, 414b, respectively, a transducer element (either reader or writer) of the array 170 (FIG. 1B) of $N_E$ is positioned at the top of each writer region quad_1 (FIG. 5) in each sub data band of the single data band 430 (FIG. 4A). Accordingly, the first track at the top of the writer region quad_1 in each sub data band may be read from (Block 914, FIG. 9) or written to in the forward tape motion, by the corresponding reader/writer transducer element of the tape head 110.

For example, as described above in connection with FIG. 6, servo S1a of the reader module is initially positioned at the top of the top servo band 414t at servo position SP1 for the first wrap of a read operation. At the same time, the top reader element $R_{E.1}$ of the reader module (FIG. 1C) is positioned at the top of writer region quad_1 of the top sub data band_E.1 at reader position RP1 for the first wrap of the read operation. In the same manner, each of the other reader elements of the array 170R (FIG. 1C) of the reader module is positioned at the top of a writer region quad_1 of an associated sub data band of the single data band 430 (FIG. 4A). With the servos and the reader elements so positioned, the first track of the writer region quad_1 in each sub data band may be read from (Block 914, FIG. 9) by the corresponding reader transducer elements of the tape head 110 as the tape moves forward.

For the first wrap of a write operation, servo S1a of the left writer module is initially positioned near the top of servo band 414t at servo position SP3 (FIG. 6). At the same time, the top writer element $WR_{E.1}$ (FIG. 1C) of the left writer module is positioned at the top of writer region quad_1 of the top sub data band_E.1 at writer position WP1. In the same manner, each of the other writer elements of the array 170LW (FIG. 1C) of the left writer module is positioned at the top of a writer region quad_1 of an associated sub data band of the single data band 430 (FIG. 4A). With the servos and the writer elements so positioned, the first track of the writer region quad_1 in each sub data band may be written to (Block 914, FIG. 9) by the corresponding writer transducer elements of the tape head 110 as the tape moves in the forward direction.

Once the reading or writing of the first track in the writer region quad_1 is completed in each sub data band, the next pair of servos S1*d*, S2*d* of the center reader module or right writer module are positioned (block 918, FIG. 9) at the bottom of the top and bottom servo bands 414*t*, 414*b*, respectively. For example, FIG. 5 depicts positioning (block 918, FIG. 9) the pair of servos S1*d*, S2*d* (FIGS. 1B, 1D) of the right writer module in the top and bottom servo bands 414*t*, 414*b*, respectively, for a write operation to write region quad_4 for each sub data band. . . . With the pair of servos S1*d*, S2*d* positioned in the top and bottom servo bands 414*t*, 414*b*, a transducer element (either reader or writer) of the array 170 (FIG. 1B) of $N_E$ transducer elements is positioned at the bottom of a writer region quad_4 (FIG. 5) in each sub data band of the single data band 430 (FIG. 4A). Accordingly, the first track of the writer region quad_4 in each sub data band may be read from (Block 922, FIG. 9) or written to, by the corresponding reader/writer transducer element of the tape head 110 as the tape moves in the reverse direction.

A determination (block 926, FIG. 9) is made as to whether the reading (or writing) operations to the writer regions quad_1, quad_4 of each sub data band have been completed. If not, the pair of servos S1*a*, S2*a* of the center reader module or left writer module are again positioned (block 910, FIG. 9) in the top and bottom servo bands 414*t*, 414*b*, respectively, so that a transducer element (either reader or writer) of the array 170 (FIG. 1B) of $N_E$ is positioned in a writer region quad_1 in each sub data band of the single data band 430 (FIG. 4A) to read from or write to the next track in the writer region quad_1. In the illustrated embodiment, the servos S1*a*, S2*a* and the reader/writer transducer elements are positioned below the corresponding positions for reading from or writing to the first track in write region quad_1, by a distance $W_{TP}$, the track pitch which may be selected by the operator. As a result, the tracks are written from top to bottom in write region quad_1 to overlap the previously written track of the write region in a shingled fashion. With the pair of servos S1*a*, S2*a* so positioned in the top and bottom servo bands 414*t*, 414*b*, and the reader/writer transducer elements so positioned in a writer region quad_1 of each sub data band, the next track of the writer region quad_1 in each sub data band may be read from (Block 914, FIG. 9) or written to as a shingled track, by the corresponding reader/writer transducer element of the tape head 110 as the tape moves in the forward direction.

The pair of servos S1*d*, S2*d* of the center reader module or the right writer module are again positioned (block 918, FIG. 9) in the top and bottom servo bands 414*t*, 414*b*, respectively, so that a transducer element (either reader or writer) of the array 170 (FIG. 1B) of $N_E$ is positioned in a writer region quad_4 (FIG. 5) in each sub data band of the single data band 430 (FIG. 4A) to read from or write to the next track in the writer region quad_4. In the illustrated embodiment, the servos S1*d*, S2*d* and the reader/writer transducer elements are positioned above the corresponding positions for reading from or writing to the first track in writer region quad_4, by a distance $W_{TP}$, the track pitch which may be selected by the operator. As a result, the tracks are written in writer region quad_4 bottom to top, to overlap the previously written track of the writer region in a shingled fashion. With the pair of servos S1*d*, S2*d* so positioned in the top and bottom servo bands 414*t*, 414*b*, and the reader/writer transducer elements so positioned in a writer region quad_4 of each sub data band, the next track of the writer region quad_4 in each sub data band may be read from (Block 922, FIG. 9) or written to in shingled fashion, by the corresponding reader/writer transducer element of the tape head 110 as the tape moves in the reverse direction.

The read or write operations to the writer regions quad_1 and quad_4 continue one track at a time in each quadrant, switching back and forth between the quadrants quad_1 and quad_4 until all the tracks have been read from or written to and the operations completed. For the last wrap of a read operation from each writer region quad_1, for example, servo S1a is positioned near the bottom of servo band 414*t* at servo position SP2 (FIG. 6). For the last wrap of a write operation to writer region quad_1, servo S1a is positioned at the bottom of servo band 414*t* at servo position SP4 (FIG. 6) and as represented in phantom in FIG. 5 for servo bands 414*t*, 414*b*. For the last wrap of a write operation to writer region quad_4, servo S1*d* is positioned at the top of servo bands 414*t*, 414*b* as represented in phantom in FIG. 5.

Once a determination (block 926, FIG. 9) is made that the reading (or writing) operations to the writer regions quad_1, quad_4 of each sub data band have been completed, the reading/writing operations switch to reading/writing the writer regions quad_2, quad_3 of each sub data band in a manner similar to that described above for writer regions quad_1, quad_4. Accordingly, the next pair of servos S1*b*, S2*b* are positioned (block 930, FIG. 9) in the top and bottom servo bands 414*t*, 414*b*, respectively, so that a transducer element (either reader or writer) of the array 170 (FIG. 1B) of $N_E$ is positioned in a writer region quad_2 in each sub data band of the single data band 430 (FIG. 4A) to read from or write to the next track in the writer region quad_2. For example, FIG. 5 depicts positioning (block 930, FIG. 9) the pair of servos S1*b*, S2*b* (FIGS. 1B, 1C) of the left writer module in the top and bottom servo bands 414*t*, 414*b*, respectively, for a write operation to write region quad_2 for each sub data band., as depicted in FIG. 5, In the illustrated embodiment, the servos S1*b*, S2*b* and the reader/writer transducer elements are positioned below the corresponding positions for reading from or writing to the previously written track in writer region quad_2, by a distance $W_{TP}$, the track pitch which may be selected by the operator. As a result, the tracks are written from top to bottom in write region quad_2 to overlap the previously written track of the writer region in a shingled fashion. With the pair of servos S1*b*, S2*b* so positioned in the top and bottom servo bands 414*t*, 414*b*, and the reader/writer transducer elements so positioned in a writer region quad_2 of each sub data band, the next track of the writer region quad_2 in each sub data band may be read from (Block 934, FIG. 9) or written to as a shingled track, by the corresponding reader/writer transducer element of the tape head 110 as the tape moves in the forward direction.

Upon completion of the reading from or writing to a track of the writer region quad_2, the pair of servos S1*c*, S2*c* of the center reader module or the right writer module are positioned (block 938, FIG. 9) in the top and bottom servo bands 414*t*, 414*b*, respectively so that a transducer element (either reader or writer) of the array 170 (FIG. 1B,1D) of $N_E$ is positioned in a writer region quad_3 (FIG. 5) in each sub data band of the single data band 430 (FIG. 4A) to read from or write to the next track in the writer region quad_3 as the tape moves in the reverse direction. For example, FIG. 5 depicts positioning (block 938, FIG. 9) the pair of servos S1*c*, S2*c* (FIGS. 1B, 1D) of the right writer module in the top and bottom servo bands 414*t*, 414*b*, respectively, for a write operation to write region quad_3 for each sub data band., as depicted in FIG. 5, In the illustrated embodiment, the servos S1*c*. S2*c* and the reader/writer transducer elements are positioned above the corresponding positions for reading from or writing to the prior track in writer region quad_3, by a distance $W_{TP}$, the track pitch which may be selected by the operator. As a result, the tracks are written in writer region quad_3 from bottom to top, to overlap the previously written track of the writer region in a shingled fashion. With the pair of servos S1c. S2c so positioned in the top and bottom servo bands 414t, 414b, and the reader/writer transducer elements so positioned in a writer region quad_3 of each sub data band, the next track of the writer region quad_3 in each sub data band may be read from (Block 942, FIG. 9) or written to in shingled fashion, by the corresponding reader/writer transducer element of the tape head 110 as the tape moves in the reverse direction.

The read or write operations to the writer regions quad_2 and quad_3 continue one track at a time in each quadrant, switching back and forth between the quadrants, quad_2 and quad_3 until all the tracks have been read from or written to and the operations completed. For the last wrap of a read operation from each writer region quad_2, for example, servo S1b is positioned near the bottom of servo band 414t at servo position SP2 (FIG. 6). For the last wrap of a write operation to writer region quad_2, servo S1b is positioned at the bottom of servo band 414t at servo position SP4 (FIG. 6) and as represented in phantom in FIG. 5 for servo bands 414t, 414b. For the last wrap of a write operation to writer region quad_3, servo S1c is positioned at the top of servo bands 414t, 414b as represented in phantom in FIG. 5. Once a determination (block 946, FIG. 9) is made that the reading (or writing) operations to the writer regions quad_2, quad_3 of each sub data band have been completed, the reading or writing operation of the single data band 430 is complete (block 950, FIG. 9)

Figure 10:
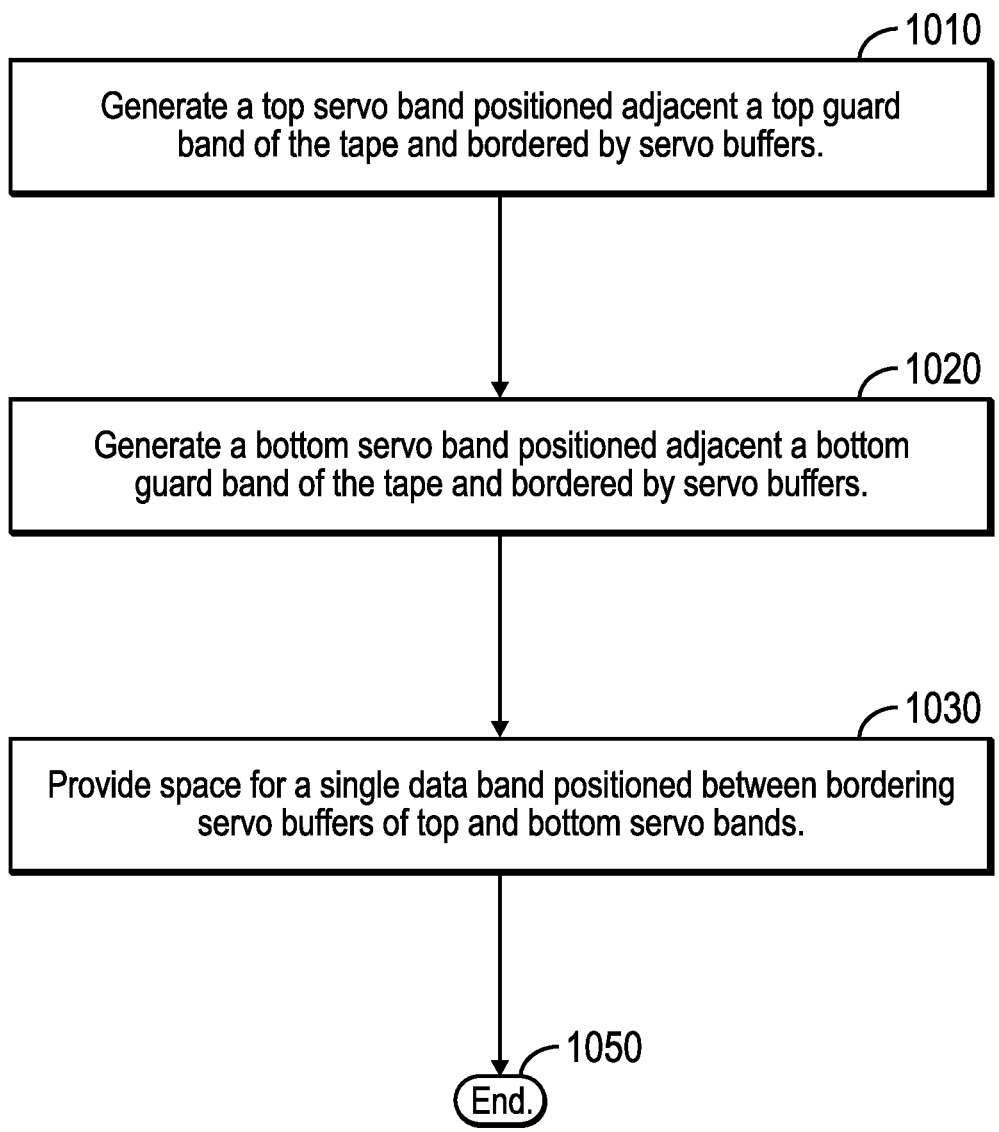
FIG. 10 is an example of operations of a tape formatting system for formatting a tape media employing single band data storage in accordance with one embodiment of the present disclosure.

FIG. 10 depicts one example of tape formatting operations of the tape drive controller 128 (FIG. 1A) of the system 100 configured for formatting a tape 122 employing one embodiment of single band data storage in accordance with the present description. As shown in FIG. 10, the tape formatting operations of the controller 128 in this example are directed to formatting servo bands 414t, 414b for a single data band 430 (FIG. 4A) and are represented by blocks 1010-1050 of FIG. 10. It is appreciated that the number and types of operations of a tape drive controller 128 of a tape drive in accordance with embodiments of the present description, may vary, depending upon the particular application. Furthermore, operations may be performed in sequences other than those depicted in FIG. 10. For example, operations may be performed in reverse order or substantially in parallel, depending upon the particular application. As another example, formatting operations may be directed to just a portion of the tape 122 having two servo bands 414t, 414b and a single data band 430.

In the embodiment of FIG. 10, the formatting operations are directed to a tape 122 for subsequent use with a tape head having top and bottom arrays of servo transducers in each reader/writer module, and arrays of $N_E$ writer transducer elements and $N_E$ reader transducer elements, each array carried on one or more substrates for reading and writing tracks of data on the tape. In this embodiment, the tape 122 has a top longitudinal edge 312t (FIG. 4A) and a bottom longitudinal edge 312b and a tape width $W_{Tape}$ extending between the top and bottom longitudinal edges of the tape, and a plurality of longitudinal regions which are generated between the top and bottom longitudinal edges.

In this example, the generation of longitudinal regions includes generating (block 1010, FIG. 10), a top servo band such as the top servo band 414t of width $W_{SB}$ (FIG. 4A), for example, positioned adjacent a top guard band such as the top edge guard of width $W_{Edge}$. The top edge guard band of this example is positioned adjacent the top longitudinal edge of the tape and extends from the top longitudinal edge of the tape toward the top servo band. In one embodiment, the top edge guard band is blank and does not contain data. However, it is appreciated that in other embodiments, the top edge guard band may contain data, depending upon the particular application. In one embodiment, the top servo band is bordered by servo buffers such as the servo buffers 420t, 440t above and below, respectively the top servo band. The servo buffers provide tolerances for writing servo patterns in the adjacent top servo band. In one embodiment, the servo buffer width $W_{SBuf}$ may be selected to be sufficiently wide to accommodate changes in writer width $W_W$ selected by an operator.

In generating (block 1010, FIG. 10) the top servo band, a servo pattern is written in the top servo band. In one embodiment, the top servo band is patterned with data in chevron shapes. When the fully formatted tape 122 is loaded in a tape drive of a tape storage system, the chevron shapes of the top servo band will be read by the tape head servos to detect the position of the tape head with high accuracy for reading or writing user data.

The generation of longitudinal regions further includes generating (block 1020, FIG. 10), a bottom servo band such as the bottom servo band 414b of width $W_{SB}$ (FIG. 4A), for example, positioned adjacent a bottom edge guard band such as the bottom edge guard 410b of width $W_{Edge}$. The bottom edge guard band of this example is positioned adjacent the bottom longitudinal edge of the tape and extends from the bottom longitudinal edge of the tape toward the bottom servo band. In one embodiment, the bottom edge guard band, like the top edge guard band, is blank and does not contain data. However, it is appreciated that in other embodiments, the bottom edge guard band may contain data, depending upon the particular application. In one embodiment, the bottom servo band, like the top servo band, is bordered by servo buffers such as the servo buffers 420b, 440b above and below, respectively the bottom servo band. As noted, the servo buffers provide tolerances for writing servo patterns in the adjacent bottom servo band. In one embodiment, the servo buffer width $W_{SBuf}$ may be selected to be sufficiently wide to accommodate changes in writer width $W_W$ selected by an operator. Here too, in generating (block 1010, FIG. 10) the bottom servo band, a servo pattern is written in the bottom servo band. In one embodiment, the bottom servo band, like the top servo band, is patterned with data in chevron shapes. The top and bottom servo bands each have a width $W_{SB}$ commensurate with the element pitch $W_{EP}$ of the arrays of writer elements and reader elements which will be used to write data to or read data from, respectively, the tape when used in a tape drive of a data storage system.

The generated top and bottom servo bands are spaced from each other to provide space (block 1030, FIG. 10) for a single data band positioned between the bottom-most servo buffer 440t (FIG. 4A) for the top servo band, and the top-most servo buffer 440b (FIG. 4A) for the bottom servo band. The space for the single data band is configured to receive tracks of user data written by a tape head of a data storage system. In one embodiment, the single data band has a width $W_{DB}$ (FIG. 4A) which extends over most of the tape width $W_{Tape}$. Upon completion (block 1050, FIG. 10) of the formatting of the tape 122, the fully formatted tape may be loaded in a tape drive of a data storage system, and the chevron shapes of the top and bottom servo bands will be read by the tape head servos of the data storage system to detect the position of the tape head with high accuracy for reading or writing user data of the single data band.

The controller 128 and the computer 140 of FIG. 1 are described as performing various logic functions. In one embodiment, the controller 128 and the computer 140 includes processors which cause operations which perform the various logic functions. Alternatively, one or more of these logic functions may be performed by one or more of programmed centralized processors such as central processing units (CPUs) and programmed distributed processors such as integrated circuit logic devices such as Application Specific Integrated Circuit (ASIC) devices, for example. Programming of such hardware may be provided by one or more of software and firmware alone or in combination and stored in a memory of the controller 128. In other embodiments, some or all of the logic functions of the controller 128 and computer 140 may be performed by dedicated or hard-wired logic circuitry.

One or more of the controllers 128 and computer 140 may be implemented as program modes which may comprise routines, programs, objects, components, logic, data structures, and so on that perform particular tasks or implement particular abstract data types. The program components and hardware devices of the tape drive 100 of FIG. 1 may be implemented in one or more computer systems, where if they are implemented in multiple computer systems, then the computer systems may communicate over a network.

The present invention may be a system, device, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing g. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A data storage tape for a tape head having an array of $N_E$ writer transducer elements carried on a substrate for writing tracks of data on the tape, the tape having a top longitudinal edge and a bottom longitudinal edge and a tape width $W_{Tape}$ extending between the top and bottom longitudinal edges of the tape, and a plurality of longitudinal regions between the top and bottom longitudinal edges including:
    a top edge guard band of width $W_{Edge}$ positioned adjacent the top longitudinal edge of the tape;
    a bottom edge guard band of width $W_{Edge}$ positioned adjacent the bottom longitudinal edge of the tape;
    a top servo band of width $W_{SB}$ positioned adjacent the top guard band of the tape;
    a bottom servo band of width $W_{SB}$ positioned adjacent the bottom guard band of the tape; and
    a single data band of width $W_{DB}$ positioned between the top and bottom servo bands and configured to receive tracks of data written by the tape head controlled by the top and bottom servo bands wherein the data band width $W_{DB}$ extends over most of the tape width $W_{Tape}$.

2. The tape of claim 1 wherein the width of the tape, $W_{Tape}$, is 12,650±20 microns; the width of the servo band on Tape, $W_{SB}$, is within a range of $$\frac{W_{EP.Tape}}{4} - 3 \text{ microns and } \frac{W_{EP.Tape}}{4} + 12 \text{ microns};$$

the top and bottom servo bands are separated by a width $W_{HeadSpan.Tape}$ wherein:
$W_{HeadSpan.Tape}$ is within a range of $$\left(N_E + \frac{1}{4}\right) \cdot W_{EP.Tape} - 3 \text{ microns and } \left(N_E + \frac{1}{4}\right) \cdot W_{EP.Tape} + 12 \text{ microns};$$

and wherein the Element pitch on tape, $$W_{EP.Tape}, \text{ is } \frac{W_{Tape} - 2 \cdot W_{Edge}}{N_E + \frac{1}{2}}.$$

3. The tape of claim 1 wherein $W_{SB}$ is within a range of 48 microns−3 microns to 48 microns+7 microns.

4. The tape of claim 1 wherein the tape width $W_{Tape}$ is within a range of 12,650 microns±20 microns.

5. The tape of claim 4 wherein the top and bottom servo bands are separated by a width $W_{HeadSpan.Tape}$, which is within a range of 11,594 microns±5 microns.

6. The tape of claim 5 wherein the data band has a sub data band for each writer transducer element of the array of $N_E$ writer transducer elements, and the tape has two servo buffer regions each having a width $W_{SBuf}$ and each being positioned between a servo band and an adjacent sub data band, wherein:
    $W_{SB}$ is within a range of 48 microns−3 microns and 48 microns+7 microns.

7. A method, comprising:
    formatting a data storage tape for use with a tape head having an array of $N_E$ writer transducer elements carried on a substrate for writing tracks of data on the tape, the tape having a top longitudinal edge and a bottom longitudinal edge and a tape width $W_{Tape}$ extending between the top and bottom longitudinal edges of the tape, the formatting including forming a plurality of longitudinal regions between the top and bottom longitudinal edges of the tape including:
    forming a top edge guard band of width $W_{Edge}$ positioned adjacent the top longitudinal edge of the tape;
    forming a bottom edge guard band of width $W_{Edge}$ positioned adjacent the bottom longitudinal edge of the tape;
    forming a top servo band of width $W_{SB}$ positioned adjacent the top guard band of the tape;
    forming a bottom servo band of width $W_{SB}$ positioned adjacent the bottom guard band of the tape; and
    forming space for a single data band of width $W_{DB}$ positioned between the top and bottom servo bands and configured to receive tracks of data written by the tape head controlled by the top and bottom servo bands wherein the data band width $W_{DB}$ extends over most of the tape width $W_{Tape}$.

8. The method of claim 7 wherein the width of the tape, $W_{Tape}$, is 12,650±20 microns, and wherein the element pitch on tape, $$W_{EP.Tape}, \text{ is } \frac{W_{Tape} - 2 \cdot W_{Edge}}{N_E + \frac{1}{2}}.$$

9. The method of claim 8 wherein the width of the servo band on Tape $W_{SB}$ is within a range of $$\frac{W_{EP.Tape}}{4} - 3 \text{ microns and } \frac{W_{EP.Tape}}{4} + 12 \text{ microns};$$

wherein the top and bottom servo bands are separated by a width $W_{HeadSpan.Tape}$ wherein:
$W_{HeadSpan.Tape}$ is within a range of $$\left(N_E + \frac{1}{4}\right) \cdot W_{EP.Tape} - 3 \text{ microns and } \left(N_E + \frac{1}{4}\right) \cdot W_{EP.Tape} + 12 \text{ microns}.$$

10. The method of claim 7 wherein $W_{SB}$ is within a range of 48 microns−3 microns to 48 microns+7 microns.

11. The method of claim 7 wherein the tape width $W_{Tape}$ is within a range of 12,650 microns±20 microns.

12. The method of claim 9 wherein the top and bottom servo bands are separated by a width $W_{HeadSpan.Tape}$, which is within a range of 11,594 microns±5 microns.

13. The method of claim 12 wherein the data band has a sub data band for each writer transducer element of the array of $N_E$ writer transducer elements, and the tape has two servo buffer regions each having a width $W_{SBuf}$ and each being positioned between a servo band and an adjacent sub data band, wherein:
    $W_{SB}$ is within a range of 48 microns−3 microns and 48 microns±7 microns.

14. A computer program product for formatting a data storage tape for use with a tape head having an array of $N_E$ writer transducer elements carried on a substrate for writing tracks of data on the tape, the tape having a top longitudinal edge and a bottom longitudinal edge and a tape width $W_{Tape}$ extending between the top and bottom longitudinal edges of the tape, wherein the computer program product comprises a computer readable storage medium, implemented in a tape formatting system, having computer readable program code embodied therein that when executed performs operations, the operations comprising:

forming a plurality of longitudinal regions between the top and bottom longitudinal edges of the tape including:

forming a top edge guard band of width $W_{Edge}$ positioned adjacent the top longitudinal edge of the tape;

forming a bottom edge guard band of width $W_{Edge}$ positioned adjacent the bottom longitudinal edge of the tape;

forming a top servo band of width $W_{SB}$ positioned adjacent the top guard band of the tape;

forming a bottom servo band of width $W_{SB}$ positioned adjacent the bottom guard band of the tape; and forming space for a single data band of width $W_{DB}$ positioned between the top and bottom servo bands and configured to receive tracks of data written by the tape head controlled by the top and bottom servo bands wherein the data band width $W_{DB}$ extends over most of the tape width $W_{Tape}$.

15. The computer program product of claim 14 wherein the width of the tape, $W_{Tape}$, is 12,650±20 microns; the width of the servo band on Tape, and wherein the element pitch on tape, $$W_{EP.Tape}, \text{is } \frac{W_{Tape} - 2 \cdot W_{Edge}}{N_E + \frac{1}{2}}.$$

16. The computer program product of claim 15 wherein $W_{SB}$ is within a range of $$\frac{W_{EP.Tape}}{4} - 3 \text{ microns and } \frac{W_{EP.Tape}}{4} + 12 \text{ microns};$$

and wherein the top and bottom servo bands are separated by a width $W_{HeadSpan.Tape}$ wherein:
$W_{HeadSpan.Tape}$ is within a range of $$\left(N_E + \frac{1}{4}\right) \cdot W_{EP.Tape} - 3 \text{ microns and } \left(N_E + \frac{1}{4}\right) \cdot W_{EP.Tape} + 12 \text{ microns}.$$

17. The computer program product of claim 14 wherein $W_{SB}$ is within a range of 48 microns−3 microns to 48 microns+7 microns.

18. The computer program product of claim 14 wherein the tape width $W_{Tape}$ is within a range of 12,650 microns±20 microns.

19. The computer program product of claim 16 wherein the top and bottom servo bands are separated by a width $W_{HeadSpan.Tape}$, which is within a range of 11,594 microns±5 microns.

20. The computer program product of claim 19 wherein the data band has a sub data band for each writer transducer element of the array of $N_E$ writer transducer elements, and the tape has two servo buffer regions each having a width $W_{SBuf}$ and each being positioned between a servo band and an adjacent sub data band, wherein:

$W_{SB}$ is within a range of 48 microns−3 microns and 48 microns+7 microns.

* * * * *